US012109565B2

(12) United States Patent
Kvist et al.

(10) Patent No.: US 12,109,565 B2
(45) Date of Patent: Oct. 8, 2024

(54) MICROFLUIDIC DEVICE AND A METHOD FOR PROVISION OF EMULSION DROPLETS

(71) Applicant: SAMPLIX APS, Herlev (DK)

(72) Inventors: Thomas Kvist, Roskilde (DK); Soléne Cherre, Vimm (DK); Marie Just Mikkelsen, Brønshøj (DK)

(73) Assignee: SAMPLIX APS, Birkerod (DK)

( * ) Notice: Subject to any disclaimer, the term of this patent is extended or adjusted under 35 U.S.C. 154(b) by 707 days.

(21) Appl. No.: 17/426,554

(22) PCT Filed: Jan. 31, 2020

(86) PCT No.: PCT/EP2020/052409

§ 371 (c)(1),
(2) Date: Jul. 28, 2021

(87) PCT Pub. No.: WO2020/157269

PCT Pub. Date: Aug. 6, 2020

(65) Prior Publication Data

US 2022/0105515 A1 Apr. 7, 2022

(30) Foreign Application Priority Data

Jan. 31, 2019 (EP) .................................... 19154947

(51) Int. Cl.
*B01L 3/00* (2006.01)

(52) U.S. Cl.
CPC . *B01L 3/502769* (2013.01); *B01L 2200/0673* (2013.01); *B01L 2300/0883* (2013.01)

(58) Field of Classification Search
CPC .. B01F 23/41; B01F 23/4144; B01F 33/3011; B01F 33/813; B01L 2200/0673; B01L 2300/0883; B01L 3/502769
See application file for complete search history.

(56) References Cited

U.S. PATENT DOCUMENTS

2010/0284240 A1* 11/2010 Chevalier ............. B01F 33/811 422/503

FOREIGN PATENT DOCUMENTS

WO 2011120024 A1 9/2011
WO 2019110591 A1 6/2019

* cited by examiner

*Primary Examiner* — Jennifer Wecker
(74) *Attorney, Agent, or Firm* — Tarolli, Sundheim, Covell & Tummino LLP

(57) ABSTRACT

A microfluidic device (100) comprises an emulsification section (101) comprising one or more emulsification units (170); and a container section (102) comprising one or more groups of containers comprising one group of containers for each emulsification unit; each emulsification unit (170) comprising a fluid conduit network (135) comprising: a plurality of supply conduits comprising a primary supply conduit (103) and a secondary supply conduit (106); a transfer conduit (112); and a first fluid junction (120) providing fluid communication between the primary supply conduit (103), the secondary supply conduit (106), and the transfer conduit (112); each group of containers (103) comprising a plurality of containers comprising an intermediate chamber (174), a collection container (134), and one or more supply containers (131) comprising a secondary supply container, the secondary supply container (131) defining a secondary supply cavity, the secondary supply container (131) comprising a secondary orifice (177) extending from the secondary supply cavity and a primary orifice (176) extending from the secondary supply cavity, the collection container (134) being in fluid communication with the transfer conduit (112) of the corresponding emulsification unit (170) via a collection orifice of the collection container (134), the secondary supply container (131) being in fluid communication with the secondary supply conduit (106) of the corresponding emulsification unit (170) via the second- (Continued)

ary orifice (177), the secondary supply container (131) being in fluid communication with the intermediate chamber (174) of the same group of containers (103) via the primary orifice (176), the intermediate chamber (174) being in fluid communication with the first fluid junction (120) of the corresponding emulsification unit (170) via the primary supply conduit (103) of the corresponding emulsification unit (170). Furthermore a method of manufacturing said device and a method for providing emulsion droplets using such a microfluidic device.

17 Claims, 26 Drawing Sheets

MICROFLUIDIC DEVICE AND A METHOD FOR PROVISION OF EMULSION DROPLETS

RELATED APPLICATIONS

The present invention is a U.S. National Stage under 35 USC 371 patent application, claiming priority to Serial No. PCT/EP2020/052409, filed on 31 Jan. 2020; which claims priority of EP 19154947.6, filed on 31 Jan. 2019, the entirety of both of which are incorporated herein by reference.

The present invention relates to a microfluidic device, a method for manufacturing a microfluidic device, and a method for provision of emulsion droplets using a microfluidic device. Furthermore, the present invention relates to a kit comprising a plurality of microfluidic devices and a plurality of fluids configured for use with the microfluidic device for provision of emulsion droplets.

Emulsion droplets, such as comprising an aqueous inner phase and an oil outer carrier phase, have found use in many industrial, medical, and research applications. Such applications may for instance comprise: drug delivery, delivery vehicles for cosmetics, cell encapsulation, and synthetic biology. Partitioning of cells, chemicals, or molecules into millions of smaller partitions, as may be provided using emulsion droplets, may separate the reactions of each unit, which may enable processing or analysis of each partition separately.

Prior art microfluidic devices and methods for provision of double emulsion droplets are known from publications such as: EP 11838713; U.S. Pat. No. 9,238,206 B2; US 20170022538 A1; U.S. Pat. No. 8,802,027 B2; US 20120211084; U.S. Pat. No. 9,039,273 B2; and U.S. Pat. No. 7,772,287 B2.

The inventors of the present invention have identified potential drawbacks of the prior art devices and methods. Identified potential drawbacks may include complex and/or time-consuming operation for provision of emulsion droplets. Identified potential drawbacks of the prior art may include risk of contamination of samples when prior art microfluidic chips are connected to fluid reservoirs via tubing and other connectors and/or when microfluidic chips of different surface properties are connected to each other in series using tubing. Identified potential drawbacks of the prior art may include loss of samples in tubing provided between different components of prior art systems. Identified potential drawbacks of the prior art may include provision of unstable air pressure due to the use of complex tubing systems for connecting components of the prior art systems. Some or all of these potential drawbacks of prior art systems may cause polydisperse droplets, which may be undesired.

One object of the present invention is to provide improved and/or alternative systems and methods for provision of emulsion droplets, such as monodisperse emulsion droplets.

Another object of the present invention is to reduce and/or to enable reduced use of reagents and/or loss of sample during provision of emulsion droplets, such as monodisperse emulsion droplets.

Yet another object of the present invention is to provide devices and methods that simplify provision of emulsion droplets, such as monodisperse emulsion droplets, and/or to provide devices and methods that reduce requirements for personnel having significant skills in microfluidics operations.

Yet another object of the present invention is to minimize risk of contamination while producing emulsion droplets.

According to an aspect of the present invention, there is provided a microfluidic device comprising:

an emulsification section comprising one or more emulsification units; and a container section comprising one or more groups of containers comprising one group of containers for each emulsification unit;

each emulsification unit comprising a fluid conduit network comprising: a plurality of supply conduits comprising a primary supply conduit and a secondary supply conduit;

a transfer conduit; and a first fluid junction providing fluid communication between the primary supply conduit, the secondary supply conduit, and the transfer conduit;

each group of containers comprising a plurality of containers comprising an intermediate chamber, a collection container, and one or more supply containers comprising a secondary supply container, the secondary supply container defining a secondary supply cavity, the secondary supply container comprising a secondary orifice extending from the secondary supply cavity and a primary orifice extending from the secondary supply cavity, the collection container being in fluid communication with the transfer conduit of the corresponding emulsification unit via a collection orifice of the collection container, the secondary supply container being in fluid communication with the secondary supply conduit of the corresponding emulsification unit via the secondary orifice, the secondary supply container being in fluid communication with the intermediate chamber of the same group of containers via the primary orifice, the intermediate chamber being in fluid communication with the first fluid junction of the corresponding emulsification unit via the primary supply conduit of the corresponding emulsification unit.

The number of groups of containers is the same as the number of emulsification units. The first fluid junction may function as a junction between the three conduits being connection to the first fluid junction. The transfer conduit may provide fluid communication between the collection container and the first fluid junction. The primary supply conduit may provide fluid communication between the secondary supply container and the first fluid junction. The secondary supply conduit may provide fluid communication between the secondary supply container and the first fluid junction.

According to an aspect of the present invention, there is provided an assembly comprising the microfluidic device, a thermal structure, and a holder configured to provide a thermal connection between the thermal structure and a bottom part of the microfluidic device, wherein most of the intermediate chamber of each group of containers may be provided within 5 mm from the thermal structure.

According to an aspect of the present invention, there is provided a kit comprising:

one or more of the microfluidic devices according to the present invention and/or one or more of the assemblies according to the present invention; and a plurality of fluids configured for use with the microfluidic device;

the plurality of fluids comprising a sample buffer and an oil, the kit comprising an enzyme and nucleotides, wherein the sample buffer may have a lower density than the oil.

According to an aspect of the present invention, there is provided a method for providing emulsion droplets, the method comprising use of any of:

the microfluidic device according to the present invention;
the assembly according to the present invention; or
the kit according to the present invention;
for the provision of emulsion droplets.

According to an aspect of the present invention, there is provided a method of providing a microfluidic device according to the present invention, the method comprises:

providing a plurality of components comprising a first component and a second component; and assembling the plurality of components such that each component is fixedly attached to at least one other component, and such that the plurality of components forms a fixedly connected unit, and such that each fluid conduit network is formed in part by the second component and in part by the first component, and wherein the first component faces the second component.

One advantage with the present invention is facilitation of a simpler manufacturing process and/or facilitation of usage of less material, e.g. compared to a microfluidic device having more containers than the microfluidic device according to the present invention.

Another advantage with the present invention is facilitation of improved and/or different separation of different fluids, i.e. e.g. the first fluid and the second fluid, contained by the microfluidic device prior to formation of emulsions, such as single emulsions.

An advantage with the present invention may be that the second fluid, which may be provided to the secondary supply container after the first fluid has been provided to the secondary supply container, and which first fluid subsequently has been injected into the intermediate chamber, displaces the first fluid in the intermediate chamber during formation of emulsion droplets, whereby a more complete process is achieved. A complete process may be considered a process where all of the first fluid has been emulsified and, for formation of single emulsions, being dispersed in the second fluid being in a continuous phase. The second fluid may force any remnants of the first fluid through the fluid conduit network during emulsion formation, which may enable that all or most of the first fluid may be processed by the device according to the invention and may be provided to the collection container e.g. in form of droplets.

An advantage with the present invention may be facilitation of an environment, such as the intermediate chamber, which may be better controlled than a supply container, e.g. in terms of temperature and/or by being shielded from contamination and/or reactions caused by ambient air and/or particles in the ambient air. Accordingly, the time that lapses between providing the first fluid to the microfluidic device according to the present invention may be less critical to keep short compared to prior art solutions.

An advantage of the present invention, such as the provision of the container section and the emulsification section being fixedly connected to each other, may comprise that the liquids used for provision of double emulsion droplets, i.e. e.g. the first fluid, the second fluid, and the third fluid, as well as the resulting droplets may be contained within the microfluidic device. This may in turn provide ease of use of the device and the method according to the present invention and/or may provide a low risk of contamination of results and/or may facilitate that droplets generated according to the present invention may be improved with respect to being monodisperse and/or reproducible. This may at least in part be the outcome of the present invention avoiding or minimizing use of complex connections with extended tubing and connecting features of varying length, as may be used by prior art solutions.

An advantage of the present invention, such as the kit comprising a plurality of fluids configured for use with the microfluidic device according to the present invention, is that the properties of the fluids can be provided such that they are configured for the specific microfluidic device comprised in the kit, which may in turn reduce the risk of using fluids that could compromise droplet production or droplet stability.

An advantage of the method for manufacturing according to the present invention, wherein the method comprises fixing the container section and the emulsification section to each other, such that fluid communication is provided between the individual containers of each group of containers via the corresponding respective emulsification units, is that the risk of leakage of liquids is alleviated. An alternative or additional advantage may comprise that any or some variations in results between parallel and/or consecutive sample production may be alleviated.

The present invention relates to different aspects including the devices and methods described above and in the following. Each aspect may yield one or more of the benefits and advantages described in connection with one or more of the other aspects. Each aspect may have one or more embodiments with all or just some of the features corresponding to the embodiments described in connection with one or more of the other aspects and/or disclosed in the appended claims.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The above, as well as additional objects, features and advantages of the present inventive concept, will be better understood through the following illustrative and non-limiting detailed description of preferred embodiments and/or features of the present inventive concept, with reference to the appended drawings, where like reference numerals may be used for like elements. Furthermore, any reference numerals wherein the last two digits are identical, but where any one or two preceding digits are different, may indicate that those features are structurally differently illustrated, but that these features may refer to the same functional features of the present invention, cf. the list of reference numbers.

The accompanying drawings are included to provide a further understanding of the invention, and are incorporated in and constitute a part of this specification. The drawings illustrate embodiments of the invention and, together with the description, serve to explain the principles of the invention. Other and further aspects and features may be evident from reading the following detailed description of the embodiments.

The drawings illustrate the design and utility of embodiments. These drawings are not necessarily drawn to scale. In order to better appreciate how the above-recited and other advantages and objects are obtained, a more particular description of the embodiments will be rendered, which are illustrated in the accompanying drawings. These drawings may only depict typical embodiments and may therefore not be considered limiting of its scope.

FIGS. 1-5 schematically illustrate various views of a first embodiment of a microfluidic device 100 according to the present invention.

FIGS. 6-9 schematically illustrate various views of a second embodiment of a microfluidic device 200 according to the present invention.

FIGS. 10-13 schematically illustrate various views of a third embodiment of a microfluidic device 300 according to the present invention.

FIGS. 14-16 schematically illustrate various views of a fourth embodiment of a microfluidic device 400 according to the present invention.

FIGS. 17-19 schematically illustrate various views of individual supply wells and/or fluid conduit networks of the microfluidic device according to any of the embodiments described herein according to the present invention.

FIGS. 20-22 schematically illustrate various views of an embodiment of an assembly according to the present invention.

Figure 23:
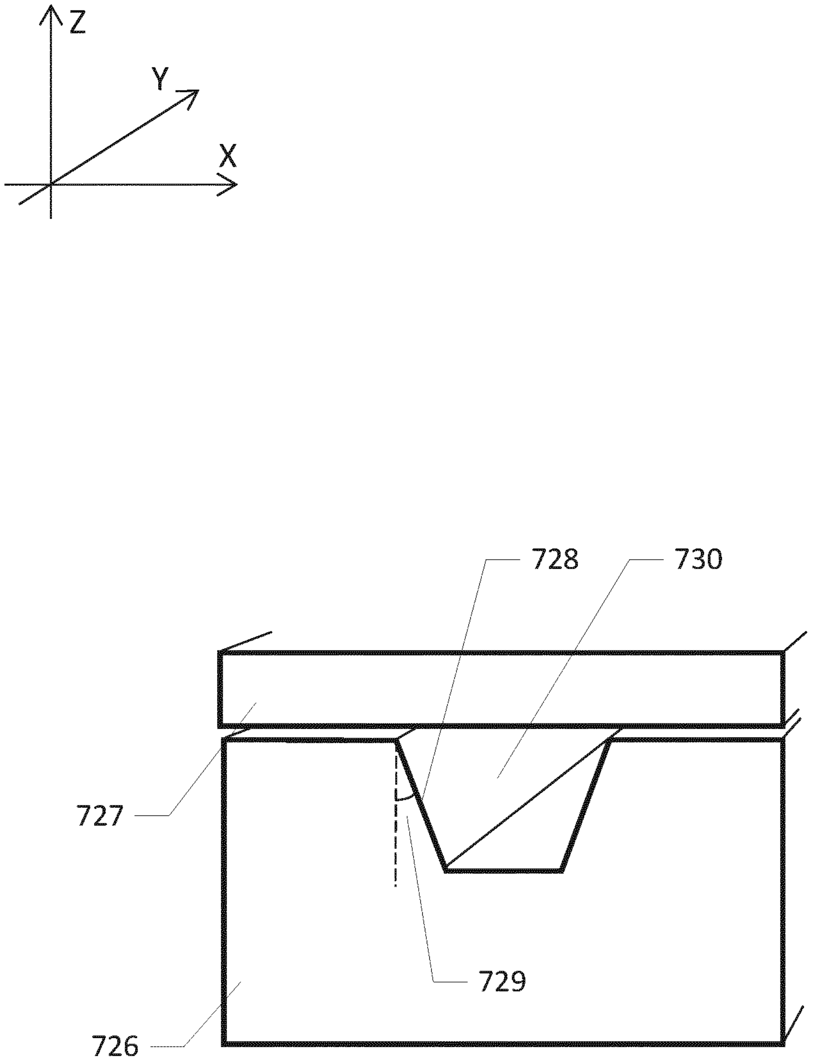

FIG. 23 schematically illustrates an isometric sectional view of a part of a conduit of a microfluidic device according to the present invention.

Figure 24:
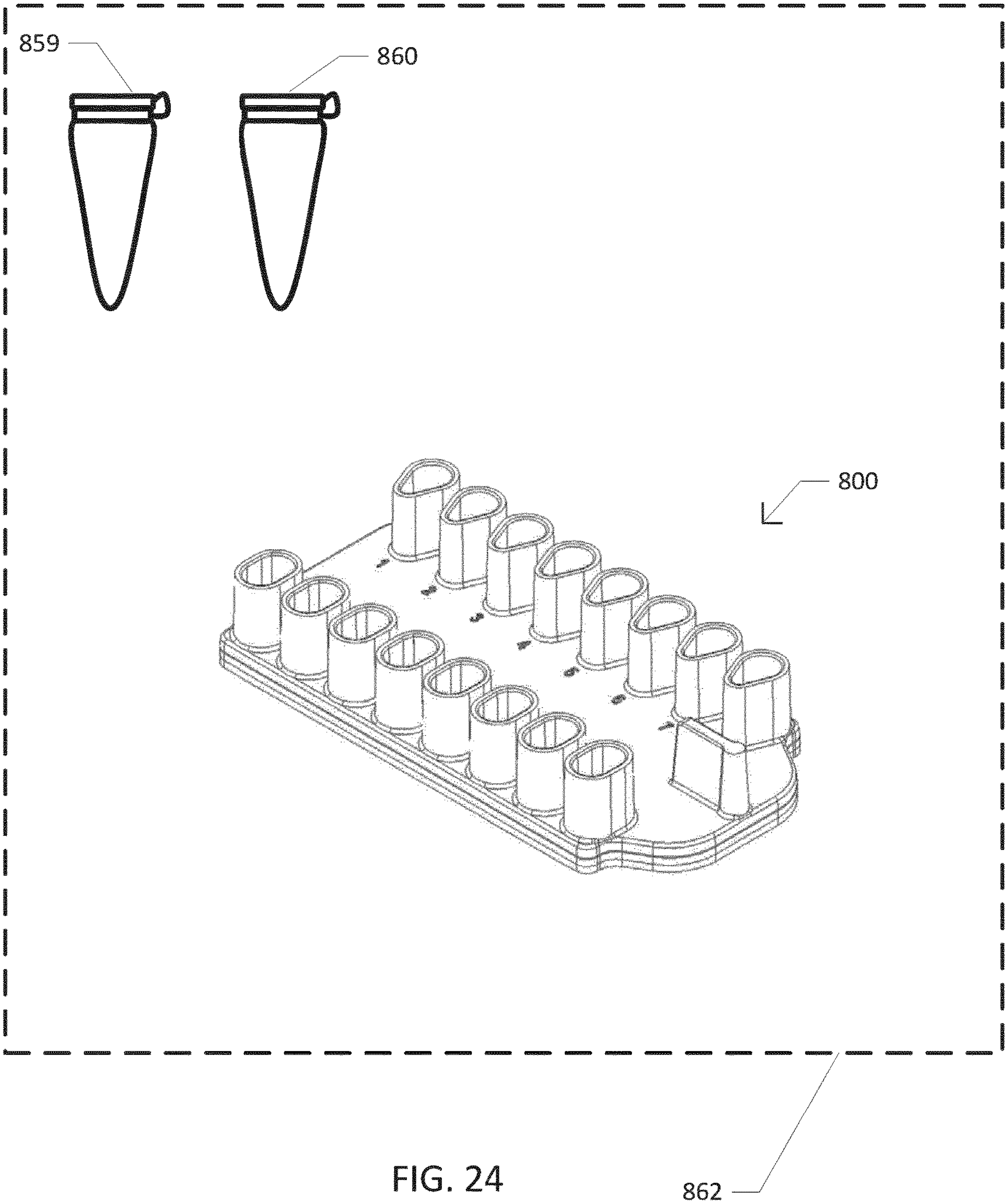

FIG. 24 schematically illustrates a first embodiment of a kit according to the present invention.

FIG. 25 illustrates an eight embodiment according to the present invention.

Figure 26:
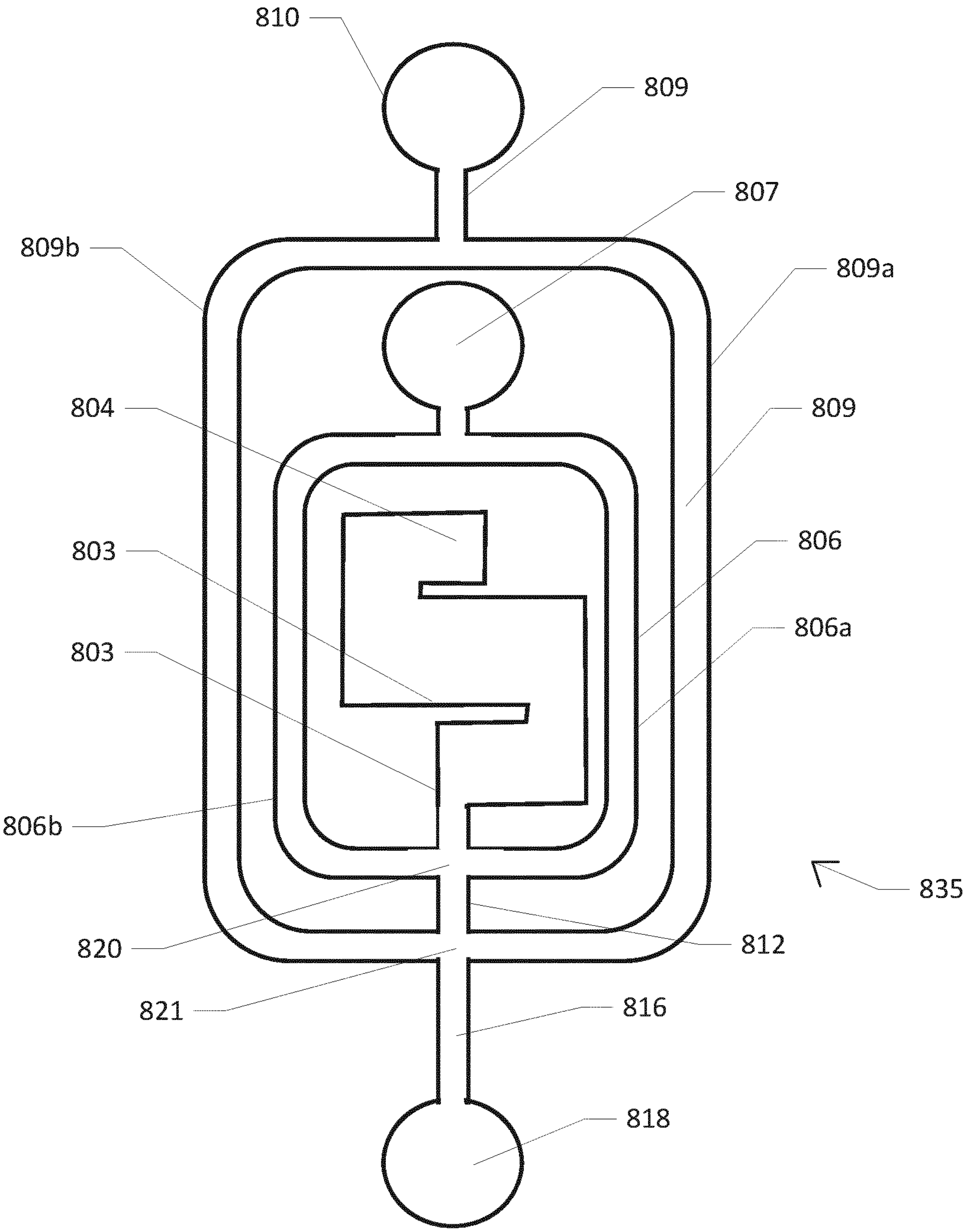

FIG. 26 schematically illustrates a top view of a part of the eighth embodiment of a microfluidic device.

For any drawings having such, the right-handed Cartesian coordinate system indicates the individual schematic views of an embodiment are oriented with respect to each other.

DETAILED DESCRIPTION

Throughout the present disclosure, the term “droplet” may refer to “emulsion droplet”, such as provided according to the present invention.

Throughout the present disclosure, the term “example” may refer to an embodiment according to the present invention.

The volume of each fluid conduit network, excluding the intermediate chamber, may be between 0.05 μL and 2 μL, such as between 0.1 μL and 1 μL, such as between 0.2 μL and 0.6 μL, such as around 0.3 μL.

The one or more emulsification units may comprise a plurality of emulsification units, such as eight emulsification units. The one or more groups of containers may comprise a plurality of groups of containers, such as eight groups of containers. The number of emulsification units provided by a microfluidic device is equal to the number of groups of containers provided by the microfluidic device. An advantage of the present invention, such as the provision of the plurality of emulsification units and the corresponding plurality of groups of containers of the microfluidic device, is that individual and/or parallel processing of several samples may be facilitated. The first fluid, which may comprise sample material, may simply be denoted “sample”. An advantage of using a method according to the present invention for providing emulsion droplets, wherein the method comprises use of any of: the microfluidic device according to the present invention; or the kit according to the present invention; for the provision of emulsion droplets, may comprise that simultaneous and parallel production of a plurality of droplet emulsions may be achieved which reducing use of time and/or handling. An alternative or additional advantage of using the method according to the present invention may comprise that parallel samples produced using the method may be more homogeneous, which may result in more comparable results from parallel samples.

It may be desired that the second fluid is provided to the first fluid junction before the first fluid is provided to the first fluid junction. This may be to facilitate that even the first part of the first fluid being provided to the first fluid junction is emulsified. It may be desired that all the first fluid (the sample) is emulsified.

At least the first fluid junction and the part of the transfer conduit in the immediate continuation of the first fluid junction may be designated microfluidic/emulsification parts or sections.

It may be desired that the intermediate chamber has a larger volume than the volume of the first fluid as provided to the secondary supply container at a time, such as the intended volume of the first fluid to be provided to the secondary supply container.

The intermediate chamber may form part of the primary supply conduit. The primary supply conduit may be provided between the intermediate chamber and the first fluid junction. The primary supply conduit may be configured to extend the time it takes from a pressure difference is applied between the secondary supply container and the collection container and until the first fluid arrives at the first fluid junction. This may facilitate that the second fluid arrives at the first fluid junction before the first fluid, which may in turn result in all of the first fluid being emulsified in the second fluid.

The primary supply conduit may be provided with a volume which is larger than the volume of the secondary supply conduit. The volume of the primary supply conduit may be between 0.05 μL and 1 μL, such as between 0.1 and 0.5 μL.

Each fluid conduit network may be configured such that the fluid resistance of the primary supply conduit is larger than the fluid resistance of the secondary supply conduit.

Processing of the first fluid may refer to emulsification of the first fluid.

It may be desired that the intermediate chamber has a volume of at least a certain size, since the volume of the intermediate chamber may define an upper limit of a volume of the first fluid to be processed at a time. The intermediate chamber may for instance have a volume of at least 2 μL, 3 μL, 4 μL, 5 μL, 6 μL, 10 μL, 15 μL, 20 μL, 50 μL, or 100 μL. However, there may be several reasons to provide an intermediate chamber with a volume of at most a certain size. The intermediate chamber may for instance have a volume of at most 1 mL, 500 μL, 400 μL, 200 μL, or 100 μL.

For instance, for facilitation of manufacturing of the microfluidic device, such as in particular the emulsification section, it may be desired that each intermediate chamber is provided within a common layer, which may be denoted a “intermediate chamber layer”. Such intermediate chamber layer may have a longer extension along two orthogonal axes than along a third orthogonal axis.

A length of an intermediate chamber may be defined as the extension along the intended direction of flow. A width and a depth, respectively, of an intermediate chamber may be defined orthogonal to each other and orthogonal to the length of the intermediate chamber. The depth of an intermediate chamber may be defined along the third axis of the intermediate chamber layer.

Each intermediate chamber may have a width of at least: 2 mm, 3 mm, 4 mm, or 5 mm, and/or at most: 8 mm, 7 mm, or 6 mm. The maximal width of each intermediate chamber may e.g. be of relevance for a microfluidic device having a plurality of sample lines being configured for use with a standard multichannel pipette, e.g. a standard multichannel pipette having a nozzle spacing of 9 mm.

Each intermediate chamber may have a depth of at least: 0.02 mm, 0.05 mm, 0.1 mm, 0.25 mm, 0.5 mm, or 0.7 mm, and/or at most: 2 mm, 1.5 mm, 1 mm, or 0.7 mm.

Each intermediate chamber may have a longitudinal extension of at least: 5 mm, 6 mm, 8 mm, 10 mm, 15 mm, or 20 mm, and/or at most: 150 mm, 120 mm, 100 mm, 80 mm, or 50 mm.

Each intermediate chamber may have a cross-sectional area perpendicular to the longitudinal extension of at least: 0.1 $mm^2$, 0.2 $mm^2$, 0.25 $mm^2$, 0.5 $mm^2$, 1 $mm^2$, or 2 $mm^2$, and/or at most 4 $mm^2$.

Each intermediate chamber may be: 0.1 mm to 1 mm deep; 3 mm to 8 mm wide; and 5 mm to 25 mm long.

Each intermediate chamber may be: 0.25 mm to 0.8 mm deep; 4 mm to 7 mm wide; and 7 mm to 15 mm long.

Each intermediate chamber may have rounded corners and/or inclined side walls.

Provision of an intermediate chamber may simplify production of the microfluidic device, e.g. compared to more structural complex solutions.

The intermediate chamber of each emulsification unit may comprise a plurality of intermediate chambers. The plurality of intermediate chambers may be provided in parallel. Each intermediate chamber of the plurality of intermediate chambers may have a longitudinal extension of at least: 5 mm, 6 mm, 8 mm, 10 mm, 15 mm, or 20 mm, and/or at most: 150 mm, 120 mm, 100 mm, 80 mm, or 50 mm.

Each intermediate chamber of the plurality of intermediate chambers may define a cross-sectional area perpendicular to the longitudinal extension, wherein the aggregated cross-sectional area of the plurality of intermediate chambers is at least: 0.1 $mm^2$, 0.2 $mm^2$, 0.25 $mm^2$, 0.5 $mm^2$, 1 $mm^2$, or 2 $mm^2$, and/or at most 4 $mm^2$.

The secondary supply container of each group of containers may comprise a bottom part, such as a flat bottom part. The bottom part may have a primary orifice and a secondary orifice. The primary orifice may provide fluid communication between the secondary supply container and the intermediate chamber of the corresponding emulsification unit. The secondary orifice may provide fluid communication between the secondary supply container and the secondary supply conduit. The primary orifice and the secondary orifice of a secondary supply container may be provided at least 2 mm apart, such as at least 3 mm apart, such as at least 5 mm apart. It may be desired to have the primary orifice and the secondary orifice of a secondary supply container being provided as far from each other as possible. Accordingly, the width of the bottom part of the secondary supply container may determine the possible separation of the primary orifice and the secondary orifice of the secondary supply container. The width of the bottom of a secondary supply container may for instance be 7 mm in diameter.

The microfluidic device according to the present invention may comprise a base microfluidic piece and a base container structure piece. The base microfluidic piece and the base container structure piece may be provided in the same material, e.g. PMMA.

At least a part of the emulsification section, such as comprising the base microfluidic piece, may comprise or be made of or provided in poly(methyl methacrylate), abbreviated PMMA. At least a part of the container section, such as comprising the base container structure piece, may comprise or be made of or be provided in PMMA. For instance, the base microfluidic piece and the base container structure piece may be provided in PMMA.

It may be desired to provide at least a part of the emulsification section and at least a part of the container section in the same material.

PMMA may be advantageous for fabrication because PMMA may be patterned using many different methods relevant both for prototyping and for high volume production, such as injection moulding, laser cutting, and machining.

PMMA may be advantageous for fabrication because it has a low glass transition temperature. Accordingly, it may be bonded at low temperature.

PMMA may be advantageous because it is may be adequately transparent within the visual spectrum to enable visual inspection of the process going on within the microfluidic device, which may be desired.

PMMA may be advantageous because it may be adequately UV-resistant. This may for instance be of relevance for storing in direct sunlight and/or in case of use with coatings requiring a UV curing step during production.

The base microfluidic piece may form a base part of the emulsification section. The base microfluidic piece may be provided with a first planar surface having a plurality of ramified recesses providing a base part of each fluid conduit network of the microfluidic device.

The base container structure piece may form a base part of the container section. Sidewalls of each container may be formed by protruding extensions of the base container structure piece. The base container structure piece may be formed in one piece, e.g. by being moulded. The base container structure piece may form a second planar surface facing the first planar surface of the base microfluidic piece. The microfluidic device may be provided with an adhesive layer between the first planar surface and the second planer surface.

This may facilitate that the container section and the emulsification section forms a fixedly connected unit and/or that each fluid conduit network do not have any undesired leaks at any boundary between the base microfluidic piece and the base container structure piece and/or facilitate a pressure tight connection. The second planar surface may form part of the emulsification section. The second planar surface may provide a capping part of each fluid conduit network of the microfluidic device.

One or more parts or all of each fluid conduit network may form an acute trapezoidal cross section, wherein the longer base edge is provided by the capping part. The acute trapezoidal cross section may form an isosceles trapezoidal cross section, wherein the side walls of equal length may have a tapering of at least 5 degrees and/or at most 20 degrees with respect to a normal of either of the parallel base edges.

Most of each intermediate chamber may be provided at a desired distance from a bottom part of the microfluidic device. This desired distance may be such that any material between most of the intermediate chamber and the bottom part of the microfluidic device is less than 5 mm, such as less than 2 mm, such as less than 1 mm.

Most of each intermediate chamber may be provided within 4 mm, such as within 2 mm, from a bottom part of the microfluidic device.

The microfluidic device may be configured to be placed on and/or coupled with a thermal surface that may provide thermal transfer with the microfluidic device, such as by cooling down the part of the microfluidic device being closest to the thermal surface. A bottom part of the microfluidic device, such as a bottom part of the emulsification section, may be flat. A bottom part of the emulsification section may be the part furthest from and/or facing away from the container section. A flat bottom part of the microfluidic device may be placed on a flat thermal surface. The first fluid, e.g. an aqueous fluid comprising a sample, may be injected into the intermediate chamber. A cold thermal surface may provide thermal transfer to the first fluid, e.g. comprising a sample, which may be heat sensitive. Accordingly, a reaction may be prevented or impeded from starting until the first fluid is emulsified. If the entire microfluidic device is cooled, then the second fluid, e.g. oil, will also be cold, will become more viscous, and the flow rate hereof will decrease or stop completely, which will hinder or make emulsification of the first fluid difficult.

An advantage with the present invention may be facilitation or inhibition of some reactions which may occur to a fluid contained by the microfluidic device prior to formation of emulsions. It may for instance be desired that the different fluids used with the microfluidic device are kept at different temperatures, e.g. at least until emulsion of the fluids are provided by means of the device. For instance, it may be desired that the first fluid, such as a water based fluid, such as comprising a sample, is kept at a lower temperature than the second fluid, such as an oil based fluid. The first fluid may comprise a heat sensitive sample. A sample may for instance be heat sensitive since a reaction within the sample may be triggered and/or intensified by heat, which may be undesired to occur prior to the formation of emulsions. It may be desired that the second fluid has a higher temperature than the first fluid, e.g. it may be desired that the second fluid is at room temperature, such as around 20° C., since the viscosity of e.g. oil may increase with decreased temperature, which may prevent or impede the oil from flowing through a respective fluid conduit network of the microfluidic device and/or which may require higher force, such as a higher applied pressure, for driving the oil through the fluid conduit network. The microfluidic device according to the present invention may facilitate some or all of the above-mentioned, in particular by provision of the intermediate chamber in combination with the secondary supply container according to the present invention.

A part of the primary supply conduit being provided at the secondary supply container may be denoted "primary supply inlet".

A part of the secondary supply conduit being provided at the secondary supply container may be denoted "secondary supply inlet".

A part of the fluid conduit network being provided at the collection container may be denoted "collection outlet".

The microfluidic device according to the present invention may be configured for provision of multiple emulsions, such as double emulsion. The plurality of supply conduits of each fluid conduit network may comprise a tertiary supply conduit. Each emulsification unit may comprise a collection conduit and a second fluid junction. The second fluid junction of each emulsification unit may provide fluid communication within the corresponding fluid conduit network between the tertiary supply conduit, the transfer conduit, and the collection conduit. The transfer conduit of each fluid conduit network may comprise a first transfer conduit part having a first affinity for water and extending from the corresponding first fluid junction. The collection conduit of each fluid conduit network may comprise a first collection conduit part extending from the corresponding second fluid junction and having a second affinity for water being different from the first affinity for water. The one or more supply containers of each group of containers may comprise a tertiary supply container being in fluid communication with the tertiary supply conduit of the corresponding emulsification unit. The collection container may be in fluid communication with the transfer conduit of the corresponding emulsification unit via the collection conduit of the corresponding emulsification unit.

An advantage of the present invention, such as provision of the first transfer conduit part having a first affinity for water and the first collection conduit part having a second affinity for water being different from the first affinity for water, may comprise that double emulsion droplets may be produced within one emulsification unit. This may in turn result in more uniform and/or monodisperse droplets. Connecting two individual microfluidic parts having different surface properties, as may be provided according to prior art solutions, may result in a flow of droplets with unequal spacing between the droplets, which may result in production of polydisperse droplets.

An enzyme having significant activity at room temperature may advantageously be used and/or provided with the present invention. A contact to a cold thermal surface may provide thermal transfer with the first fluid containing an enzyme and thereby impede the reaction until the first fluid is emulsified. The enzyme according to the present invention may consist of or comprise a polymerase such as a multiple displacement amplification polymerase, such as Phi29, a ligase, or a restriction enzyme such as Cas9.

The method according to the present invention for providing emulsion droplets may comprise use of the microfluidic device according to the present invention. The method may comprise providing the first fluid to the secondary supply container of a first group of containers and subsequently providing the second fluid to the secondary supply container of the first group of containers and subsequently providing a pressure difference between the secondary supply container of the first group of containers and the collection container of the first group of containers, such that the pressure within the secondary supply container of the first group of containers is higher than within the collection container of the first group of containers.

Accordingly, the pressure difference between the secondary supply container of the first group of containers and the collection container of the first group of containers may:

provide a primary flow of the first fluid from the intermediate chamber of the corresponding emulsification unit to the corresponding first fluid junction; and provide a secondary flow of the second fluid from the secondary supply container of the first group of containers to the first fluid junction via the secondary supply conduit.

The primary flow and the secondary flow may provide a collection flow of the first fluid and the second fluid to the collection container via the transfer conduit.

An advantage with the present invention may be that application of pressure difference between the one or more supply containers and the collection container may be simpler and/or easier, e.g. compared to a prior art microfluidic device having more containers for each sample line.

Each fluid conduit network may comprise: a plurality of supply conduits; a transfer conduit; a collection conduit; a first fluid junction; and a second fluid junction. The plurality of supply conduits may comprise a primary supply conduit, a secondary supply conduit, and a tertiary supply conduit. The transfer conduit may comprise a first transfer conduit part having a first affinity for water. The collection conduit may comprise a first collection conduit part having a second affinity for water being different from the first affinity for water. The first fluid junction may provide fluid communication between the primary supply conduit, the secondary supply conduit, and the transfer conduit. The first transfer conduit part may extend from the first fluid junction. The second fluid junction may provide fluid communication between the tertiary supply conduit, the transfer conduit, and the collection conduit. The first collection conduit part may extend from the second fluid junction.

Each group of containers may comprise a plurality of containers comprising a collection container and a plurality of supply containers. The plurality of supply containers may comprise a secondary supply container and a tertiary supply container. The container section and the emulsification section may be fixedly connected to each other. Each group of containers may be fixedly connected to a respective corresponding emulsification unit.

The collection container of each group of containers may be in fluid communication with the collection conduit of the corresponding emulsification unit. Accordingly, the collection conduit may provide fluid communication between the collection container and the second fluid junction.

The secondary supply container of each group of containers may be in fluid communication with the primary supply conduit of the corresponding emulsification unit. Accordingly, the primary supply conduit may provide fluid communication between the secondary supply container and the first fluid junction.

The tertiary supply container of each group of containers may be in fluid communication with the tertiary supply conduit of the corresponding emulsification unit. Accordingly, the tertiary supply conduit may provide fluid communication between the tertiary supply container and the second fluid junction.

The secondary supply container of each group of containers may be in fluid communication with the secondary supply conduit of the corresponding emulsification unit. Accordingly, the secondary supply conduit may provide fluid communication between the one supply container and the first fluid junction.

The microfluidic device according to the present invention may be denoted “cartridge” or “microfluidic cartridge”. A first part of the microfluidic device, comprising the plurality of emulsification units, may be denoted “emulsification section”. A second part of the microfluidic device, comprising the plurality of groups of containers, may be denoted “well section”. The second part of the microfluidic device may be different from and may not comprise the first part of the microfluidic device. The emulsification section and/or an emulsification unit may be denoted “chip”, “microchip”, or “microfluidic chip”.

The base microfluidic piece may be formed in one piece, such as being moulded, such as being provided via injection-moulding. The base microfluidic piece may form part of the emulsification section. The base microfluidic piece may comprise each emulsification unit of the microfluidic device.

The base container structure piece may be formed in one piece, such as being moulded, such as being provided via injection-moulding. The base container structure piece may form part of the container section. The base container structure piece may comprise each container of the microfluidic device.

The emulsification section and the container section may be fixedly connected to each other.

Each emulsification unit may form a fluid connection between the individual containers of the corresponding group of containers. A group of containers and an emulsification unit may be denoted “corresponding” if fluid connection is provided between them. Each group of containers of the plurality of group of containers may form part of a functional unit in combination with the respective corresponding emulsification unit of the plurality of emulsification units. Such functional unit may be denoted “droplet generating unit” and/or “sample line”. The sample lines may be isolated from each other such that any sharing of liquids is prevented.

Provision of a plurality of sample lines may facilitate individual and/or parallel processing of several samples.

The microfluidic device may be intended for single use, i.e. each sample line may be intended to be used only once. This may provide a low risk of contamination of results.

The term “microfluidic” may imply that at least a part of the respective device/unit comprises one or more fluid conduits being in the microscale, such as having at least one dimension, such as width and/or height, being smaller than 1 mm and/or a cross-sectional area smaller than 1 $mm^2$. The smallest dimension, such as a height or a width, of at least one part of the fluid conduit network, such as a conduit, an opening, or a junction, may be less than 500 μm, such as less than 200 μm.

The term “microfluidic” may imply that the volume of the respective part is relatively small. The volume of each fluid conduit network, except for any intermediate chamber, may be between 0.05 μL and 2 μL, such as between 0.1 μL and 1 μL, such as between 0.2 μL and 0.6 μL, such as around 0.3 μL.

The behaviour of fluids at the microscale, such as may be provided by the fluid conduit network of the device of the present invention, may differ from “microfluidic” behaviour of factors such as surface tension, energy dissipation, and/or fluidic resistance that may start to dominate the system. At small scales, such as when a conduit according to the present invention, such as the transfer conduit, has a diameter, height, and/or width of around 100 nm to 500 μm, the Reynolds number may become very low. A key consequence hereof may be that co-flowing fluids do not necessarily mix as at macro scale, as flow may become laminar rather than turbulent.

Consequently, when two immiscible fluids, e.g. the first fluid, such as an aqueous phase, and e.g. the second fluid, such as an oil phase, meet at a junction, parallel laminar flows may result, which again may result in stable production of monodisperse droplets. At a larger scale, the immiscible liquids may mix at the junction, which may result in polydisperse droplets.

The microfluidic device according to the present invention may be configured for provision of double emulsion droplets. Double emulsion droplets may refer to droplets wherein an inner, dispersed phase is surrounded by an immiscible phase which again is surrounded by a continuous phase. The inner dispersed phase may comprise and/or consist of one droplet. The inner phase may be an aqueous phase in which salts, nucleotides, and enzymes may be or is dissolved. The immiscible phase may be an oil phase. The continuous phase may be an aqueous phase.

An embodiment of the microfluidic device according to the present invention may be configured for triple emulsions, quadruple emulsions, or a higher number of emulsions.

The microfluidic device may comprise an upper side and a lower side. The upper side may be configured for accessing each container, e.g. by means of a pipette.

The plurality of emulsification units may comprise and/or consist of eight emulsification units. An advantage of provision of exactly eight units may be facilitation of use of state of the art equipment, such as an 8-channel pipette.

A lower part and/or an upper part of each emulsification unit may be provided by the base microfluidic piece.

The fluid conduit network may form a network of conduits that intersect at junctions, comprising the first fluid junction and the second fluid junction.

Any one or more conduits of the fluid conduit network may comprise one or more parts, such as channels, having substantially uniform diameter.

A diameter of any part of the fluid conduit network may refer to the width and/or height and/or any other cross-sectional dimension of the fluid conduit network.

The fluid conduit network may comprise conduits having a varying diameter. Parts of the fluid conduit network having a relatively high diameter may provide transport of liquid at a relatively low resistance resulting in higher volumetric flow. Parts of the fluid conduit network having a relatively small diameter may enable provision of a desired size of the generated droplets.

A cross sectional area of a part of the fluid conduit network, such as of a conduit thereof, may refer to the area of a cross section defined perpendicular to the one or more walls of e.g. the respective conduit or at least one wall part of e.g. the respective conduit.

The fluid conduit network may comprise conduits having a varying cross-sectional area. Parts of the fluid conduit network having a relatively large cross-sectional area may provide transport of liquid at a relatively low resistance resulting in higher volumetric flow e.g. at application of different pressure at opposing ends of a conduit. Parts of the fluid conduit network having a relatively small cross-sectional area may enable provision of a desired size of the generated droplets.

The first transfer conduit part may have a cross-sectional area of 150-300 $\mu m^2$ and the first collection conduit part may have a cross-sectional area of 200-400 $\mu m^2$. This may facilitate that the droplets generated have a diameter of the inner droplet of 10 to 25 μm and an outer total diameter of the inner droplet plus shell layer of 18 to 30 μm.

The fluid conduit network may comprise nozzles and/or chambers. A nozzle may comprise a constriction in a conduit of smaller cross-sectional area than the conduit on both sides of the nozzle. A nozzle may facilitate production of a smaller size droplet than what otherwise could be expected from the conduit cross-sectional area. This may in turn enable use of conduits having larger cross-sectional area with lower resistance. A chamber may be an area within the emulsification unit designed to hold a volume of liquid to delay the liquid or to temporarily store liquid within the emulsification unit. Such a chamber may be an advantage as it may delay liquid from one or more conduits relative to other conduits which may ensure the correct timing of liquids at the respective junctions.

A supply conduit of an emulsification unit may refer to any one, more, or all of the following: the primary supply conduit, the secondary supply conduit, and the tertiary supply conduit.

A supply inlet of an emulsification unit may refer to any one, more, or all of the following: the primary supply inlet, the secondary supply inlet, and the tertiary supply inlet.

A supply opening of an emulsification unit may refer to any one, more, or all of the following: the primary supply opening, the secondary supply opening, and the tertiary supply opening.

A conduit of an emulsification unit may refer to any one, more, or all of the following: the transfer conduit, the collection conduit, the primary supply conduit, the secondary supply conduit, and the tertiary supply conduit.

An opening of a conduit of an emulsification unit may refer to any one, more, or all of the following: the first transfer opening, the second transfer opening, the collection opening, the primary supply opening, the secondary supply opening, and the tertiary supply opening.

The first fluid junction and/or the second fluid junction may be denoted "fluid junction". Each fluid junction may be defined by a plurality of openings of conduits, which conduits may be considered to intersect or meet each other.

Each fluid junction may comprise a plurality of openings for leading fluid into the junction and one opening for leading fluid out of the junction.

Each fluid junction may enable immiscible fluids from two or more conduits to come into direct fluid contact and interact. Accordingly, a stream of alternating liquid portions or droplets may be provided. While within a relatively narrow conduit, a droplet may be oblong.

Formation of droplets comprising double emulsion droplets may be initiated starting from the second fluid junction and may be completed within or after the junction in the direction of the fluid exiting the junction, i.e. along the collection conduit.

The first transfer conduit part may be a part of the transfer conduit where droplets formed from a first liquid being immiscible with a second liquid. The first transfer conduit part may have a first affinity for water that enables formation and/or durability of droplets in the first transfer conduit part. This first affinity for water may correspond to hydrophobic properties allowing formation of water droplets in oil such as fluorocarbon oil.

Affinity for water may be known as wettability for water. A high affinity for water may refer to high wettability for water. A low affinity for water or lack of affinity for water may refer to a low wettability for water.

The first collection conduit part may be a part of the collection conduit where an emulsion comprising double emulsion droplets is formed. The first collection conduit part may have a second affinity for water that enables formation and/or durability of double emulsion droplets in the first collection conduit part. This second affinity for water may correspond to hydrophilic properties allowing formation of aqueous droplets surrounded by an oil shell in a continuous aqueous phase.

The secondary supply conduit may comprise a second secondary supply conduit. Such second secondary supply conduit may be extending from the secondary supply inlet to a second secondary supply opening. The first plurality of openings of the first fluid junction may comprise the second secondary supply opening. Provision hereof may improve generation of droplets by pinching from more than one side at the first junction. Accordingly, pinching of the second fluid onto the first fluid may be carried out from the first fluid junction by means of the combination of the first secondary supply conduit and the second secondary supply conduit, which both may extend between the secondary supply container and the first supply conduit.

Any pinching parts, such as the first secondary supply conduit and the second secondary supply conduit, may be configured to have the same fluid resistance for the respective fluid, e.g. the second fluid. This may be to facilitate uniform effect within and after the respective fluid junction. Any pinching parts may be configured to have the same volume to facilitate that the respective fluid, e.g. the second fluid, will arrive to the respective fluid junction, e.g. the first fluid junction, at the same time. Accordingly, pinching of the third fluid onto the mixture of the first fluid and the second fluid may be carried out from the second fluid junction by means of the combination of the first tertiary supply conduit and the second tertiary supply conduit, which both may extend between the tertiary supply container and the second supply conduit.

The tertiary supply conduit may comprise a second tertiary supply conduit. Such second tertiary supply conduit may be extending from the tertiary supply inlet to a second tertiary supply opening. The second plurality of openings of the second fluid junction may comprise the second tertiary supply opening. Provision hereof may improve generation of droplets by pinching from more than one side at the second junction.

The first transfer conduit part may extend to the second transfer opening. Alternatively, the transfer conduit may comprise a second transfer conduit part, e.g. extending from a second end of the first transfer conduit part, which second end may be opposite of the first transfer opening, and e.g. extending to the second transfer opening. Such second transfer conduit part may have an affinity for water being different from the first affinity for water.

For one or more embodiments, a part of the transfer conduit and/or a part of the collection conduit may have further supplies of fluid.

The first collection conduit part may be extending to the collection outlet.

The first transfer conduit part may refer to a first zone immediately following the first fluid junction along the intended direction of the fluid flow where formation of aqueous droplets in oil carrier fluid may occur.

The first collection conduit part may refer to a second zone immediately following the second fluid junction in the intended direction of the fluid flow where formation of double emulsion aqueous droplets surrounded by an oil shell in an aqueous carrier fluid may occur.

Formation of single emulsions of the first fluid emulsified in the second fluid may be initiated at first junction and may be continued within the first transfer conduit part. Accordingly, after the first transfer conduit part, the first fluid may be in the dispersion phase, whereas the second fluid is in the continuous phase. Formation of double emulsions may be initiated at second junction and may be continued within first collection conduit part. Accordingly, after the first collection conduit part, the third fluid may be in the continuous phase and may be emulsifying the second fluid, which may form a shell layer around the first fluid.

The first affinity for water may be defined as having a lack of affinity for water, i.e. such as being hydrophobic. The first affinity for water may describe a surface having a contact angle for water of more than 60°, such as more than 65°, such as more than 70°, such as more than 90°. A higher contact angle may provide a more stable provision of droplets, i.e. such as single emulsion water-in-oil droplets. This in turn may enable a wider range of pressures to be utilized and/or a higher percentage of double emulsion droplets provided according to desired dimensions.

A contact angle may be measured on a surface as described in Yuan Y., Lee T. R. (2013) Contact Angle and Wetting Properties. In: Bracco G., Holst B. (eds) Surface Science Techniques. Springer Series in Surface Sciences, vol 51. Springer, Berlin, Heidelberg. A contact angle within a closed volume, such as a conduit, may be measured as described in Tan, Say Hwa et al. Oxygen Plasma Treatment for Reducing Hydrophobicity of a Sealed Polydimethylsiloxane Microchannel. Biomicrofluidics 4.3 (2010): 032204. PMC.

The second affinity for water may be defined as having a strong affinity for water, i.e. such as being hydrophilic. The second affinity for water may describe a surface having a contact angle for water of less than 60°, such as less than 55°, such as less than 50°, such as less than 40°, such as less than 30°. A lower contact angle may provide a more stable provision of double emulsion droplets, i.e. e.g. water-in-oil-in-water double emulsion droplets.

This in turn may enable a wider range of pressures to be utilized and/or a higher percentage of double emulsion droplets provided according to desired dimensions.

Having one affinity for water being different from another affinity for water may be understood as having opposite affinities for water or oppositely defined affinities, such as affinity high vs. low affinity. For instance, if the first affinity for water is hydrophobic, then the second affinity for water may be hydrophilic, and vice versa.

Provision of the first affinity for water may for instance be provided by polymers such as PMMA (Poly(methyl methacrylate)), Polycarbonate, Polydimethylsiloxane (PDMS), COC Cyclic Olefin Copolymer (COC) e.g. including also TOPAS, COP Cyclo-olefin polymers (COP) including ZEONOR®, Polystyrene (PS), polyethylene, polypropylene, and negative photoresist SU-8.

Provision of the first affinity for water may alternatively, or additionally, be provided by a material such as glass e.g. treated using a method to make the surface hydrophobic, such treated as using siliconization, silanization, or coating with amorphous fluoropolymers.

Provision of the first affinity for water may alternatively, or additionally, be provided by coating the surface to make it hydrophobic by applying a layer of Aquapel, sol-gel coating, or by deposition of thin films of gaseous coating material.

Provision of the second affinity for water may for instance be provided by materials including glass, silicon, or other materials providing hydrophilic properties.

Provision of the second affinity for water may alternatively, or additionally, be provided by modifying the surface using oxygen plasma treatment, UV irradiation, UV/ozone treatment, UV-grafting of polymers, deposition of Silicon dioxide ($SiO_2$), deposition of thin films such as Silicon dioxide by chemical vapor deposition (CVD) or plasma-enhanced chemical vapor deposition (PECVD).

Any supply container or collection container may be referred to as "a well". The term "well" may refer to any one, more, or all of the following: the collection container, the secondary supply container, and the tertiary supply container.

A well or container may be a structure suitable for accepting and containing a liquid, such as an aqueous sample, an oil, a buffer, or an emulsion.

A well may have one or more openings. One opening may be configured for providing or extracting liquid to or from the well, e.g. by top-loading/extracting using a pipette. Another opening may enable liquid held by the respective well to exit the well e.g. actively, such as when subjected to a pressure difference.

The secondary supply container may be configured for holding a first fluid, such as a sample buffer. A fluid held by the secondary supply container may be guided by the corresponding emulsification unit towards the corresponding collection container.

The tertiary supply container may be configured for holding a third fluid, such as a buffer. A fluid held by the tertiary supply container may be guided by the corresponding emulsification unit towards the corresponding collection container.

The secondary supply container is in fluid communication with the secondary supply inlet of the corresponding emulsification unit. This secondary supply container is configured for holding a second fluid, such as oil. A fluid held by the secondary supply container may be guided by the corresponding emulsification unit towards the corresponding collection container.

The collection container may be configured for collecting the fluids from the supply containers. This fluid may comprise double emulsion droplets provided by the device according to the present invention during use. The double emulsion droplets may be suspended in a continuous fluid, such as a buffer.

The secondary supply container may be configured to contain a first supply volume. The tertiary supply container may be configured to contain a third supply volume. The collection container may be configured to contain a collection volume. The collection volume may be larger, such as at least 5% larger, than the sum of the volumes contained by the corresponding supply containers, such as the first supply volume, the second supply volume, and the third supply volume.

The first supply volume may e.g. be between 100 and 500 μL, such as between 200 and 400 μL.

The third supply volume may e.g. be between 150 and 800 μL, such as between 300 and 500 μL.

The collection volume may e.g. be between 250 and 1000 μL, such as between 400 and 800 μL.

During use of the device according to the present invention, liquid may be transferred from each of the supply containers to the collection container.

Liquid contained by the collection container may be collected using a pipette. When a tip of a pipette is inserted into the collection container for collecting liquid, then liquid may be displaced by the pipette tip. Accordingly, having a collection volume being larger than the sum of the volumes contained by the supply containers may prevent overflow of liquid from the collection container during collection hereof.

A bottom part of the first supply container may be rounded. This may be for ensuring essentially complete entry of the first liquid contained by the first supply container into the corresponding emulsification unit when pressure is applied to the container. Since the first liquid may contain a sample, it may be advantageous that all or essentially all the first liquid is utilized.

The containers, e.g. each supply container or each container of each group of containers, may for instance be provided in a grid, such as rows and columns, where the spacing between adjacent containers may be the same along two orthogonal directions.

The containers, e.g. each supply container or each container of each group of containers, may be provided in a standard container plate layout, such as defined as published by American national standard institute on behalf of Society for Biomolecular Screening. Accordingly, the distance between the center of adjacent containers in any of two orthogonal directions may be 9 mm.

The distance between the center of the first supply containers of adjacent emulsification units may be 9 mm.

The containers may for instance have any suitable shape, such as a cylinder with a round opening at the top. The containers may be tapered towards the bottom of the container, i.e. with a larger opening at the top than at the bottom. An advantage of a tapered container or a tapered bottom of the container may be to assure a complete withdrawal of the liquids during operation. The opening of the containers at the top may have a size suitable for dispensing and removing liquids using a standard micropipette.

The top of each container may be at the same level. This may facilitate provision/extraction of fluid from the respective containers.

The bottom of the collection container may be provided at a lower level than the collection outlet. An advantage hereof may be that double emulsion droplets may be moved from the fluid conduit network into a part of the collection container that may be isolated from the fluid conduit network in order to prevent backflow of double emulsion droplets in the fluid conduit network. Accordingly, low droplet loss may be provided. The volume of the lower part, e.g. bottom part, of the collection container may be at least 200 μL.

A lower part and/or an upper part of each group of containers may be provided by the base container structure piece.

The top of the base container structure piece may accommodate a substantially flat gasket.

The gasket may be a separate part and the base container structure piece may have features/protrusions that allow the reversible fixation of the gasket. Protrusions may have any suitable shape and size. In some embodiments, each column might have a set of protrusions. An advantage hereof may be that only a single or a defined number of columns may be opened at a time.

A set of protrusions may be constituted by any number of protrusions such as one, a pair or more. A pair of protrusion may comprise two identical structures or two different structures such as a hook and a pin. An advantage of using a pair of protrusions may be to enable the opening of for example only the outlet container.

"Fixedly connected" may for instance comprise being connected via one or more additional structures, e.g. via one or more interface structures and/or via a capping piece fixed to or forming part of a base microfluidic piece.

The base container structure piece and the base microfluidic piece may for instance be fixedly connected to each other using one or more attachment elements, such as screws, and/or by being clamped by a clamping structure.

An advantage of having the base container structure piece and the base microfluidic piece fixedly connected to each other may be that the microfluidic device may be handled as a single piece by a user.

The microfluidic device may comprise one or more interface structures configured for coupling the plurality of emulsification units, such as the base microfluidic piece or a structure comprising or coupled to the base microfluidic piece, to the plurality of groups of containers, such as the base container structure piece. Such one or more interface structures may provide an air and liquid tight coupling between each of the respective containers and the corresponding inlets/outlets of the corresponding emulsification units.

The one or more interface structures may form part of the plurality of emulsification units or the plurality of groups of containers, such as the base container structure piece.

The one or more interface structures may be provided in form of a gasket, such as a flat sheet of an elastomeric material. The gasket may have coupling perforations, e.g. of diameter 0.2 to 1 mm, for provision of fluid connections. There may be one coupling perforation for each fluid connection between a container and a corresponding inlet/outlet of the corresponding emulsification unit. For instance, in case of 4 containers for each group of containers and 8 emulsification units, and thus also 8 groups of containers, there may be 4×8 coupling perforations.

The one or more interface structures may be moulded-on, e.g. onto a structure comprising or forming part of the plurality of groups of containers, such as the base container structure piece. This may facilitate assembly of the cartridge.

The one or more interface structures may be made of an elastomeric material, which may be desired to be resistant to the chemicals and reagents applied to the device such as to the containers of the device with the purpose of producing droplets e.g. oils and buffers. The elastomeric material may for instance be or comprise any one or more of: natural rubber, silicone, ethylene propylene diene monomer styrenic block copolymers, olefinic copolymers, thermoplastic vulcanizates, thermoplastic urethanes, copolyesters, or copolyamides.

The one or more interface structures may be provided with one or more attachment perforations for enabling attachment elements, such as screws, to pass through the gasket. Such one or more attachment perforation may be of 1 to 8 mm such as 6 mm in diameter.

It has been observed by the inventors that droplets tend to get a cross-sectional area at the droplet center, i.e. the inner droplet, of slightly more than the cross-sectional area of the first transfer conduit part, which is provided after the first fluid junction in the intended direction of flow. This may be because the droplet is elongated while being subject to a flow in the respective conduit. Likewise, it has been observed by the inventors that droplets tend to get a cross-sectional area, i.e. the inner droplet plus the outer shell, of slightly more than the cross-sectional area of the first collection conduit part, which is provided after the second fluid junction in the intended direction of flow.

To get smaller droplets than this, a jet stream may be required, which requires a lot of the second fluid and/or the third fluid, respectively, which may be undesired. It may be advantageously, to provide a device and a method having a low requirement for amounts of buffers and oils.

Accordingly, the cross-sectional areas defined perpendicular to the intended direction of flow of the first transfer conduit part and the first collection conduit part, respectively, may be of relevance. Each may be desired to be slightly smaller in cross-sectional area than the desired cross-sectional areas of the respective droplets, i.e. inner droplet and inner plus outer droplet, as defined through their respective droplet center.

The first transfer conduit part and the first collection conduit part of each emulsification unit may be configured to retain their respective affinity for water for at least one month of storage from time of provision of the respective parts.

A respective affinity for water may be considered as retained if the respective contact angle hereof remains within the limit-value defined in the present disclosure for the respective affinity for water.

A respective affinity for water may be considered as retained if the respective contact angle hereof does not change from below a lower limit to above a higher limit, or vice versa. The lower limit and the higher limit may be equal, such as 60°. The lower limit may for instance be 55° or 50°. The upper limit may for instance be 65° or 70°.

The storage conditions may be 18° C. to 30° C., 0.69 atm to 1.1 atm.

The first transfer conduit part may e.g. be configured to retain the first affinity for water by being provided of a base material produced from polymers such as any one or combination of PMMA (Poly(methyl methacrylate)), Polycarbonate, Polydimethylsiloxane (PDMS), COC Cyclic Olefin Copolymer (COC) e.g. including also TOPAS, COP Cycloolefin polymers (COP) including ZEONOR®, Polystyrene (PS), polyethylene, polypropylene, and negative photoresist SU-8.

The first transfer conduit part may e.g. be configured to retain the first affinity for water by being provided of a material such as glass or polymers treated using a method to make the surface hydrophobic such as using siliconization, silanization, or coating with amorphous fluoropolymers.

The first transfer conduit part may e.g. be configured to retain the first affinity for water by being provided of a base material coated by applying a layer of Aquapel, sol-gel coating, or by deposition of thin films of gaseous coating material.

The first collection conduit part may e.g. be configured to retain the second affinity for water by being provided of materials including glass, silicon, or other materials providing hydrophilic properties.

The first collection conduit part may e.g. be configured to retain the second affinity for water by being provided of a base material modified using oxygen plasma treatment, UV irradiation, UV/ozone treatment, UV-grafting of polymers, Deposition of Silicon dioxide ($SiO_2$), deposition of thin films such as Silicon dioxide by chemical vapor deposition (CVD) or PECVD.

A base material for a microfluidic device may comprise any of the following: thermoplastic, elastomers such as PDMS, thermoset, SU-8 photoresist, glass, silicon, paper, ceramic, or a hybrid of materials e.g. glass/PDMS. Thermoplastic may comprise any of the following: PMMA/acrylic, polystyrene (PS), Polycarbonate (PC), COC, COP, polyurethane (PU), poly-ethylene glycol diacrylate (PEGDA), and Teflon.

The time of provision of the respective parts may be defined as the time of provision of the coating, even if a coating is only applied to one of the first collection conduit part and the first transfer conduit part.

A high degree of stability of the surface properties of the first transfer conduit part and the first collection conduit part may enable a long shelf life of the microfluidic device.

One, more, or all parts of the microfluidic device, such as the base container structure piece and/or the base microfluidic piece, may be provided using injection moulding. Injection moulding may become more cost efficient at higher volumes, which may lead to a larger volume on stock and may therefore require a long shelf life.

The surface properties of the first transfer conduit part of each emulsification unit may be provided by a coating, e.g. provided on top of a substrate. Alternatively, or in combination, the surface properties of the first collection conduit part of each emulsification unit may be provided by a coating, e.g. provided on top of a substrate. The substrate may provide the surface properties of either the first transfer conduit part or the first collection conduit part of each emulsification unit. The substrate may be provided in a base material such as described in the present disclosure.

Accordingly, the coating may be provided on a substrate, such that the coating constitutes either the first transfer conduit part or the first collection conduit part while the substrate constitutes the other.

The coating may be provided on a polymer by subjecting the polymer to plasma treatment followed by chemical vapour deposition, e.g. plasma enhanced chemical vapour deposition, wherein the chemical vapour deposition may comprise using $SiO_2$.

The coating may alternatively, or additionally, be provided onto a glass or polymer surface by subjecting both the first transfer conduit part and the first collection conduit part to coating such as siliconization, silanization, or coating with amorphous fluoropolymers followed by removal of the coating from the first collection conduit part e.g. using a chemical such as sodium hydroxide.

The coating may have a thickness of less than 1 μm, such than less than 500 nm, such as less than 250 nm. A thin coating may be achieved using chemical vapour deposition rather than physical vapour deposition.

An advantage of providing a thin coating may be that the diameter or cross-sectional area of the respective part of the fluid conduit network may be affected to a low degree. Accordingly, the fluid conduit network may be provided with a diameter disregarding that a coating may be applied subsequently. Accordingly, similar cross-sectional area in coated and non-coated parts may be provided.

The first transfer conduit part may be provided with stable hydrophobic surface properties. The first collection conduit part may be provided with stable hydrophilic surface properties.

The emulsification section may comprise a base microfluidic piece providing at least a part of each of: the primary supply conduit of each emulsification unit; the secondary supply conduit of each emulsification unit; the tertiary supply conduit of each emulsification unit; the transfer conduit of each emulsification unit; the collection conduit of each emulsification unit; the first fluid junction of each emulsification unit; and the second fluid junction of each emulsification unit.

The base microfluidic piece may be provided in a base material having surface properties corresponding to the first affinity for water, wherein at least a part of the coating providing the first collection conduit part is provided on top of the base material of the base microfluidic piece. Alternatively, the base microfluidic piece may be provided in a base material having surface properties corresponding to the second affinity for water, wherein at least a part of the coating providing the first transfer conduit part is provided on top of the base material of the base microfluidic piece.

The base microfluidic piece may provide at least a part of each of: the primary supply conduit of each emulsification unit; the secondary supply conduit of each emulsification unit; the tertiary supply conduit of each emulsification unit; the transfer conduit of each emulsification unit; the collection conduit of each emulsification unit; the first fluid junction of each emulsification unit; and the second fluid junction of each emulsification unit.

The base microfluidic piece may be provided in a base material having surface properties corresponding to the first affinity for water.

The coating may be provided on the base material of the base microfluidic piece at the area providing at least a part of the first collection conduit part. The coating may provide a surface exhibiting the second affinity for water.

Different materials may be used for the container section and the emulsification section. Accordingly, optimal materials for both the larger and deeper features of the container section and the very fine features of the emulsification section may be provided. Provision of two or more parts may lower production cost as the tools for the base container structure piece and the microfluidics section may have different tolerances.

Different materials may be used for the container section and the emulsification section. Use of different materials, for the container section and the emulsification section may enable use of different desired materials for the respective parts.

The container section may comprise relatively large and deep features while the emulsification section may comprise very fine features.

Provision of the container section and the emulsification section in different structures, which may be fixedly connected subsequently, may lower production cost as the tools needed for provision of the container section and the microfluidics section may have different tolerances.

The emulsification section may e.g. be made from glass or polymer material.

Examples of polymer materials, which may be used for the emulsification section may comprise any of the following: poly(methyl methacrylate) (PMMA), cyclic olefin copolymer (COC), cyclic olefin polymer (COP), polystyrene, polyethylene, polypropylene, polyethylene terephthalate (PET), polycarbonate (PC), polytetrafluoroethylene (PTFE). The use of polymers may be limited by their properties to be compatible with the sample, oil, and continuous phase buffer in use with the present invention, e.g. including NOVEC oil. Furthermore, use of polymers may be limited by the applicable prior art manufacturing and patterning techniques. COPs and COCs over for example PDMS may have the advantages that they have excellent transparency, near zero birefringence, low density, low water uptake, good chemical resistance, low binding of proteins, halogen-free, BPA-free, and are suited to standard polymer processing techniques such as single and twin-screw extrusion, injection moulding, injection blow moulding and stretch blow moulding (ISBM), compression moulding, extrusion coating, biaxial orientation, thermoforming and many others. COC and COP are noted for high dimensional stability with little change seen after processing. COC may in some applications be preferred over COP. COP may tend to crack if exposed to oil, such as oil which may be intended for use with the present invention. COP may crack when exposed to fluorocarbon oil such as NOVEC oil. COP may be compatible with reagents for PCR such as enzymes and DNA. COC and COP have glass transition temperatures which are typically in the range of 120-130° C. This may render them unsuitable for typical CVD coating as CVD processes are typically operated at above 300° C. and would therefore melt the COC or COP materials. This disadvantage of COC and COP may have been overcome in the present invention e.g. by applying a modified PECVD procedure operating at 85° C. COC are possibly not compatible with laser cutting as the laser may cause "burning" of the material. This disadvantage has been overcome according to the present invention e.g. using injection moulding.

Glass may alternatively, or additionally, be used as substrate with desired coating as explained for the emulsification section.

Polydimethylsiloxane (PDMS) is often utilized for microfluidic parts. However, the inventors of the present invention have associated the following disadvantages of using PDMS:

Change of material properties over the time (source: http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)

- Long process time (curing time of PDMS: 30 min to several hours, depending on the temperature, material stiffness required. (source Becker 2008)
- High manufacturing cost (source: Berthier, E., E. W. K. Young, et al. (2012). "Engineers are from PDMS-land, Biologists are from Polystyrenia." Lab on a Chip 12(7): 1224-1237.)
- Cost per device remains the same, even for higher volumes of production, (source: Becker, H. and C. Gartner (2008). "Polymer microfabrication technologies for microfluidic systems." Analytical and Bioanalytical Chemistry 390(1): 89-111. AND Berthier, E., E. W. K. Young, et al. (2012). "Engineers are from PDMS-land, Biologists are from Polystyrenia." Lab on a Chip 12(7): 1224-1237.)
- PDMS might absorb some molecules (e.g. proteins) at the surface. (source: Berthier 2012 AND http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)
- PDMS is permeable for water vapour, which lead to evaporation in the conduit. (source: http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)
- PDMS is deformable. So, the shape of the fluid conduit network might change/deform under pressure, i.e. under operation of the device (source Berthier 2012)
- Risk of leaching of non-cross linked monomers into the conduits (source Berthier 2012 AND http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)

Any opening of the first plurality of openings of the first fluid junction of each emulsification unit may have a cross-sectional area being smaller than 2500 $\mu m^2$. For each emulsification unit, the cross-sectional area of any opening between any supply conduit and the first fluid junction may be smaller than 2500 μm2. An advantage hereof may be that droplets provided by the device according to the present invention may be small enough for fluorescence-activated cell sorting (FACS).

The first transfer opening of each emulsification unit may have a cross-sectional area being smaller than 2500 $\mu m^2$. For each emulsification unit, the cross-sectional area of an opening between the first fluid junction and the transfer conduit may be smaller than 2500 $\mu m^2$. An advantage hereof may be that droplets provided by the device according to the present invention may be small enough for fluorescence-activated cell sorting (FACS).

The first transfer opening of each emulsification unit may have a cross-sectional area being between 50% and 100% of the cross-sectional area of the second transfer opening of the corresponding emulsification unit. For each emulsification unit, the cross-sectional area of an opening between the first fluid junction and the transfer conduit may be between 50% and 100% of the cross-sectional area of an opening between the second fluid junction and the collection conduit. An advantage hereof may be that droplets provided by the device according to the present invention may have a shell thickness resulting in stable droplets that are not too large for FACS.

If the cross-sectional area of the opening leading in to the second junction is smaller than or equal to the cross-sectional area of the opening leading out of the first junction, droplet production may become unstable. If it is a too much larger than the first junction, the oil shell may become thicker than desired.

The emulsification section may comprise a first planar surface, which may be provided by the base microfluidic piece, and a capping piece providing a second planar surface. The first planar surface of the base microfluidic piece may have a plurality of ramified recesses providing a base part of each fluid conduit network of the microfluidic device. The second planar surface may face the first planar surface. The second planar surface may provide a capping part of each fluid conduit network of the microfluidic device. The capping piece may comprise a third planar surface facing the container section.

The base microfluidic piece may be provided with a first planar surface having a plurality of ramified recesses providing a base part of each of the fluid conduit networks of the microfluidic device. The microfluidic device may furthermore comprise a capping piece having a second planar surface facing the first planar surface of the base microfluidic piece. The second planar surface of the capping piece may provide a capping part of each of the fluid conduit networks of the microfluidic device. The capping piece may have a third planar surface facing the base container structure piece.

The base microfluidic piece may be provided by a base substrate. The capping piece may be provided by a capping substrate.

One, more, or all parts of each fluid conduit network may form an acute trapezoidal cross section, wherein the longer base edge may be provided by the second planar surface of the capping piece The cross-section of the fluid conduit network may vary between different parts of the network. It may be rectangular, square, trapezoidal, oval or any shape suitable to the droplet formation. In some examples, a conduit may have four walls with two of the walls provided in parallel or coplanar to each other. An acute trapezoidal cross section, such as wherein the longer base edge is formed by a cover section, may have the advantage that deposition of coating may be more even on the walls and bottom of a conduit as compared e.g. to a square, rectangular or oval shape. A higher draft angle of the conduit wall may result in a more even layer of coating than a lower draft angle and/or may facilitate ejection of the conduit structure from a mould without changing the dimensions of the conduits. The conduit walls may have a draft angle of 5-45 degrees, such as 10-30 degrees.

The acute trapezoidal cross section may form an isosceles trapezoidal cross section, wherein the side walls of equal length may have a tapering of at least 5 degrees and at most 20 degrees with respect to a normal of either of the parallel base edges. This may also be denoted "draft angle". An advantage hereof may be that it may be easier to apply a coating to the base microfluidic piece such that a desired thickness is applied to a bottom part as well as side parts. Furthermore, if the base microfluidic piece is provided by means of moulding, such as injection moulding, it may be easier to extract the base microfluidic piece from the mould during manufacture of the microfluidic device.

A typical result of an injection moulding sharp corners in the bottom with a tapering of 5-20 degrees. The upper part of the walls, towards the capping piece, may be rounded, but this may still provide a tapering of more than five degrees.

Milled conduits would in most cases not be tapered whereas conduits edged in glass may have round corners at the bottom, such as like the bottom of a U.

Each emulsification unit may comprise a primary filter at or within the primary supply conduit. Each emulsification unit may comprise a secondary filter at or within the secondary supply conduit. Each emulsification unit may comprise a tertiary filter at or within the tertiary supply conduit.

Any one, more or all of: the primary filter, the secondary filter, and the tertiary filter may be denoted “filter”.

Each or any filter may comprise a structure that obstructs passage of particles having a dimension higher than a filter threshold value. The filter threshold value may for instance be the volume of the smallest of first and the second fluid junction and/or the smallest diameter or cross-sectional area of the fluid conduit network. A filter may provide a network of flow lines/conduits smaller than filter threshold value. A filter may for instance be provided by a plurality of pillars.

Each or any filter may be provided as a plurality of rows of a plurality of pillars with the height equal to the conduit depth at the pillars, a diameter between 5 and 16 μm, and a pitch, i.e. distance between the centre of each pillar, of 15 to 100 μm. The pillars may be in form of cylinders, i.e. with a constant diameter throughout the height or be tapered towards the top of the conduit, i.e. with a diameter larger at the bottom of the pillar compared to the diameter at the top of the pillar. Pillar filters have the advantage of trapping particles of many different sizes, while affecting the conduit resistance only to a minimum.

Each or any filter may comprise a weir as known in the art of microfluidics. Thereby the height of the conduit in the area comprising the filter may be reduced, and thereby block any particles larger than the height of the conduit at the position of the weir from entering the remaining part of the emulsification unit.

The first transfer conduit part may have an extension of at least 200 μm, such as at least 500 μm, such as at least 1 mm. The first transfer conduit part may have an extension of 3 mm at most.

The extension of the first transfer conduit part may be equal to or smaller than the length of the transfer conduit.

The desired extension of the first transfer conduit part may be a compromise of a plurality of aspects as explained in the following.

The shorter the conduit, the lower the resistance. A low resistance may be desired. The longer the first transfer conduit part, the easier it may be to align when bonding since it is possible to compensate for variability in alignment of coating and alignment of lower and upper microfluidic part, such as the base microfluidic piece and the capping piece. Furthermore, the bonding may be stronger if the first transfer conduit part is long.

Accordingly, the desired length of the first transfer conduit may be selected as a compromise between different, and possibly conflicting, requirements.

The depth and/or width and/or cross-sectional area may vary along one or more parts of the fluid conduit network. The transfer conduit may for instance have a wider portion between the first transfer conduit part and the second fluid junction. This may be to reduce the resistance and/or increase the flow rate in some areas of the chip.

The largest area of a cross-section of the transfer conduit may be less than 10 times the smallest area of a cross-section of the transfer conduit such as less than 5 times or less than 2 times. If the transfer conduit is too large compared to the opening between the first fluid junction and the transfer conduit, the droplets loose alignment and may not arrive at the second junction at equal intervals or with equal spacing which may result in non-homogenous oil shell thickness and/or droplet size. The depth of each fluid conduit network may be the same throughout the emulsification section. This may be to facilitate production e.g. of moulds, etching, and/or other means of producing the emulsification section. The depth of a fluid conduit network may vary. This may e.g. be to decrease resistance in parts of the microfluidics section. The narrowest section of the primary supply conduit may have a cross-sectional area of 10-5000 $\mu m^2$, such as 50-500 $\mu m^2$, such as 150-300 $\mu m^2$.

A narrow section of a conduit may be cylindrical, or it may be in the form of a nozzle. The primary supply conduit may be defined to end where the sample comes into fluid contact with the oil from the secondary supply conduit.

The narrowest section of the secondary supply conduit may have a cross sectional area of 10-5000 $\mu m^2$, such as 50-500 $\mu m^2$, such as 150-300 $\mu m^2$. The secondary supply conduit, such as comprising the first secondary supply conduit and the second secondary supply conduit, may be defined to end where the oil comes into fluid contact with the sample from the primary supply conduit. The aspect ratio of average width to average depth of a conduit at any position in the chip may be less than 5:1, such as less than 3:1, such as less than 2:1. Production may be facilitated by provision of conduits being wider than they are deep.

The narrowest section of the tertiary supply conduit may have a cross sectional area of 10-5000 $\mu m^2$, such as 50-500 $\mu m^2$, such as 150-300 $\mu m^2$. The tertiary supply conduit, such as including the first tertiary supply conduit and the second tertiary supply conduit, may be defined to end where the buffer comes into fluid contact with the carrier phase, e.g. oil, from the transfer conduit.

The narrowest section of the transfer conduit may have a cross sectional area of 10-5000 $\mu m^2$, such as 50-500 $\mu m^2$, such as 150-300 $\mu m^2$.

The narrowest section of the collection conduit may have a cross-sectional area which is 5-80% larger than the narrowest section of the primary supply conduit, such as 10-50% larger, such as 15-30% larger. The narrowest section of the collection conduit may have a cross-sectional area, which is 10-5000 $\mu m^2$, such as 50-1000 $\mu m^2$, such as 200-400 $\mu m^2$. This may facilitate that the droplets generated have an inner diameter of 10 to 25 μm and an outer diameter of 18 to 30 μm, which may facilitate use of standard equipment designed for bacterial or human cells for subsequent processing, quantification, handling, or analysis of the droplets. The inner diameter may be understood as the diameter of the inner droplet, e.g. of the first fluid, e.g. sample. The outer diameter may be the outer diameter of the shell of the second fluid, e.g. oil.

The relatively small size of droplets generated with the present system may facilitate analysis, quantification and processing using instruments designed for use with cells. If a DE droplet, i.e. e.g. the combination of the oil layer and the aqueous inner phase, are sufficiently small, such as smaller than 40 μm or smaller than 25 μm, then a collection of double emulsion droplets may be analysed and processed using equipment developed for bacterial or mammalian cells such as flow cytometers and cell sorters.

The cross-sectional area of the first transfer conduit may affect the resistance. The smaller the cross-sectional area, the higher the resistance may be.

The cross-sectional area of any supply conduit may have a minimal cross-sectional area being larger than any opening, or the average openings, of the corresponding filter, also denoted filter rating or filter size. This may be to alleviate blocking of the conduit by particles in the filter.

It may be desired that the opening between a supply conduit and a corresponding fluid junction, such as between the first fluid junction and the secondary supply conduit, has a specified cross-sectional area range or value. Furthermore, it may be desired that a supply conduit has the same cross-sectional area at an adjacent part thereof leading up to the respective fluid junction as cross-sectional area of the opening into the respective fluid junction. Such adjacent part may for instance be at least 50 μm. However, to facilitate an overall lower resistance in the respective conduit, the remaining part of the respective supply conduit, or at least a major part thereof, may have a higher cross-sectional area.

The cross-sectional area of the transfer conduit may be smaller than the cross-sectional area of the supply conduits. A large cross-sectional area of the transfer conduit may disturb the periodic flow of the droplet within the conduit. The transfer conduit may be void of any section, wherein the cross-sectional area is larger than twice the cross-sectional area of the first transfer opening.

The cross-sectional area of the collection conduit may be larger than the second transfer opening. This may be to decrease resistance in the conduit.

The first collection conduit part may comprise the region from the center of the second fluid junction to 250 μm from the center of the first fluid junction or at least the region from 25 μm to 75 μm from the center of the first fluid junction in the intended direction of the fluid flow corresponding to the area where formation of droplets occurs.

The distance between the first and second fluid junction, which may correspond to the length of the transfer conduit, may be at least 200 μm, such as at least 500 μm, 1000 μm or 1500 μm. A longer distance may facilitate large scale production of microfluidic device. Variation in placement of coating and placement/alignment of e.g. the base microfluidic piece and the capping piece may be expected. For facilitating that the first transfer conduit part and the first collection conduit part have correct surface properties, it may be desired to have a sufficient distance between the two junctions. A larger distance between the first junction and second junction may reduce the risk of insufficient bonding/attachment between the base microfluidic piece and the capping piece adjacent to the secondary supply conduit, the tertiary supply conduit, and the transfer conduit, which may be critical bonding area.

A kit according to the present invention may include aqueous liquids, reagents, buffers, oils necessary, cartridges, chips, gaskets sufficient to generate double emulsion droplets and instructions for using kit components with the instrument. Aqueous liquids suitable for the inner aqueous phase of the droplets may include PCR reagents such as dNTPs, one or more polymerases, and salts. Aqueous liquids suitable for the outer carrier phase may have essentially the same osmolarity as the aqueous liquid suitable for the inner aqueous phase of the droplets. The aqueous liquids may include emulsion stabilizing agents such as polyether compounds and co-emulsifiers. The aqueous liquids may additionally comprise thickening agents.

If the carrier phase, i.e. the fluid provided by the tertiary supply container, of the droplets generated according to the present system is aqueous, then analysis and processing using standard instruments designed for use with cells, such as bacterial or mammalian cells, may be facilitated.

The sample buffer may be denoted the first fluid. The first fluid may comprise the sample buffer. The oil may be denoted the second fluid. The second fluid may comprise the oil. The continuous phase buffer, which may be referred to as the buffer, may be denoted the third fluid. The third fluid may comprise the buffer.

The enzyme may be provided in the sample buffer or separate from the sample buffer. An advantage of separate provision may be that the enzyme may be stored under different conditions, such as high glycerol concentrations, which may increase stability. An advantage of provision in sample buffer may be to facilitate use by simplifying pipetting steps and decreasing risk of errors.

The nucleotides may be provided in the sample buffer or separate from the sample buffer. An advantage of separate provision may be that the dNTP may be stored under different conditions, such as at higher concentrations, which may increase stability. An advantage of provision in sample buffer may be to facilitate use by simplifying pipetting steps and decreasing risk of errors.

The sample buffer may be of essentially the same osmolarity and/or comprise essentially the same concentrations of ions as the continuous phase buffer. Provision of such features may be advantageous since the concentrations of the components of the sample may otherwise change due to osmosis through the oil membrane. Changes in the concentration of sample or buffer components may lead to decreased efficiency of reactions performed in the droplets in subsequent steps. Swelling of the droplets due to osmosis may lead to droplets becoming too large for handling e.g. in a cell sorter. Examples of sample buffers may comprise ions such as $Na^+$, $Ka^+$, $Ca^{++}$, $Mg^{++}$, $NH_4^+$, $SO_4^{--}$ and $Cl^-$, buffering compounds such as Tris-HCl, glycerol, Tween, nucleotides, and enzymes. A corresponding continuous phase buffer may comprise essentially the same concentrations of $Ka^+$, $Ca^{++}$, $Mg^{++}$, and $Cl^-$, glycerol and buffering compounds such as Tris-HCl as the sample buffer, but possibly not nucleotides or enzymes as the reaction occurs within the droplets.

An example of a suitable sample buffer is a buffer comprising 10 mM Tris-HCl, 57 mM Trizma-base, 16 mM $(NH_4)_2SO_4$, 0.01% Tween 80, 30 mM NaCl, 2 mM $MgCl_2$, 3% glycerol, and 25 μg/μL BSA. An example of a corresponding, suitable continuous phase buffer is a buffer comprising or consisting of 20 mM Tris-HCl (pH 9), 57 mM Trizma-base, 16 mM $(NH_4)_2SO_4$, 0.11% Tween 80, 30 mM NaCl, 2 mM $MgCl_2$, 3% glycerol, 1% poly ethylene glycol (PEG) 35K, and 4% Tween 20.

Another example of a suitable sample buffer is a buffer comprising or consisting of 10 mM Tris-HCl, 57 mM Trizma-base, 16 mM $(NH_4)_2SO_4$, 0.01% Tween 80, 30 mM NaCl, 2 mM $MgCl_2$, 3% glycerol, and 25 μg/μL BSA, 0.2 mM dNTP, 0.2 μL primers, and 2 units Taq DNA polymerase. An example of a corresponding, suitable continuous phase buffer is a buffer comprising or consisting of 20 mM Tris-HCl (pH 9), 57 mM Trizma-base, 16 mM $(NH_4)_2SO_4$, 0.11% Tween 80, 30 mM NaCl, 3% glycerol, 1% PEG 35K, and 4% Tween 20.

The buffers may be provided two-fold concentrated, 10-fold concentrated or other concentrations. During use, the buffer may then be provided by dilution of the concentrated buffer to achieve a desired concentration, such as the concentrations in the above examples, before being loaded into the respective containers of the microfluidic device.

The method for providing double emulsion droplets may comprise use of the microfluidic device according to the present invention.

The method for providing double emulsion droplets may comprise use of the microfluidic device according to the present invention. The method may comprise: providing a first fluid to the secondary supply container of a first group of containers; providing, possibly subsequently, a second fluid to the supply container of the first group of containers, which supply container is in fluid communication with the secondary supply conduit of the corresponding emulsification unit, such as the secondary supply container; providing a third fluid to the tertiary supply container of the first group of containers; and providing individual pressure differences between each of the respective supply containers of the first group of containers and the collection container of the first group of containers, such that the pressure within each of the individual supply containers of the first group of containers is higher than within the collection container of the first group of containers.

The method for providing double emulsion droplets may comprise: providing a primary flow of a first fluid from the secondary supply container to the first fluid junction via: the primary supply inlet, the primary supply conduit, and the primary supply opening; and providing a secondary flow of a second fluid from the one supply container of the plurality of supply containers being in fluid communication with the secondary supply inlet of the corresponding emulsification unit to the first fluid junction via: the secondary supply inlet, the secondary supply conduit, and the secondary supply opening; wherein the primary flow and the secondary flow provides a transfer flow of the first fluid and the second fluid from the first fluid junction to the second fluid junction via: the first transfer opening, the transfer conduit, and the second transfer opening.

The method for providing double emulsion droplets may comprise: providing a tertiary flow of a third fluid from the tertiary supply container to the second fluid junction via: the tertiary supply inlet, the tertiary supply conduit, and the tertiary supply opening; wherein tertiary flow and the transfer flow provides a collection flow of the first fluid, the second fluid, and the tertiary fluid, to the collection container via: the collection opening, the collection conduit, and the collection outlet.

The method for manufacturing a microfluidic device according to the present invention may comprise: changing surface property of a part of each of two parts of the emulsification section; and joining the two parts of the emulsification section by thermal bonding and/or clamping. The first part may be the base microfluidic piece and the second part is the capping piece of the emulsification section. The method may comprise: manufacturing the first part in one piece; partially coating the areas of the first part and the second part corresponding to the first transfer conduit part or the first collection conduit part; and joining the two parts.

Surface modification of the emulsification section may be necessary to achieve specific surface properties on the walls of the conduits. The surface modification may prevent adsorption of proteins such as enzymes, nucleotides, or ions onto the walls of the conduits or help to control the flow of hydrophobic or hydrophilic liquids.

Provision of double emulsion droplets may be realized in two steps. A water-in-oil droplet may be generated at the first fluid junction, requiring a hydrophobic surface in the area/conduit following the first fluid junction. An oil-in-water droplet, which oil part may contain water, may be formed at the second fluid junction, requiring a hydrophilic surface at this point in the area/conduit following the second fluid junction. Therefore, spatially-controlled modification of the surface of the conduit may be required. Alternatively, different materials in the different areas may be used, so that the inherent properties of the materials give the required surface properties at all positions of the fluid conduit network.

Different techniques may be used for the surface modification on a local part of the fluid conduit network. The method of choice may depend on the required stability of the surface modification, the material to modify, the compatibility of the surface modification with the chemicals in use and the configuration of the microchip when doing the surface modification. It may be desired to modify the entire circumference of a conduit, e.g. all four walls. An important criterion for the choice of surface modification method may be the effect on the material, as the method of surface modification should not damage the material or increase its roughness.

Polymer materials are in general hydrophobic, which may be defined by having a contact angle larger than 90°. Different techniques exist to change the surface from hydrophobic to hydrophilic, such as the deposition of chemicals, e.g. polymers, onto the surface or the modification of the surface itself, e.g. via exposure to plasma.

Surfaces of the conduits may be exposed to plasma, e.g. oxygen or air plasma for an appropriate amount of time, e.g. 1, 2, 5, 10 or more minutes. Reactive species/radical will come in contact with the surface and thereby the surface will become hydrophilic. Open reactive sites on the surface which may be used for grafting of further molecules.

A disadvantage of this process may be that surfaces will revert to their inherent hydrophobic properties with time. This means that treated devices may need to be used soon after surface modification.

A Hydrophobic surface may alternatively, or additionally, be exposed to UV light for an appropriate amount of time to obtain a hydrophilic surface. For example, Subedi, D. P.; Tyata, R. B; Rimal, D.; Effect of UV-treatment on the wettability of polycarbonate. Kathmandu University Journal of science, engineering and technology, Vol 5, No II, 2009, pp 37-41, have shown to treat polycarbonate with UV light for 25 min and obtain a decrease of the contact angle from 82° to 67°.

To achieve a more stable surface modification, i.e. a modification of the surface which lasts for an extended period, thereby providing an improved, i.e. a longer, shelf life of the devices, it may be desired to attach permanently molecules onto the surface, which attachment will make the surface hydrophilic.

UV-grafting to polymers may involve several steps, where for example a photoinitiator such as benzophenone is first deposited onto the surface and then the coating polymer is added. This may then be followed by illumination with UV-light where the polymer covalently binds to the surface (Kjaer Unmack Larsen, E. and N. B. Larsen (2013). "One-step polymer surface modification for minimizing drug, protein, and DNA adsorption in microanalytical systems." Lab on a Chip 13(4): 669-675.).

In some examples, the UV-grafting of chemicals may be combined with a surface pre-treatment, e.g. with plasma oxidation.

Thin film may be deposited onto a substrate using physical vapor deposition (PVD), e.g. as described in https://www.memsnet.org/mems/processes/deposition.html. In this technique, the material to be deposited may be released from a target and directed onto the substrate to coat. Sputtering and evaporation are two techniques to release material from a target.

The advantage of sputtering over evaporation may be the low temperature at which the material may be released from the target. In sputtering, the target and substrate are placed in a vacuum chamber. Plasma may be induced between two electrodes. This ionizes the gas. Target material may be released in vapor form by the ionized ions of the gas and deposits on all surfaces of the chamber, among others the substrate.

Sputtering may be used to deposit thin films of chromium oxide onto polymers which makes their surface hydrophilic.

In contrast to PVD, thin films are deposited by chemical vapor deposition (CVD) due to a chemical reaction happening between different source gases. The product may then deposit onto all the walls of the chamber as well as the substrate. Different technologies are available for CVD. For example, plasma-enhanced CVD (PECVD) uses plasma to ionize gas molecules before the chemical reaction. PECVD uses lower temperatures than other CVD technologies, which represents a major advantage when coating a substrate not resistant to high temperatures. PECVD is widely used for the deposition of thin films in semiconductor applications. Materials that may be deposited are among others silicon dioxide ($SiO_2$) and silicon nitride (SixNy). Plasma Enhanced Chemical Vapor Deposition (PECVD) is described in e.g. http://www.plasma-therm.com/pecvd.html.

Liquid coating may be deposited onto a flat surface using spin coating. In spin coating, liquid material may be placed onto the middle of a substrate. During spinning, the liquid coating spreads uniformly onto the complete surface of the substrate. Different parameters such as rotation speed or time are responsible for the thickness of the deposited film.

This technique is commonly used for example for the deposition of photoresist onto wafers.

Yet another technique to deposit a coating onto a substrate is via spraying, where a stream comprising small droplets of liquid material may be directed onto the substrate. When sprayed onto a substrate comprising an open conduit, liquid coating may be allowed to dry before the capping piece or ceiling of the conduit is added. If applied accurately, spraying and drying of a liquid coating material onto the substrate may avoid masking of the substrate and the process may be more cost effective for large scale production.

Corona treatment, e.g. as described in http://www.vetaphone.com/technology/corona-treatment/, is a technique where a plasma may be generated at the tip of an electrode. This plasma modifies the polymer chains at the surface of the substrate, thereby increasing the surface energy and hence the wettability of the material.

Without further treatment, the substrate will revert to its inherent properties.

Another technique to make polymer surfaces hydrophilic is the UV/ozone treatment. This technique is typically used for the cleaning of surfaces from organic residues. Under UV/ozone treatment, the surfaces are photooxidized by UV-light and atomic oxygen and the surface molecules are modified (A. Evren Özçam, Kirill Efimenko, Jan Genzer, Effect of ultraviolet/ozone treatment on the surface and bulk properties of poly(dimethyl siloxane) and poly(vinylmethyl siloxane) networks, In Polymer, Volume 55, Issue 14, 2014, Pages 3107-3119). The UV/ozone treatment causes less damage to the surface than other treatment such as plasma treatment.

Microfluidic chips may be made out of glass. The surface of glass is hydrophilic and water spreads on the surface. For the present invention, in the case of microfluidic conduits made of glass, the surface at the first transfer conduit part or the first collection conduit part has to be modified from hydrophilic to hydrophobic. Glass surfaces may be modified for example with silanes to obtain permanent modification of the surface. As described in https://www.pcimag.com/ext/resources/PCI/Home/Files/PDFs/Virtual_Supplier_Brochures/Gelest_Additives.pdf, different types of silanes exist that may lead to hydrophobic properties.

Modifying surface properties of the fluid conduit network at a predefined area, e.g. from hydrophobic to hydrophilic, may be realized before assembly of a substrate comprising the base microfluidic piece with a substrate comprising the capping piece.

A physical mask such as a metal or glass plate, a polymer sheet or any appropriate material, may be used to protect the areas that should not be exposed to the coating/surface modification treatment. The mask may be attached/brought in contact with the surface in any suitable way, such as be a hard or soft contact mask. The mask may be any material that may be used only once, e.g. in the case of a mask that is damaged/destroyed when removed from the surface, or reused a plurality of times.

This strategy may be used for methods involving a coating deposited in gas form or a physical treatment such as UV-exposure or a liquid coating deposited via sputtering or spray onto the surface.

After removal of the mask, a partially patterned conduit may be obtained.

For modifying all, such as four, walls of a fluid conduit, both the capping piece and the base microfluidic piece may need to be treated. Accurate alignment may be necessary to assure that the transition hydrophobic/hydrophilic will take place at the same position for all four conduit walls. Accurate alignment may not be necessary at the end, i.e. in the intended direction of flow, of the first transfer conduit part/the first collection conduit part.

An advantage of this strategy may be that a high number of devices may be treated at the same time. Moreover, the deposited coating material may be analyzed, e.g. thickness measurement, coating homogeneity after the coating process.

If the fluid conduit network is formed by the capping piece being positioned over the ramified recesses of the base microfluidic piece, i.e. is in a closed configuration, any liquid coating may be deposited very accurately in the conduit and will wet all four walls of the fluid conduit network.

To achieve a spatially controlled modification, flow confinement may be used using an inert fluid, i.e. a fluid which will not mix or interact with the liquid coating fluid.

Liquid coating material may be introduced via the tertiary supply conduit, while the rest of the fluid conduit network may be protected from exposure to the coating material using flow confinement with an inert liquid or with air, such as water or oil. While flowing in the conduit, the coating may be deposited on all walls of the fluid conduit network. This technique may require accurate flow control and does not enable measurement of the thickness of the deposited layer.

In some examples, the spatial patterning may be achieved by blocking the gaseous treatment from reaching some areas of the fluid conduit network. For example, for a closed part of the fluid conduit network, plasma oxidation may be limited by diffusion. Hence, if the diffusion may be limited in some areas of the fluid conduit network, the plasma will be denser in some areas compared to others. Therefore, some regions will be modified while others will not be affected by the plasma.

Limiting the diffusion to some areas of a closed conduit for plasma oxidation may be done in different ways, such as blocking the inlets close to the areas to protect or connecting a long conduit to the inlets close to the areas to protect, thereby increasing the resistance of the conduit which will prevent plasma from going into those regions of the microchip or any other methods This process may require an accurate spatial control of the plasma and yields a gradual transition between the hydrophobic and hydrophilic areas. Moreover, this treatment may not be stable over time as the treated regions reverse to their inherent hydrophobic properties within some hours, depending on the polymer material used.

The microfluidics section of the cartridge may be partially coated in at least a first transfer conduit part or a first collection conduit part.

The first transfer conduit part may refer to the zone immediately following the first fluid junction in the direction of the fluid flow, where formation of aqueous droplets in oil carrier fluid may occur. The first transfer conduit part may comprise the region from the center of the volume of the first fluid junction to the center of the second fluid junction or at least the region from 25 μm to 75 μm from the center of the first fluid junction in the direction of the fluid flow.

The first collection conduit part refers to the zone immediately following the second fluid junction in the direction of the fluid flow, where formation of double emulsion aqueous droplets surrounded by an oil shell in an aqueous carrier fluid may occur. The first collection conduit part may comprise the region from the center of the volume of the second fluid junction to 250 μm from the center of the second fluid junction or at least the region from 25 μm to 75 μm from the center of the first fluid junction in the direction of the fluid flow.

The first transfer conduit part may be hydrophobic with a contact angle measured with water of at least 70°, such as 80° or 90°. If the first transfer conduit part is produced from a hydrophobic material such as a polymer, the first transfer conduit part may be uncoated. The first transfer conduit part may be treated in such a way that the contact angle is at least 70°, such as 80° or 90° after treatment.

The first collection conduit part may be hydrophilic with a contact angle measured with water of not more than 40°, such as not more than 30° or 20°. If the first transfer conduit part is produced from a hydrophilic material such as glass, the first transfer conduit part may be uncoated, i.e. the first transfer conduit part may be treated in such a way that the contact angle is not more than 40°, such as not more than 30° or 20° after treatment.

The fluidic cartridge may be made of polymer in all parts or be a hybrid between different materials such as a hybrid of different polymers or a polymer-glass hybrid. If a polymer-glass hybrid is used, the base container structure piece may be made of polymer while the microfluidic device may be made of glass.

The microfluidic cartridge may be manufactured from three or more separate parts which are subsequently assembled into a cartridge. The separate parts may include a base container structure piece, a microfluidic structure and a capping piece. The assembly of the parts may be performed using thermal bonding, heat stacking or similar techniques. An elastomer may be over-moulded onto either the base container structure piece, the microfluidic structure or both to ensure a pressure tight seal between the instrument and the cartridge and between the microfluidic structure and the base container structure piece.

The base container structure piece may be made using injection moulding. For injection moulding, a mould may be created by machining the negative shape of the base container structure piece in one or more blocks of e.g. METAL. The polymer may be melted and flows into the mould. Upon cooling, the polymer will retain the shape of the mould and will be ejected from the mould for use. The mould may be reused for a high number of parts. For injection moulding, different thermoplastics may be used such as poly(methyl methacrylate) (PMMA) or cyclic olefin copolymer (COC), or cyclic olefin polymer depending on the compatibility with the chemicals in use.

The base container structure piece may be provided using 3D printing techniques. Various 3D printing techniques are available, such as stereolithography or fused filament printing. Layers of material are deposited and cured onto each other creating the object. The base container structure piece may be 3D printed onto the microfluidics section.

Fabrication of the microfluidic device may be realized by different microfabrication methods, depending on the volume to produce, material of choice as well as the resolution required/smallest feature to pattern/create.

For low volumes, soft lithography and/or laser ablation may be used. For example, soft lithography of PDMS may alternatively, or additionally be used to fabricate the two substrates of the microfluidic device. The PDMS mixture may be poured over a mould containing the negative shape of the microstructure. After curing, the PDMS part and the mould are separated.

High precision micromachining alternatively, or additionally be used to create microstructures in a polymer substrate. However, typically the size of the microstructures cannot be below 50 μm and this technique may be time consuming.

For high production volumes, replication methods are often used including hot embossing, injection moulding among others or LIGA (German abbreviation: lithographie (Lithography), Galvanoformung (electroplating), Abformung (moulding)). Those methods involve the fabrication of a mould which contains the negative shape of the structure such as ramified recesses and possibly any additional feature on the substrate, e.g. holes for fluidic connection, alignment features, etc.

The mould may be produced using different techniques such as high precision micromachining, electrical discharge machining (EDM) or photolithography.

Photolithography may be the first step for the fabrication of the mould, followed by electroplating as described here. A silicon substrate may be coated with a layer of photoresist which then may be exposed to UV-light through a chromium mask to create a positive shape of ramified recesses.

Nickel may then be deposited onto the photoresist by electroplating. The silicon wafer may then be chemically dissolved, e.g. using KOH. The mould insert may be diced and inserted into the microinjection moulding tool, which forms a cavity containing the negative shape of the ramified recesses.

After fabrication of the mould, polymer may be melted and flows in the microcavities of the mould. When the polymer cools down, it retains the shape of the mould. Critical parameters such as filling pressure and/or temperature need to be optimized to achieve a good replication of the mould and a correct demoulding/removal of the microstructured parts from the mould.

Assembly of the polymer substrate containing the conduit and of the polymer capping piece substrate may be necessary to create a closed and liquid tight conduit. The assembly of the substrate or closing of the conduit may be done irreversibly using various techniques, for example through thermobonding ultrasonic or laser welding, lamination. In thermobonding, the polymer substrates are heated slightly below glass transition temperature and high pressure may be applied to assemble the two substrates. The temperature, time and pressure parameters may have to be optimized so that the microstructure is not damaged by the process. For lamination, a thin laminate, e.g. 30 μm to 400 μm thick, with an adhesive surface, e.g. pressure sensitive adhesive, may be placed over the part of the conduit. Pressure may be applied uniformly over the whole surface to seal the laminate, using for example a roller.

Another method of irreversible closing of the conduit may be used for microstructures made of PDMS. The PDMS part may be assembled with a flat PDMS part or a glass substrate. After cleaning of those parts using a solvent, e.g. ethanol and/or isopropanol, the parts may be exposed to oxygen plasma for 1 minute. The two surfaces are then brought into contact to form an irreversible bond.

One or more parts of the microfluidic device, such as including the base microfluidic piece, may be made of glass. In this case, the fluid conduit network may be made using photolithography and anisotropic etching. Inlet holes may be made using sand/powder blasting.

Similar as for microchips made of polymers, glass microchips need to be closed to create a liquid tight conduit.

Assembly of the glass substrates may be done e.g. via anodic bonding.

The emulsification section may comprise a first transfer conduit part and a first collection conduit part. The first transfer conduit part refers to the zone immediately following the first fluid junction in the direction of the fluid flow where formation of aqueous droplets in oil carrier fluid occurs. The first transfer conduit part may comprise the region from the center of the first fluid junction to the center of the second fluid junction or at least the region from 25 μm to 75 μm from the center of the first fluid junction in the direction of the fluid flow.

The first collection conduit part refers to the zone immediately following the second fluid junction in the direction of the fluid flow where formation of double emulsion aqueous droplets surrounded by an oil shell in an aqueous carrier fluid occurs. The first collection conduit part may comprise the region from the center of the second fluid junction to 250 μm from the center of the second fluid junction or at least the region from 25 μm to 75 μm from the center of the first fluid junction in the direction of the fluid flow.

It may be an object of the present invention to facilitate production of a microfluidic device.

Throughout the present disclosure, terms such as any of: up/down, upper/lower, top/bottom, and upper side/underside may be in relation to the orientation of the microfluidic device during the intended use thereof, i.e. during processing of fluids for provision of emulsion droplets. Similar may apply for terms such as height/width/length and horizontal plane. Height and depth may be used interchangeably. Furthermore, an inclining surface may refer to an inclination in relation to the horizontal plane.

However, whenever referring to a conduit or another fluidic/microfluidic structure being provided by a recess in a flat surface part and e.g. being caped by another flat surface part, e.g. as illustrated in FIG. 23, the term bottom may refer to the lowermost part of the recess and the term top may refer to the another surface part providing the capping part of the respective conduit or another structure.

Whenever materials are defined as being "the same", it may be understood as substantially the same. For instance, to pieces, such as the top piece, and the bottom piece, may be referred to as being of the same material even if one, more, or all of them have a coating applied, which coating may be different from any material of the two pieces.

The term "base material" may e.g. refer to a substrate, which may or may not be coated, e.g. coated on a part of the surface thereof.

The diameter of any conduit part may be understood as a pseudo-diameter ($D_p$). A pseudo-diameter may be based on the cross-sectional area ($A_{cs}$) at the respective part. If the respective part does not have the same cross-sectional area throughout the extension of the respective part, an average cross-sectional area may be utilized. The pseudo-diameter may be defined based on the respective cross-sectional area as follows: $D_p=2\sqrt{(A_{cs}/\pi)}$.

Throughout the present disclosure the terms first, second, and third, as well as the terms primary, secondary, tertiary, as well as any combination hereof does not necessarily indicate any timing and/or prioritizing of the respective events, steps, or features. Accordingly, one event, such as a first event, may occur before, during, or after another event, such as a second event, or the one event may occur at any combination of before, during, and after the other event.

Throughout the present disclosure, whenever a range is defined as being between a first value and a second value, the first value and the second value are regarded as being part of the range, unless otherwise is explicitly stated.

An orifice may be understood as a passage, such as a fluid passage.

Height (or depth) to width ratio of at least the first transfer conduit part and/or the first collection conduit part and/or the entire "microfluidic part" may have a value of at least 0.7 and/or at most 1.4, such as at least 0.8 and at most 1.2, such as at least 0.9 and at most 1.1, such as around 0.9. This may be to facilitate production. If the ratio is too much above 1, e.g. above 1.4, production may prove difficult. E.g. for injection moulding, it may be difficult to separate the mould and the substance being shaped by the mould if the ratio is outside a desired range. E.g. for milling, it may be difficult to provide a milling device, e.g. a drill, having the required strength to length ratio if outside the desired range. It may be desired that the ratio is not too much lower than 1, such as lower than 0.7, because the risk of "sagging" of a cover part of a recess forming a conduit, which otherwise may reduce height of the conduit part or may be blocking the conduit completely or partly, as these effects may increase at lower height to width ratios.

A conduit may be referred to as a channel. Any conduit and/or any part of the fluid conduit network may be defined in terms of four sides: a bottom part, a top part, and two side walls.

Unless otherwise stated, a reference to an affinity for water for a conduit or a part thereof, may refer to an average, e.g. weighted with respect to the percentage of the circumference that the respective part of the circumference has, such as for each of four sides.

The sidewalls of a recess of a conduit of the fluid conduit network may be inclining at least 1 degree, such as at least 2 degrees, such as 3-4 degrees, with respect to a vertical direction and such that the bottom of the recess is more narrow than the top of the recess. The sidewalls, e.g. sidewalls of equal length, may have a tapering of at least 1 degree and/or at most 20 degrees with respect to a normal of either of the parallel base edges.

The microfluidic device may be provided in one piece, e.g. by being 3D-printed. However, the current state of the art, such production method may not be cost effective and may be time consuming.

Accordingly, it may be an object of the present invention to facilitate production, e.g. by provision of a plurality of components forming the microfluidic device by being bonded together.

The microfluidic device may comprise a plurality of components bonded together. The plurality of component may include a first component and a second component. The first component and the second component may form the fluid conduit network between them, e.g. by a ramified recess in one of the two components being capped by a flat surface by the other component. The first and second component may be bonded together.

The first and second component may, e.g. when bonded together, be referred to as a "base microfluidic piece" or a "microfluidic structure" if being connected to, or if being configured for being connected to, a third component forming part of the plurality of components and comprising at least the secondary supply container and possibly the tertiary supply container if provided. In such setup, the third component may be referred to as the "base container structure piece" or "container structure piece".

A component comprising at least the secondary supply container may be denoted "base container structure piece".

In any event, the components forming the plurality of components, such as the first, second and e.g. third component, may be referred to according to their vertical order when assembled and when the microfluidic device has the intended orientation during the intended use. Accordingly, the plurality of components may comprise a top component, a bottom component, and possibly an intermediate component. The first and second component may comprise the bottom and the intermediate component, or vice versa. The first and second component may comprise the top and the intermediate component, or vice versa.

The plurality of components may be provided in the same material.

A component covering the recesses forming the fluid conduit network may be denoted a cover layer/piece or a capping layer/piece.

The term "piece" may be utilized instead of "component", or vice versa.

A top side and a bottom side of a component/piece may be referred to according to their vertical orientation when assembled and when the microfluidic device has the intended orientation during the intended use The intermediate component may be denoted a "through hole piece", e.g. if comprising a plurality of through holes connecting the respective containers of the top component to respective microfluidic structures provided between the through hole piece and the bottom piece.

The microfluidic device may comprise at least two pieces comprising a base container structure piece and a bottom piece, which are fixedly connected to each other such that each group of containers is fixedly connected to a respective corresponding microfluidic unit, wherein the container section is provided by the base container structure piece, and wherein the microfluidic section is provided by at least two pieces of the at least two pieces.

The recesses of "the microfluidic structure" may be provided in the top side of the bottom piece, e.g. with the bottom side of the base container structure piece function as a lid.

The recesses of "the microfluidic structure" may be provided in the bottom side of the base container structure piece, e.g. with the top side of the bottom piece function as a lid below, wherein the base container structure piece may comprise a ramified recess for each microfluidic unit.

The at least two pieces forming the microfluidic section, e.g. one pieces with recesses and one pieces providing a lid of the recesses, thereby forming conduits, may be provided in different materials. For bonding the two pieces adhesive may be utilized.

The microfluidic device may comprise at least three pieces comprising a through hole piece, e.g. in addition to a base container structure piece and a bottom piece. Recesses of "the microfluidic structure" may be provided in the bottom side of the through hole piece e.g. with the top side of the bottom piece function as a lid below. Alternatively, the recesses of "the microfluidic structure" may be provided in the top side of the bottom piece e.g. with the through hole piece function as a lid above.

The first and second component may be bonded, e.g. thermally bonded, chemically bonded, or thermo-chemically bonded. Subsequently, a container structure may be bonded thereto, e.g. by laser welding, e.g. through the bottom of the container. As an alternative to laser welding, connection of the container structure piece with the structure, which is intended to be below the container structure piece during use of the device, adhesives may be used.

The present invention may comprise connection of two pieces using laser welding, the two pieces may e.g. be the base container structure piece and the pieces provided immediately below, e.g. the through hole piece or the bottom piece.

When connecting two pieces using laser welding, one of the two pieces may comprise a laser light absorbing additive, e.g. black or blue colour pigments, while the other pieces may allow the respective laser light to pass without being absorbed or by being absorbed considerably less, e.g. by being clear. The absorbance of one of the two materials may e.g. be at least 10 times higher, such as at least 20 times higher, than the absorbance of the other material.

For instance, laser welding may be carried out through the base container structure piece, wherein the base container structure piece may be clear while the pieces or piece below, e.g. intermediate piece and/or bottom pieces, may contain an additive that absorbs the laser light e.g. black or blue colour pigments. Alternatively: It could be connected from the microfluidic side. In that case the container structure would have to contain an additive that absorbs the laser light e.g. black or blue colour pigments and the entire microfluidic part including the through hole piece would be clear to allow the laser light to pass.

When using laser welding, it may be required that the material of the pieces to be welded must be the same, e.g. with disregard to a laser light absorbing additive in the one piece which may not be provided by the other piece, and/or with disregard to a coating, e.g. provided at the first transfer conduit part or the first collection conduit part.

The base container structure may have height of between 3 mm and 20 mm. Parts, which do not contain a well, may have a height of 0.5 mm to 3 mm.

A capping layer may have a thickness of: 0.1 to 3 mm.

A component comprising the recesses of the microfluidic part may have a thickness of 0.3 to 3 mm.

The primary orifice may be configured for accommodating a distal end zone of a pipette tip. The primary orifice may be configured for forming a seal with the pipette tip when the distal end zone is accommodated by and pressed against the primary orifice.

A pipette tip may be understood as a disposable plastic device used to transport measured volumes of liquids ranging from 5-200 μl. The pipette tip has two openings: a first opening provided at a proximal end of the pipette tip and a second opening provided at a distal, and usually thinner, end of the pipette tip. The first opening may be designed to fit onto a pipette, and may have an inner diameter of 5-10 mm. The second opening may be used for liquid transport and may for instance have an outer diameter ranging from 0.5 mm to 3.0 mm. The length of the pipette tip from the first opening to the second opening may e.g. be 3-10 cm.

The primary orifice and/or a surface tangent of the primary orifice may be conical and may be tapering in a direction away from the secondary supply cavity.

Figure 17A:
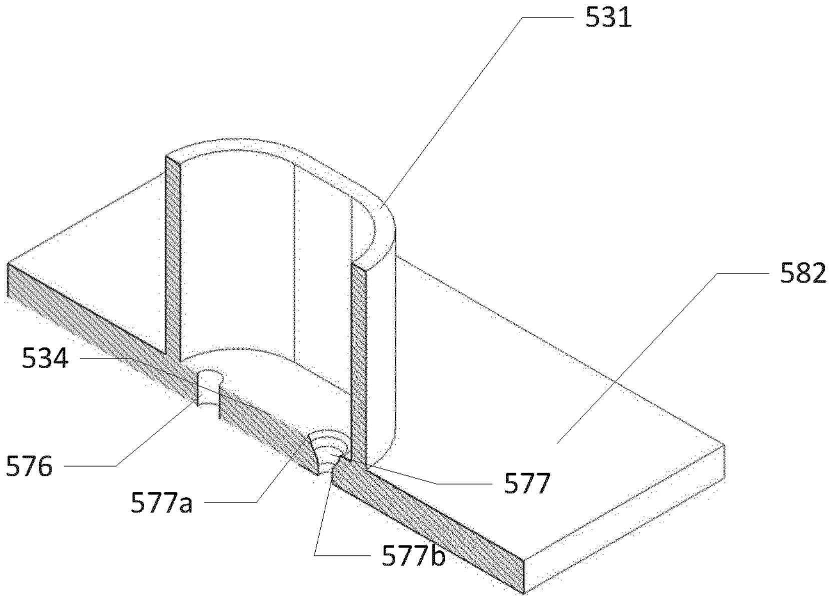

The primary orifice or one or more surface parts of the primary orifice may form one or more conical surface parts, which may be tapering in a direction away from the secondary supply cavity, cf. e.g. FIG. 17*a*.

The primary orifice or one or more surface parts of the primary orifice may form one or more toroid surface parts, such as one or more ring torus surface parts.

The primary orifice may extend from a first primary perimeter bordering the secondary supply cavity to at least a second primary perimeter. The first primary perimeter may be configured to enable the distal end of the pipette tip to pass through. The second primary perimeter may be circular. The second primary perimeter may be configured to hold and form a seal with the distal end zone of the pipette tip when the distal end zone of the pipette tip is pressed against the second primary perimeter. The smallest diameter of the first primary perimeter may be larger than the diameter of the second primary perimeter. The smallest diameter of the first primary perimeter may be less than 50% larger than the diameter of the second primary perimeter.

From the first primary perimeter the primary orifice may gradually become narrower towards the second primary perimeter.

The distance from the first primary perimeter to the second primary perimeter may be less than 10 mm such as less than 3 mm.

The first primary perimeter may be defined by a cross section of the primary orifice bordering the secondary supply cavity.

The smallest diameter of the first primary perimeter may be between 9 mm and 0.5 mm, such as between 5 mm and 1.7 mm or such as between 0.6 mm and 1.2 mm. The diameter of the second primary perimeter may be between 0.10 mm and 3.0 mm, such as between 0.13 mm and 1.9 mm.

For facilitating the distal end of the pipette tip to be inserted easily into the primary orifice of the secondary supply container, it may be desired that the smallest diameter of the first primary perimeter of the primary orifice may be larger than the outer diameter of the distal end of the pipette tip. The first primary perimeter may be circular, or another appropriate shape, which does not impede insertion of the distal end of the pipette tip.

For facilitating provision of a seal between the primary orifice of the secondary supply container and the pipette tip when the distal end zone thereof is accommodated by and pressed against the primary orifice and/or for holding the pipette tip, it may be desired that the diameter of the second primary perimeter of the primary orifice may be smaller than the outer diameter of the distal end of the pipette tip.

The secondary orifice of the secondary supply container may extend from a first secondary perimeter bordering the secondary supply cavity to at least a second secondary perimeter. The first secondary perimeter may be configured to enable the distal end of the pipette tip to pass through. The second secondary perimeter may comprise a flat part and may be configured to obstruct the distal end of the pipette tip from moving further into the secondary orifice without holding the distal end zone of the pipette tip when the pipette tip is pressed against the second secondary perimeter.

The secondary orifice and/or a surface tangent of the secondary orifice may be conical and may be tapering in a direction away from the secondary supply cavity.

The secondary orifice or one or more surface parts of the secondary orifice may form one or more conical surface parts, which may be tapering in a direction away from the secondary supply cavity.

Embodiments, wherein the secondary orifice tapers in the same direction as the primary orifice, may enable easier production. This may for instance be the case if the component comprising the secondary supply container is produced by injection moulding.

The shortest diameter of the first secondary perimeter may be at most a defined value, such as at most 0.6 mm, or at least a defined value, such as at least 1.2 mm. Provision of the shortest diameter of the first secondary perimeter being at most a desired value may provide the following advantage: it is not possible to insert a pipette tip in the secondary orifice by accident if the diameter of the distal end of the pipette tip is larger than the shortest diameter of the upper part of the secondary orifice. Provision of the shortest diameter of the first secondary perimeter being at least a defined value may provide the advantage facilitated production.

The intermediate chamber may be inaccessible by a pipette tip.

The one or more supply containers may each comprise a well and/or may be accessible by a pipette tip.

The collection container may comprise a well and/or may be accessible by a pipette tip.

Being accessible by a pipette tip may be understood as being configured to accommodate the pipette tip during operation for top-loading or top-removal of fluid.

The intermediate chamber may have an extension of at least 8 mm, such as at least 15 mm, such as at least 25 mm. The intermediate chamber may have a width of 100 μm to 9 mm. The intermediate chamber may have a depth of 50 μm to 5 mm. The width to depth ratio of the intermediate chamber may be 0.3 to 5. For the intermediate chamber, the width multiplied by the length may be at least 100 $mm^2$.

It may be desired that the intermediate chamber does not extend too far in any direction perpendicular to the intended direction of flow. This may provide the advantage that the first fluid, e.g. sample fluid, will not get caught in pockets of the chamber during processing, i.e. when the second fluid, e.g. oil, enters the chamber and pushes the first fluid towards the collection chamber via the first fluid junction. Accordingly, a complete processing of the first fluid may be achieved with the present invention.

The intermediate chamber may have a volume of at least 5 μL, such as at least 10 μL, such as at least 15 μL, such as at least 20 μL. The intermediate chamber may have a volume of at most 50 μL. The intermediate chamber may have a volume of 15 μL to 35 μL.

It may be desired that the volume of the intermediate chamber is higher than the volume of first fluid intended to be processed, such as at least 10% higher, such as at least 20% higher.

The desired restrictions to the extension of the intermediate chamber in any direction perpendicular to the intended direction of flow in combination with the desired volume may result in a need for a certain extension of the intermediate chamber. However, due to restrictions in general size of the microfluidic device and/or a desire of a structure where the overall extension is limited, the inventors have found a solution.

Accordingly, the intermediate chamber may extend along a curved line.

The curved line may comprise at least two parts, or zones, extending in opposite directions, such as at least three parts extending in opposite directions. Depending on the embodiment, it may be desired to have an even or uneven number of parts of the intermediate chamber extending in opposite directions.

The intermediate chamber according to the present invention may extend longer than the distance between the input and the outlet thereof.

The extension of the intermediate chamber may be considered as being along the center of the intended flow during the intended use.

The intermediate chamber may have a serpentine-shaped part.

The secondary supply conduit may comprise a first secondary supply conduit and a second secondary supply conduit. The first secondary supply conduit and the second secondary supply conduit may branch out along the intended direction of flow from a common conduit part of the secondary supply conduit, such that each of the first secondary supply conduit and the second secondary supply conduit arrive at the first fluid junction from different directions, e.g. opposite directions, e.g. corresponding to opposing sides of the first fluid junction. Accordingly, emulsification may be facilitated. This may be denoted as "pinching".

The collection container may have a bottom part having an inclining surface. The collection orifice may be provided at the lowermost part of the collection container.

It may be desired that the first fluid, such as a water based fluid, has a lower density than the second fluid. Accordingly, the emulsion droplets will end up in the top part of the fluid of the collection conduit during processing.

Figure 13A:
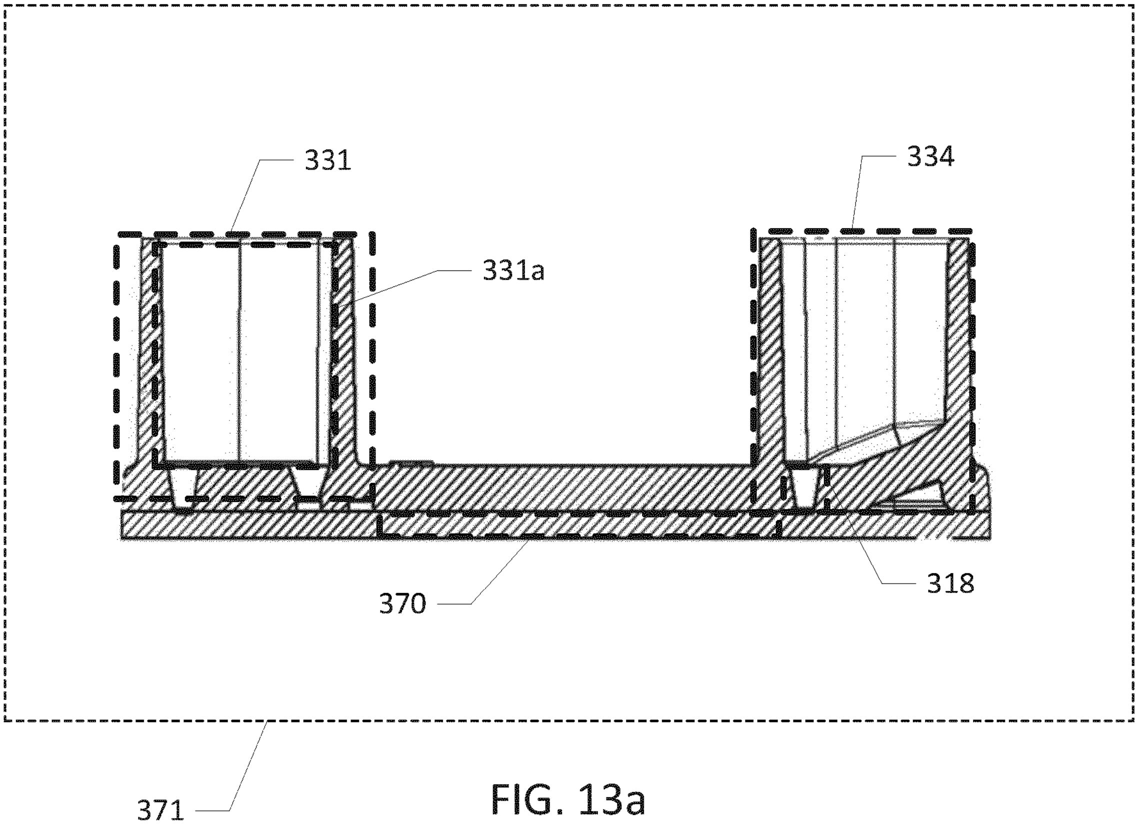

Accordingly, uptake of the droplets may be facilitated by, after the emulsification process has ended, first taking the fluid from the bottom of the container away, where after the remnant in the collection container comprises a lower amount of processed fluid having a concentrated number of emulsions at a concentrated volume of the collection container (cf. collection container 334 in FIG. 13*a*).

The density of fluorinated oil Novec HFE-7500 (3M, USA) is 1614 kg/m$^3$. The density of fluorinated oil FC-40 is 1855 kg/m$^3$.

The inclining surface of the collection well may be provided by a sub-collection container recess. This may be an advantage for production, e.g. by injection molding, where production may be facilitated by provision of material of similar thickness.

The secondary supply container may have a volume of 50 μL-500 μL, such as 100 μL-300 μL, such as 150 μL-250 μL, such as around 200 μL.

The collection container may have a volume of 50 μL-500 μL, such as 100 μL-350 μL, such as 200 μL-300 μL, such as around 250 μL.

The collection container may have a volume being bigger than the secondary supply container, such as being at least the combined volume of the secondary supply container and the intermediate container.

The primary supply conduit may comprise the conduit leading from the intermediate chamber to the first junction. The primary supply conduit may have a serpentine-shaped part from the intermediate chamber to the first junction.

The primary supply conduit may have at least the same volume as a secondary supply conduit and/or between 0.025 to 1.3 μL such as between 0.045 to 0.85 μL, such as around 0.22 μL. The primary supply conduit may extend along a curved line. The curved line may comprise at least two parts, or zones, extending in opposite directions, such as at least three parts extending in opposite directions. Provision of the primary supply conduit such as described may facilitate provision of a conduit, which may extend longer than the distance between the input and the outlet thereof. The extension of the primary supply conduit may be considered as being along the center of the intended flow during the intended use.

Each of the first secondary supply conduit and second secondary supply conduit may have a volume of between 0.02 to 1.2 μL such as between 0.04 to 0.8 μL.

The secondary supply conduit may have volume of 0.04 to 2.4 μL such as between 0.08 to 1.6 μL, such as around 0.35 μl.

It may be desired that the second fluid will arrive before the first fluid to the junction during use of the device. Accordingly, the volume of each of the first secondary supply conduit and second secondary supply conduit may be smaller than the volume of the primary supply conduit.

The collection conduit may have a volume of 0.01 to 1 μL such as between 0.02 to 0.6 μL, such as around 0.06 μl.

The volume of the fluid conduit network may be between 0.06 to 6 μL such as between 0.2 to 3 μL such as between 0.3 to 1.5 μL, such as around 0.62 μl.

The shape of the walls defining the secondary supply container may be configured for guiding a pipette tip towards the primary orifice.

The shape of the walls defining the secondary supply container may have noncircular cross-section seen in the horizontal plane.

The shape of the walls defining the secondary supply container may have tapering sidewalls towards the first side of the secondary supply container being closes to the primary orifice.

The microfluidic device according to the present invention may comprise a plurality of components forming the emulsification section and the container section.

The plurality of components may form a fixedly connected unit.

Each component may be fixedly attached to at least one other component.

Each component of the plurality of components may comprise at least one side facing and being attached to a side of another component of the plurality of components, such that each component is fixedly attached to at least one other component, and such that the plurality of components forms a fixedly connected unit.

The plurality of components may comprise a first component and a second component being fixed to and facing each other. The plurality of components may comprise a third component.

The fluid conduit network of each emulsification section may be formed in part by the first component and in part by the second component.

The intermediate chamber of each group of containers may be formed in part by a first recess in one component of the plurality of components, such as one of the first component, the second component, and the third component. Furthermore, the intermediate chamber of each group of containers may be formed in part by a first flat surface of another component of the plurality of components, such as another one of the first component, the second component and the third component.

The secondary supply container of each group of containers, the collection container of each group of containers, and the first recess of the intermediate chamber of each group of containers may be provided in the same component of the plurality of components The secondary supply container and the collection container may comprise respective top-openings facing in the opposite direction as compared to the first recess of the intermediate chamber.

Advantage: it may be easier to provide, e.g. mould, all larger structures in one piece/structure while providing the smaller structures in one or more other pieces structures.

The component, which may comprise the first recess, may comprise a plate-like section wherein the first recess may be provided. The thickness of the plate-like section immediately next to the recess may be between 0.5 mm and 3 mm.

The secondary supply container of each group of containers and the collection container of each group of containers may be provided in the third component.

Two components of the plurality of components may respectively be denoted: top component (cf. top component 382 FIG. 11), and bottom component (cf. bottom component 380 FIG. 11). The top component may comprise any of the plurality of components, such as the first component or the second component. The bottom component may comprise another of the plurality of components.

For one or more embodiments, wherein the plurality of components comprises three components (cf. e.g. FIGS. 1, 7, and 14), these may respectively be denoted: top component (cf. 482, FIG. 14), bottom component (cf. 480, FIG. 14), and intermediate component (cf. 481, FIG. 14). The top component may comprise any of: the first component, the second component, and the third component. The bottom component and the intermediate component may comprise respective other components of the first component, the second component, and the third component.

The top component may be denoted top piece. The bottom component may be denoted bottom piece. The intermediate component may be denoted intermediate piece.

The present invention may comprise provision of a first recess in a top component, which first recess forms a main part of the intermediate chamber.

The present invention may comprise provision of a second recess in the top component, which second recess forms a main part of the emulsification section, the second recess being a ramified recess.

The present invention may comprise an intermediate component in form of a capping layer provided between the top piece and bottom piece. A first side of the capping layer may provide a capping part of the fluid conduit network. This may entail the advantage that the capping of the fluid conduit network, and in particular the microfluidic parts thereof, may be provided by a thin layer. A thin layer may enable an improved flatness compared to a large structure such as the top piece. Further, it may be an advantage that small and large structures are not part of the same component, which otherwise may lead to sinking or deformation of critical parts of the smallest structures.

For the assembly according to the present invention, which assembly comprises the microfluidic device, a thermal structure, and a holder configured to provide a thermal connection between the thermal structure and a bottom part of the microfluidic device, the holder may have a footprint configured for insertion into a pressure supplying instrument for supplying pressure to at least the secondary supply container, such as a secondary supply well.

A first end and a second end of the device may have different shapes such that the device can only have one orientation on the holder.

The method for providing emulsion droplets according to the present invention may comprise the following steps:

accommodating a distal end zone of a pipette tip into the primary orifice and injecting a first fluid from the pipette tip into the intermediate chamber of a first group of containers;

providing a second fluid to the secondary supply container of the first group of containers; and providing a pressure difference between the secondary supply container of the first group of containers and the collection container of the first group of containers, such that the pressure within the secondary supply container of the first group of containers is higher than within the collection container of the first group of containers.

When the method comprises use of the kit according the present invention, the first fluid may comprise the sample buffer and/or the second fluid may comprise the oil.

For carrying out the method for providing emulsion droplets according to the present invention, the step of accommodating a distal end zone of a pipette tip into the primary orifice and injecting a first fluid from the pipette tip into the intermediate chamber of a first group of containers, may comprise providing a seal between the pipette tip and the primary orifice. This may alleviate that the first fluid or part thereof will be provided to the secondary supply conduit instead of in the intermediate chamber.

The step of providing a pressure difference may be provided subsequent to the step of accommodating the distal end zone of the pipette tip into the primary orifice. The step of providing a pressure difference may be provided subsequent to the step of providing the second fluid to the secondary supply container. The method may comprise a step of allowing the entire first fluid held by the intermediate chamber to arrive to the collection container, e.g. while maintaining the pressure difference between the secondary supply container of the first group of containers and the collection container of the first group of containers.

Materials which may be suitable for the microfluidic device, such as one, more, or all of: the first piece, the second piece, and the third piece, may be provided in a material comprising any one or any combination of: Polyvinyl alcohol (PVOH), Polyvinyl acetate (PVA), Nylon 6 (polycaprolactum, aramid 6), Polyethylene oxide (PEO, PEG, polyethylene glycol), Nylon 6,6, Nylon 7,7, Polysulfone (PSU), Polymethyl methacrylate (PMMA, acrylic, plexiglas), Nylon 12, Polyethylene terephthalate (PET), Epoxies, Polyoxymethylene (POM, polyacetal, polymethylene oxide), Polyvinylidene chloride (PVDC, Saran), Polyphenylene sulfide (PPS), Acrylonitrile butadiene styrene (ABS), Nylon 11, Polycarbonate (PC), Polyvinyl fluoride (PVF), Polyvinyl chloride (PVC), Nylon 9,9, Polystyrene (PS), Polyvinylidene fluoride (PVDF), Cyclic olefin co-polymer (COC), Cyclic olefin polymer (COP), Zeonor, Topas, Zeonex, Apex, Poly n-butyl methacrylate (PnBMA), Polytrifluoroethylene, Nylon 10,10, Polybutadiene, Polyethylene (PE), Polychlorotrifluoroethylene (PCTFE), Polypropylene (PP), Polydimethylsiloxane (PDMS), Poly t-butyl methacrylate (PtBMA), Fluorinated ethylene propylene (FEP), Hexatriacontane, Paraffin, Polytetrafluoroethylene (PTFE), Poly(hexafluoropropylene), and Polyisobutylene (PIB, butyl rubber).

Possible advantages associated with the above may include relative higher contact angles, which may be needed for forming water-in-oil droplets, at least within the part of the fluid conduit network being in immediate extension of the first fluid junction in the direction for intended flow during the intended use of the device.

The secondary supply container may be denoted a secondary supply well. The collection container may be denoted a collection well. The tertiary supply container, if provided, may be denoted a tertiary supply well. An elongate shape of these may be desired along the length, e.g. defined along a direction between the secondary supply container and the collection container. This may be due to limitation with respect to the width, which may be more restrictive than any limitation for the length. The width is e.g. defined perpendicular to the length and within a horizontal plane The microfluidic device may comprise a plurality of sample lines. An emulsification unit and a corresponding group of containers may be commonly referred to as a sample line. The microfluidic device may comprise 8 sample lines. The microfluidic device may be provided such that each collection container of the plurality of collection containers are aligned with each other.

The microfluidic device may be provided such that each secondary supply container of the plurality of secondary supply containers are aligned with each other. The microfluidic device may be provided such that each primary orifice of the plurality of primary orifices are aligned with each other. This may facilitate use of a multichannel pipette.

According to the present invention, once the first fluid, e.g. the sample fluid, has been emulsified, the second fluid, e.g. oil, will go through the primary supply conduit. Accordingly, it may be avoided or alleviated that air enters the collection container via the emulsification section, which otherwise may be unwanted, since the air may destroy the emulsifications. This may of course be at least until all the second fluid has been pushed through the emulsification section. However, it may allow additional time to pass from the last of the first fluid being emulsified and having arrived at the collection container and until air may start to arrive at the collection container as compared to prior art solutions.

The microfluidic device may be designed for a specific combination of viscosities of the first and second fluids in order to be able to provide a desired volumetric flow rate for the respective supply conduits during use, which in turn may be in order to achieve desired emulsifications during use, e.g. desired in terms of droplet size.

It may be desired that the entire first fluid is being emulsified, or at least that the percentage not being emulsified is small.

The container section and the emulsification section may form a fixedly connected unit, wherein each group of containers forms a fixedly connected unit with a respective corresponding emulsification unit.

The microfluidic device may comprise a handle/protrusion for handling the device. The handle/protrusion may protrude from a top side of the microfluidic device, such as from a top side of a top component of the microfluidic device.

The openings into the first fluid junction may be in the range of 1000 $\mu m^2$ to 25000 $\mu m^2$, such as in the range of 4000 $\mu m^2$ to 7000 $\mu m^2$.

Any one or more components, such as the first component and/or the second component, may be provided by a plurality of sub-components, such as 2 or 4 sub-components.

Any one or more substrates, such as the first substrate and/or the second substrate, may be provided by a plurality of sub-substrates, such as 2 or 4 sub-substrates.

Throughout the present disclosure, the term “droplet” may refer to “emulsion droplet”, such as provided according to the present invention.

Figure 1A:
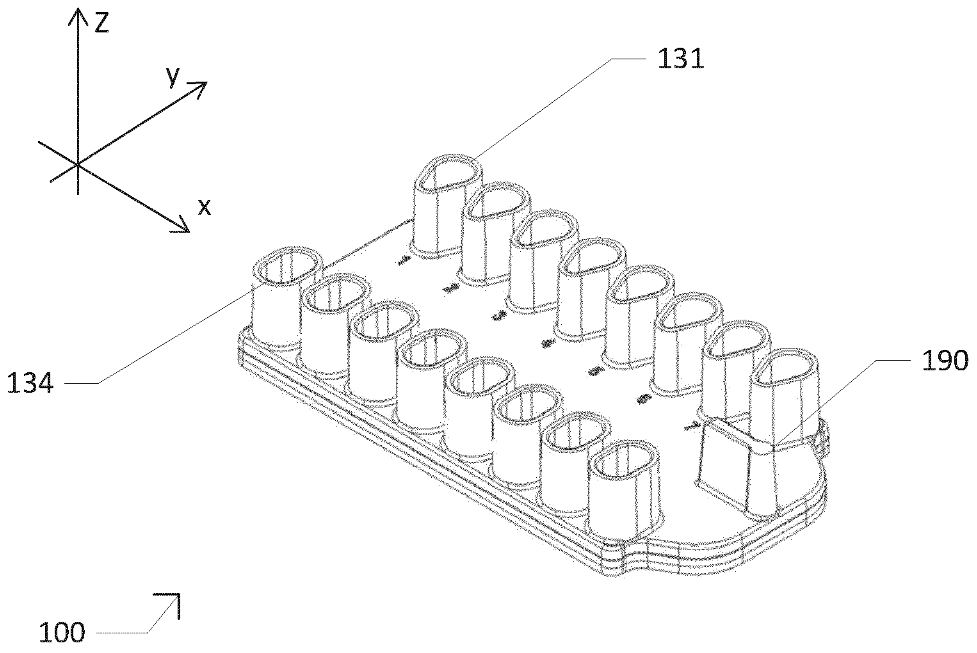
Figure 1B:
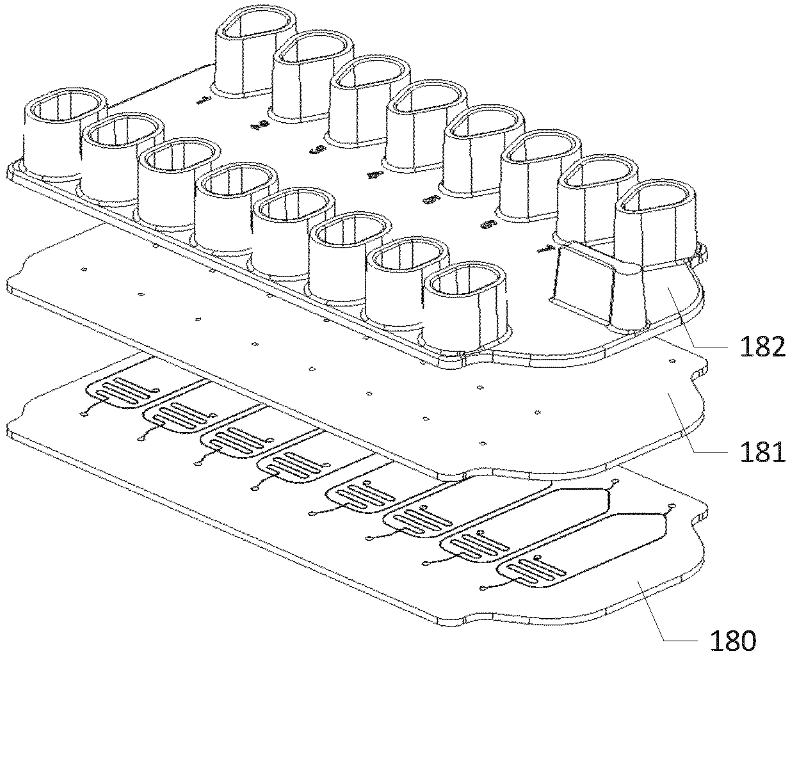

FIG. 1 schematically illustrates side views of a first embodiment of a microfluidic device according to the present invention. FIG. 1*a* illustrates an assembled view of the microfluidic device. FIG. 1*b* illustrates an exploded view of FIG. 1*a*.

FIG. 1*a* illustrates a microfluidic device 100 comprising a secondary supply container 131 and a collection container 134. Furthermore, the embodiment of FIG. 1*a* comprises a protrusion/handle 190.

FIG. 1*b* illustrates that the microfluidic device 100 of FIG. 1*a* comprises three different pieces, namely an upper piece 182, an intermediate piece 181 and a bottom piece 180. FIG. 1*b* shows all the pieces in an exploded view.

Figures 2A, 2B:
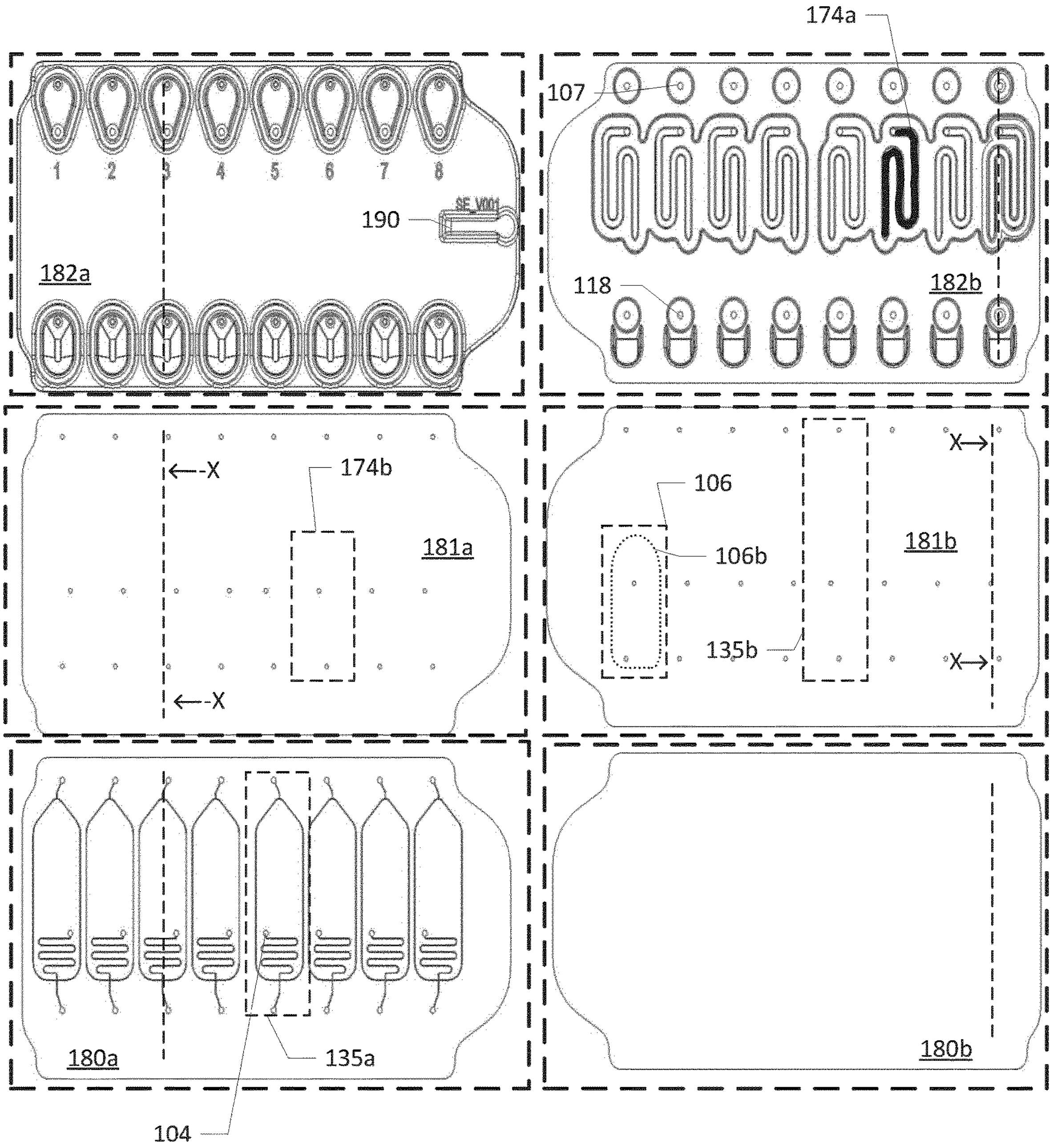

FIG. 2 schematically illustrates an exploded view of the first embodiment of a microfluidic device. FIG. 2*a* shows an exploded view of all of the pieces as seen from the top and FIG. 2*b* shows the exploded view of the pieces as seen from the bottom.

Figure 3A:
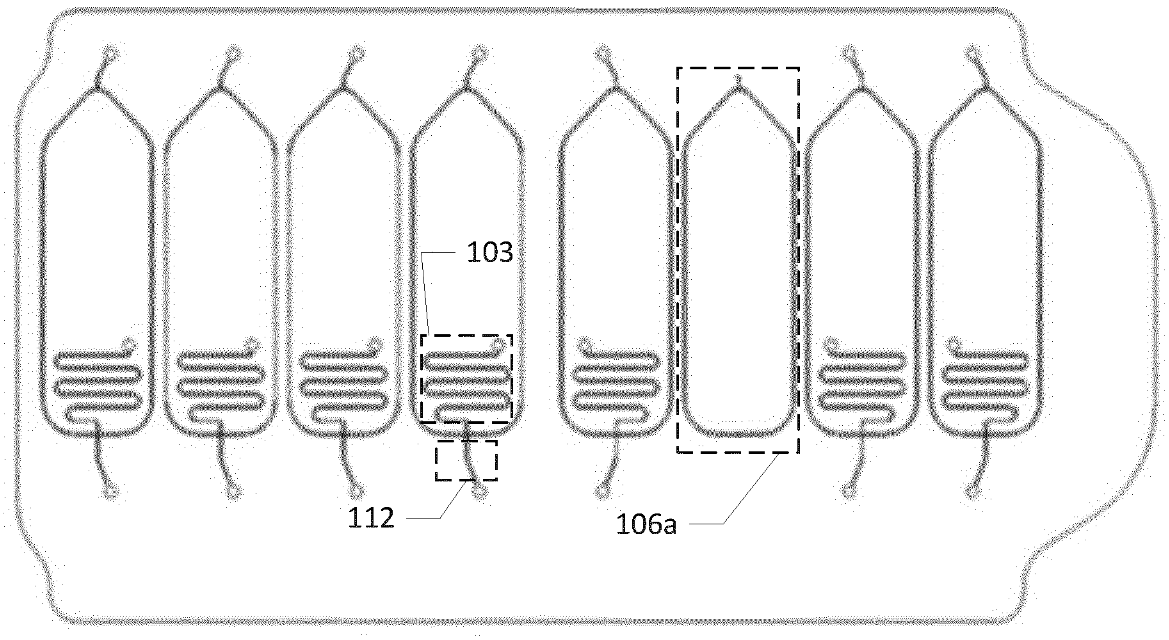
Figure 3B:
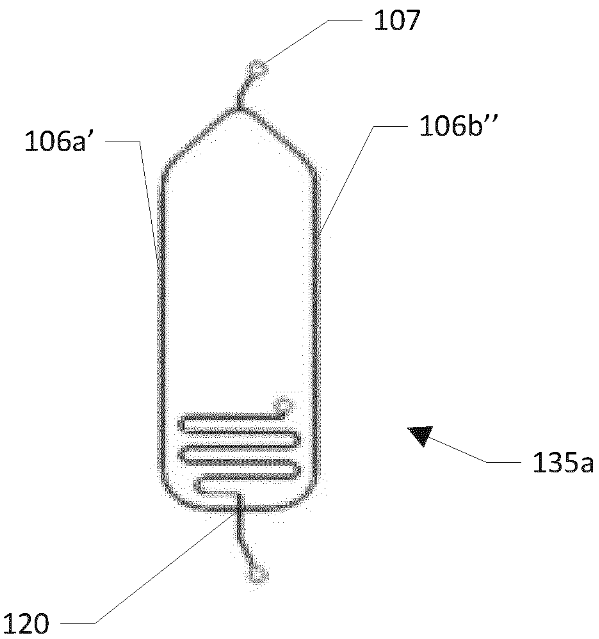

FIG. 3 schematically illustrates a top view of the bottom piece illustrated in FIG. 2*a*. FIG. 3*a* shows an enlarged drawing of the piece illustrated in 180*a*. FIG. 3*b* shows an enlargement of the individual fluid conduit network 135*a* as illustrated in FIG. 2*a*.

Figure 4A:
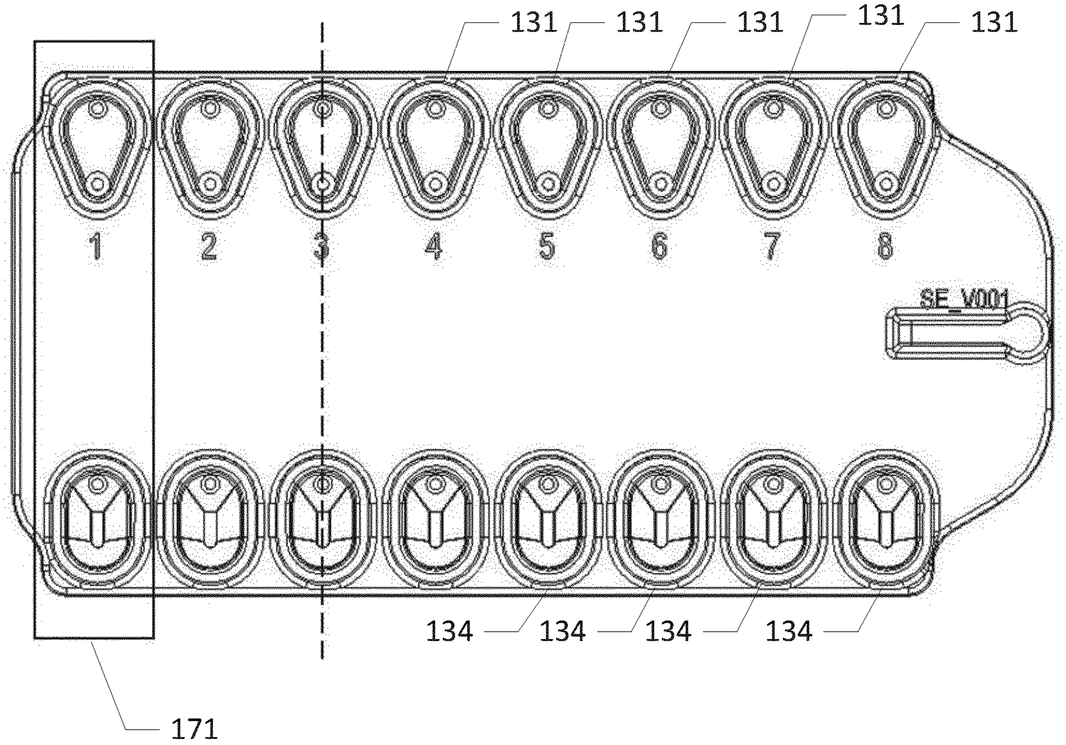
Figure 4B:
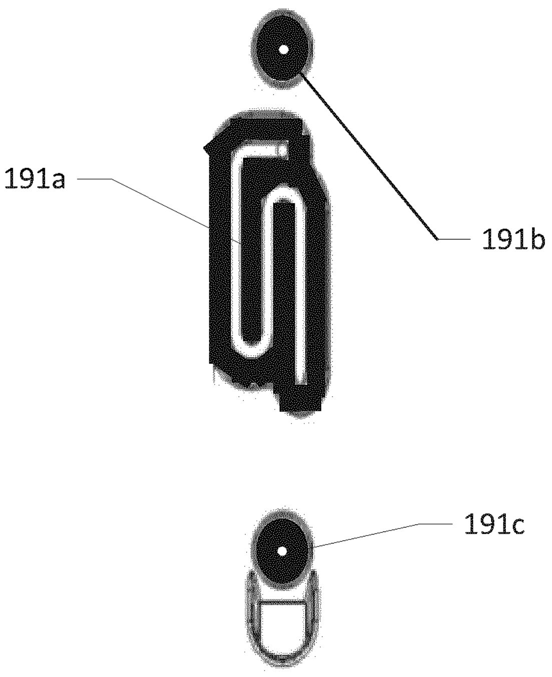

FIG. 4*a* schematically illustrates a top view of the embodiment of a microfluidic device according to FIG. 1 showing individual containers 131, 134. FIG. 4*b* illustrates the contact areas, e.g. sections, between the bottom 182*b* of the top piece as illustrated in FIG. 2*b* and the top 181*a* of the middle piece as illustrated in FIG. 2*a*. FIG. 4*b* illustrates a secondary supply recess 191*b* and an outlet recess 191*c*.

Figure 5A:
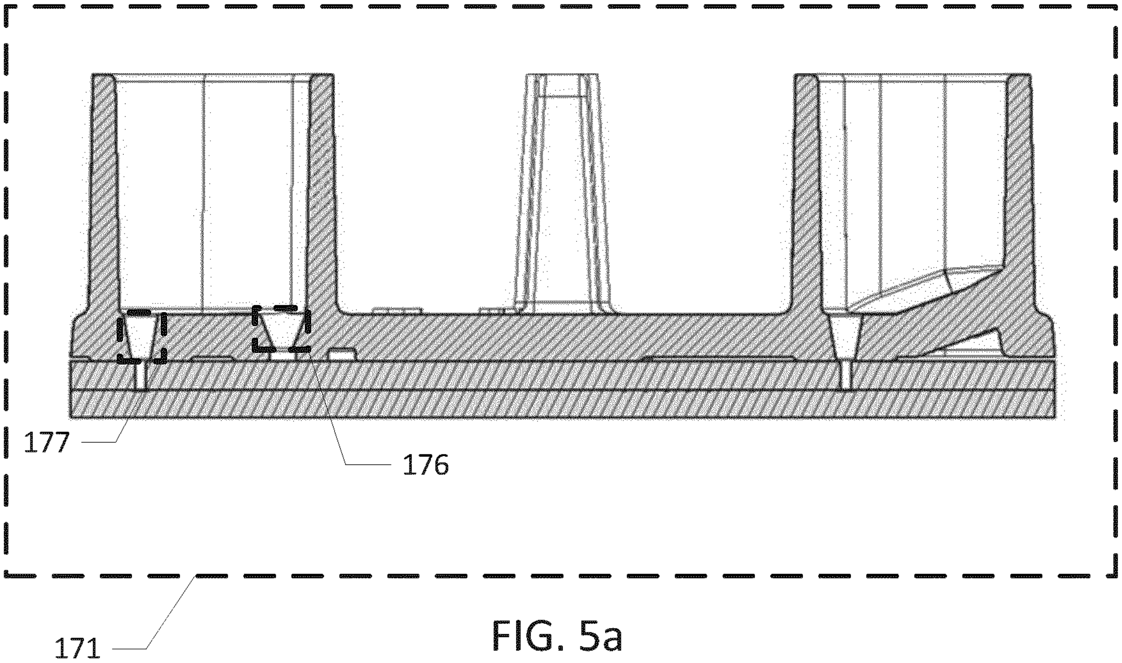
Figure 5B:
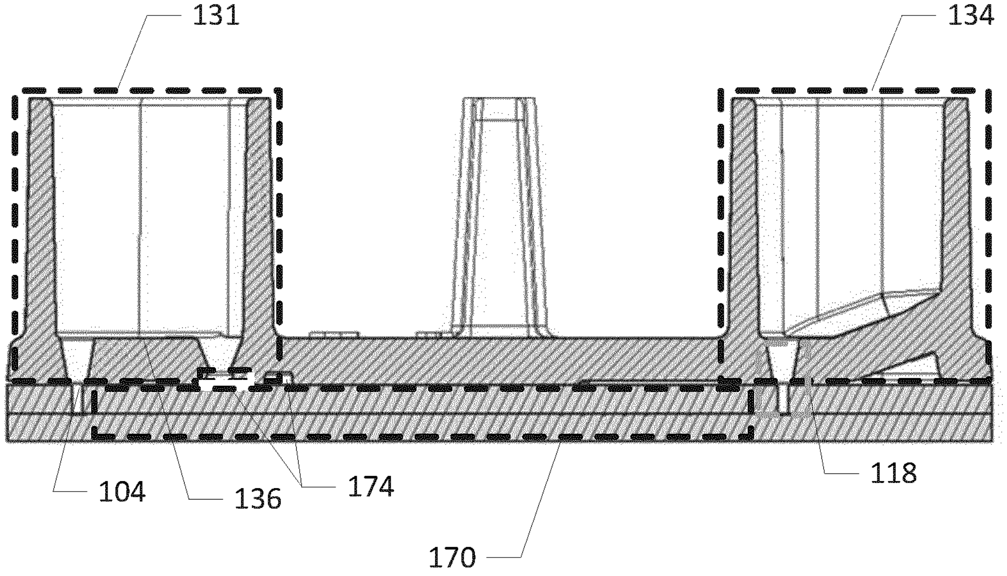

FIG. 5 illustrates a cross-sectional view of the group of containers as illustrated in FIG. 4*a*. FIG. 5*a* illustrates the cross-sectional view with some references while FIG. 5*b* illustrates the same a cross-sectional view with other references. FIG. 5 schematically illustrates a cross-sectional view of a first embodiment of a microfluidic device according to the present invention.

Figure 6:
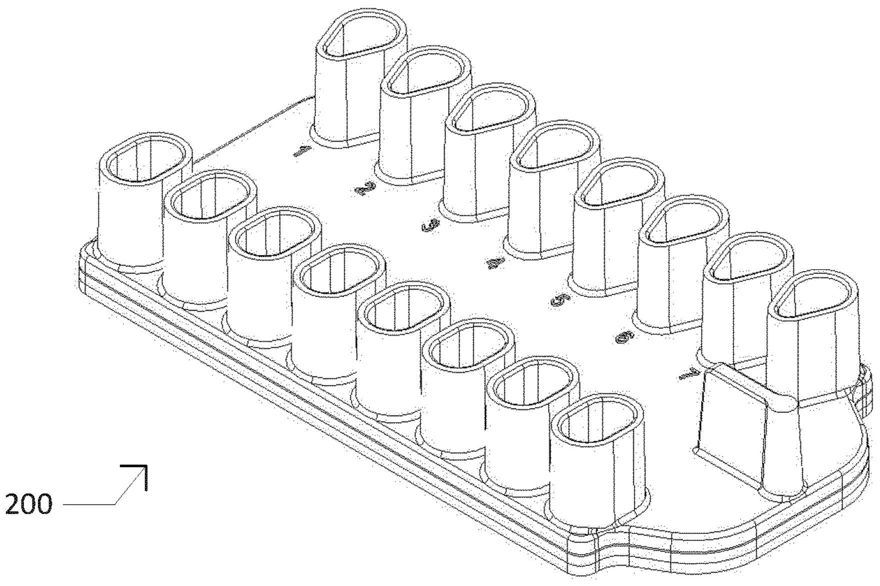

FIG. 6 schematically illustrates a side view of a second embodiment of a microfluidic device according to the present invention.

Figure 7A:
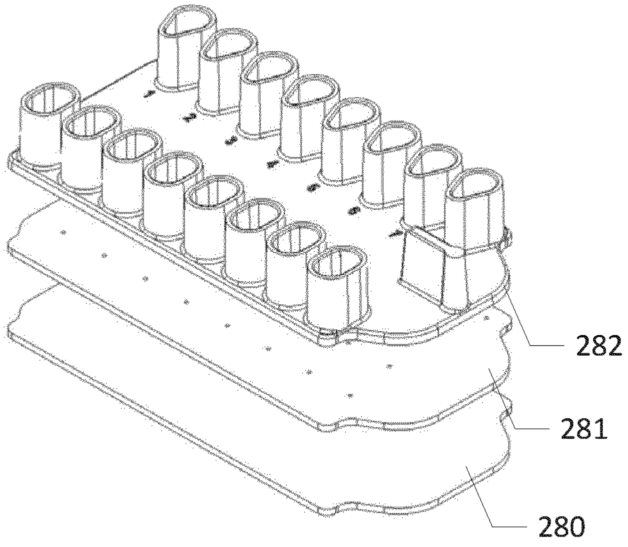
Figure 7B:
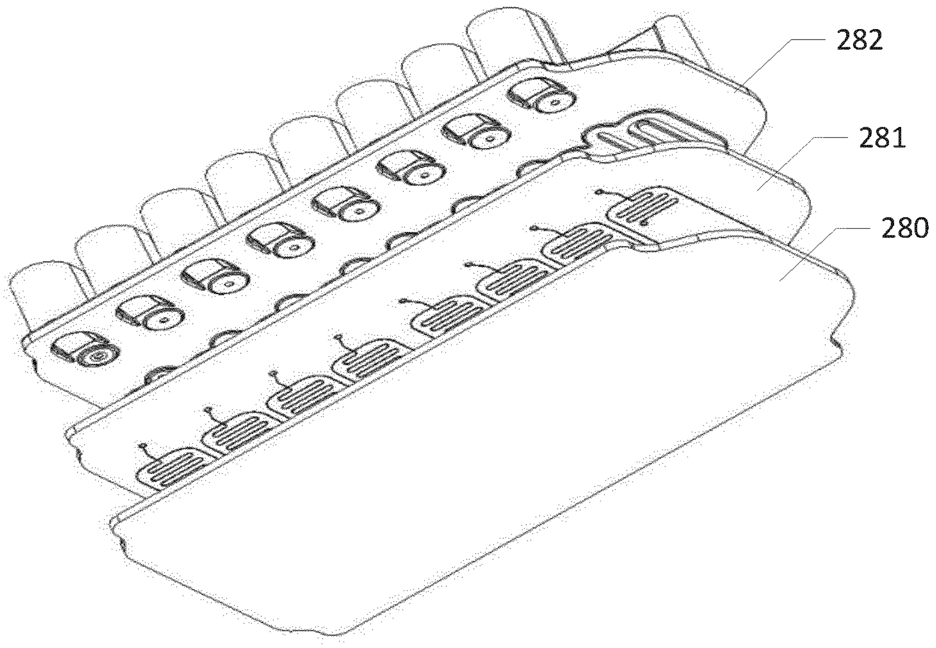

FIG. 7 schematically illustrates a side exploded view of a second embodiment of a microfluidic device according to the present invention. FIG. 7*a* illustrates the exploded view seen from the top. FIG. 7*b* illustrates the exploded view seen from the bottom.

Figures 8A, 8B:
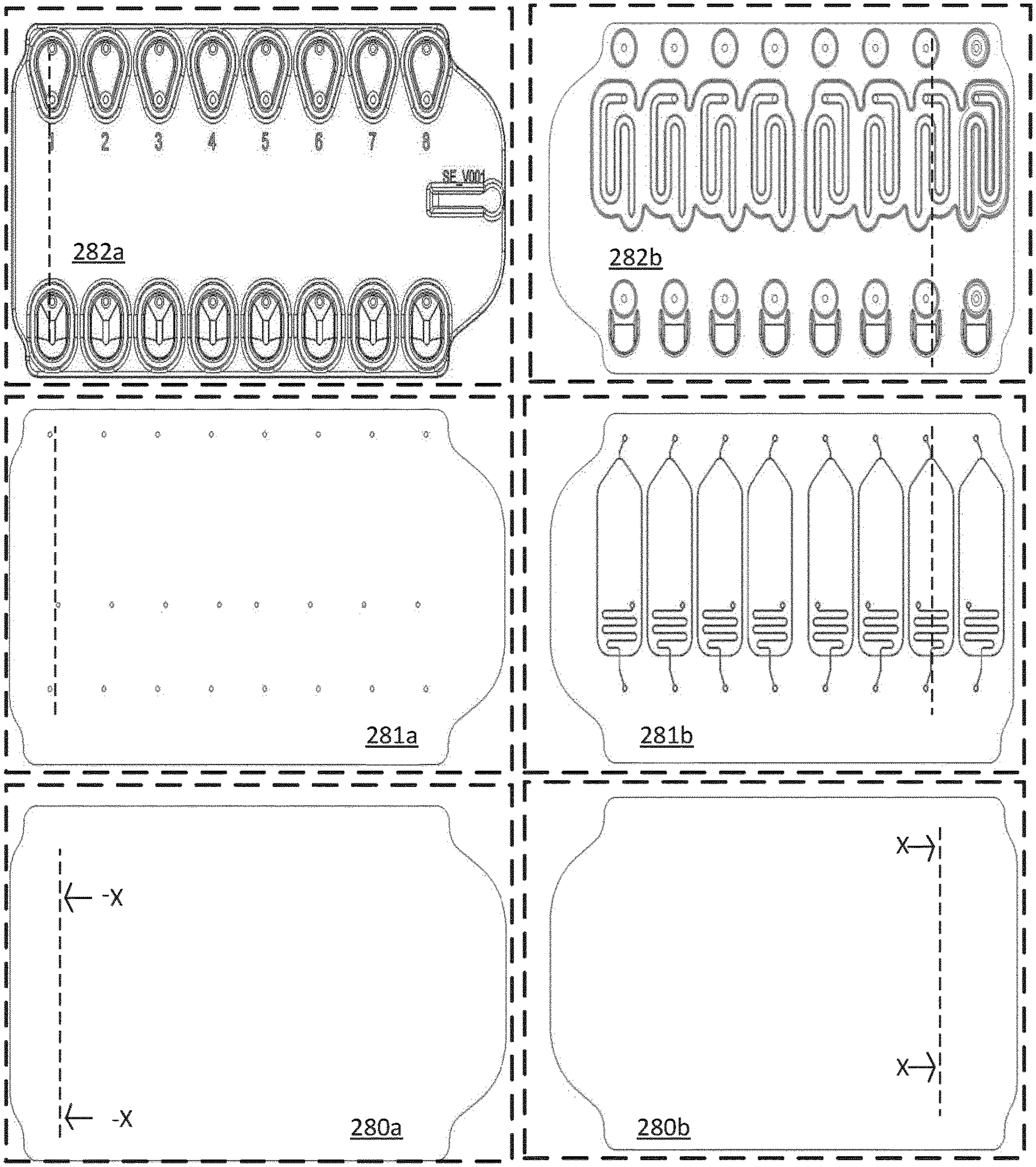

FIG. 8 schematically illustrates a top exploded view of the second embodiment of a microfluidic device according to the present invention. FIG. 8*a* shows an exploded view of all of the pieces as seen from the top. FIG. 8*b* shows the exploded view of the pieces as seen from the bottom.

Figure 9A:
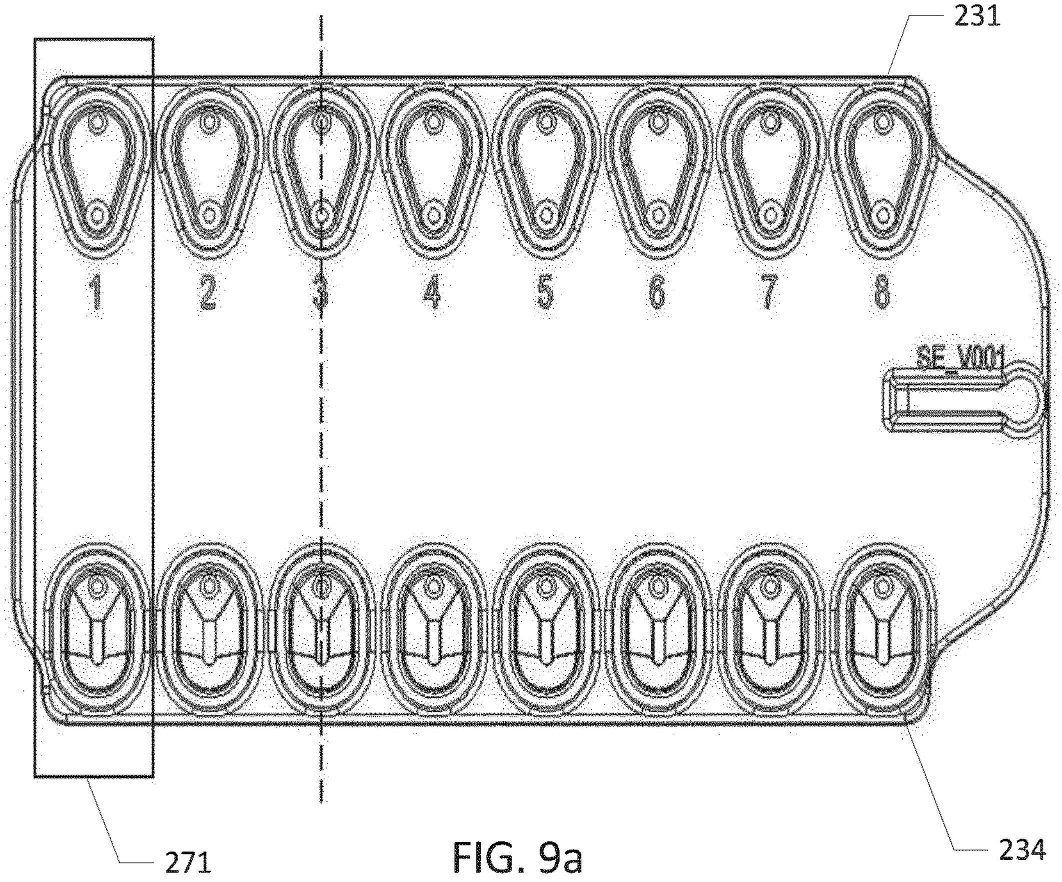
Figure 9B:
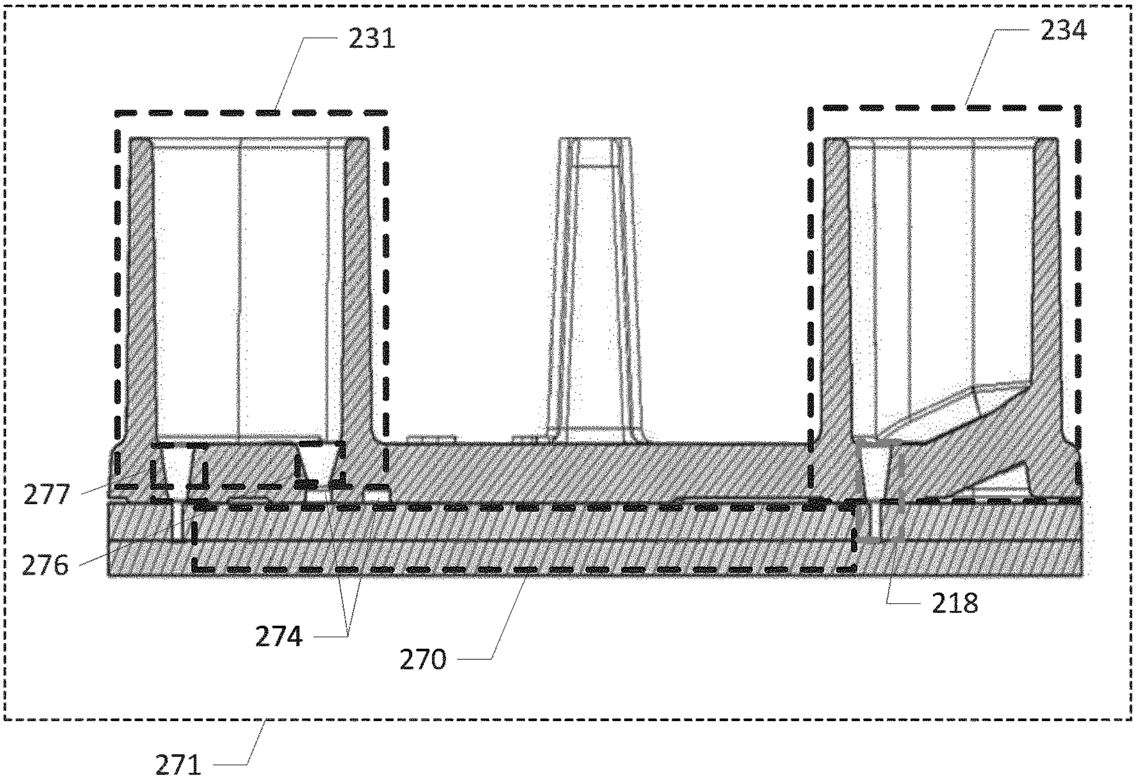

FIG. 9 schematically illustrates a top view of the embodiment of a microfluidic device according to FIG. 7. FIG. 9*a* shows the top view illustrating individual containers. FIG. 9*b* shows the cross-sectional view of the individual container illustrated in FIG. 9*a*.

Figure 10A:
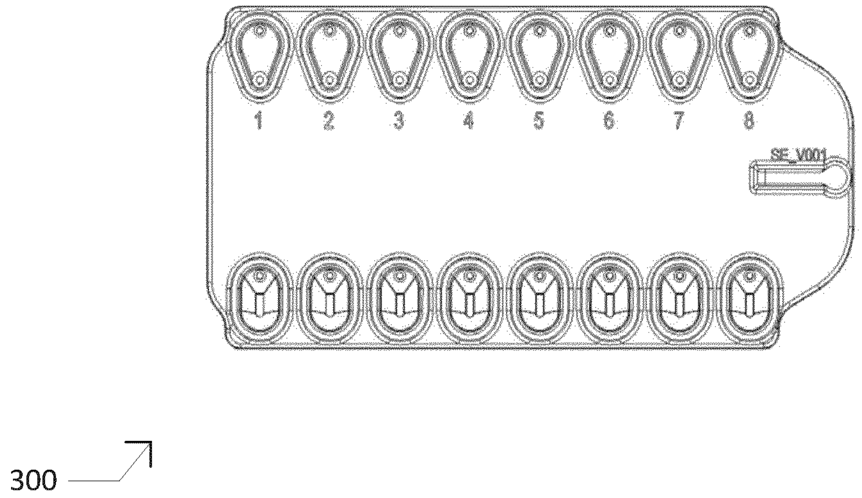
Figure 10B:
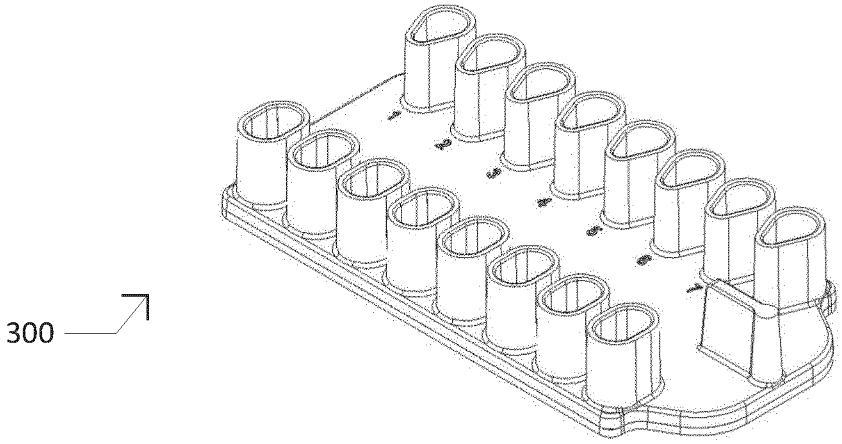

FIG. 10 schematically illustrates a non-exploded view of a third embodiment of a microfluidic device according to the present invention. FIG. 10*a* illustrates a top view of the third embodiment. FIG. 10*b* illustrates the side view of the third embodiment.

Figure 11A:
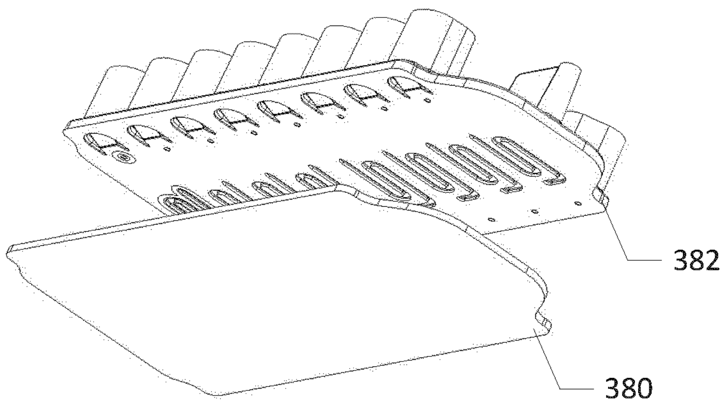
Figure 11B:
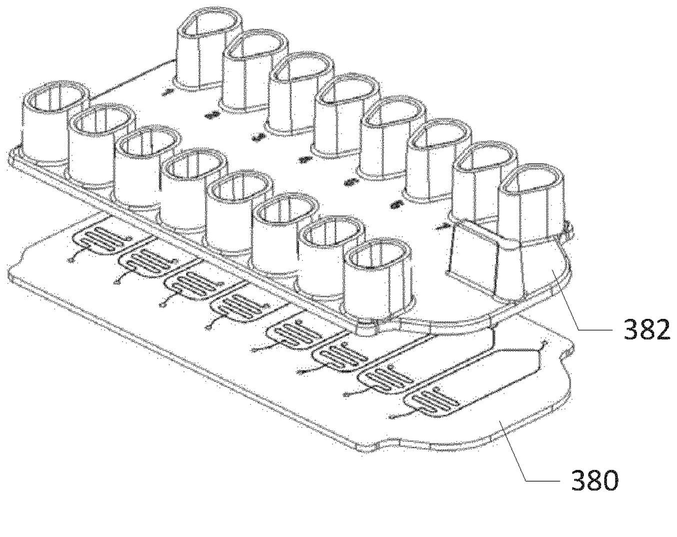

FIG. 11 schematically illustrates a top exploded view of the third embodiment of a microfluidic device according to the present invention. FIG. 11*a* shows an exploded view as seen from the bottom. FIG. 11*b* shows the exploded view of the pieces as seen from the top.

Figure 12A:
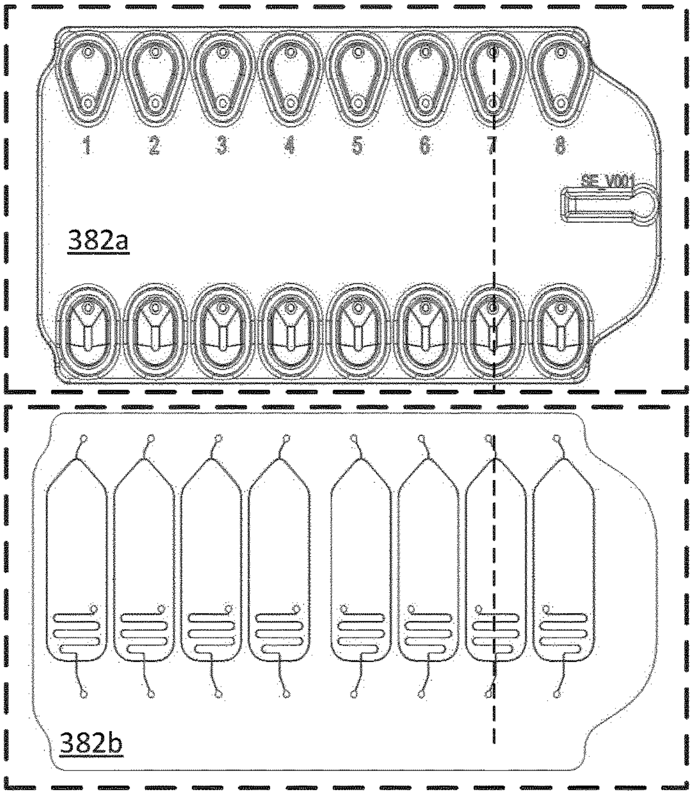
Figure 12B:
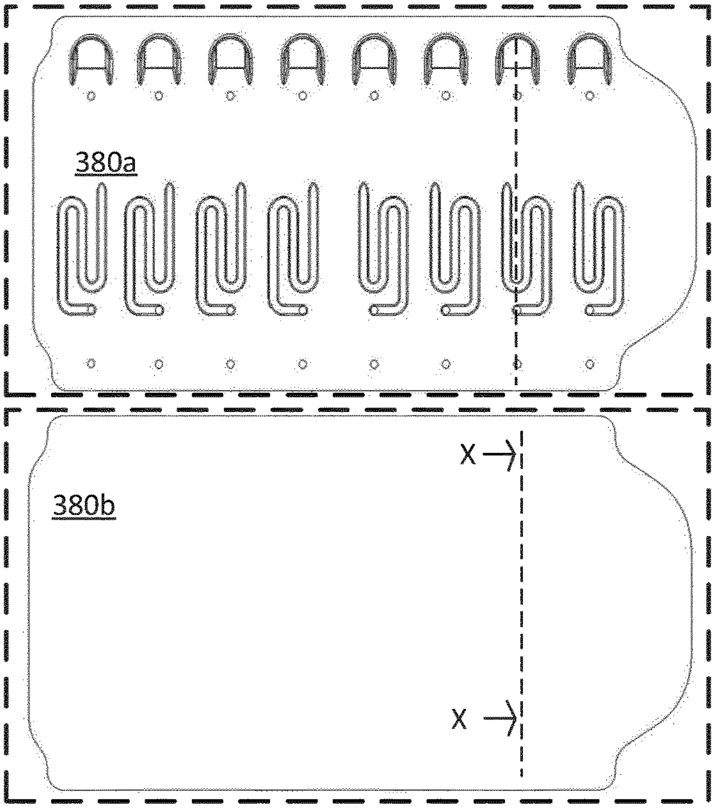

FIG. 12 shows an exploded top-view of the individual pieces according to the third embodiment of the present invention. FIG. 12*a* shows the individual pieces from the top view and FIG. 12*b* shows the individual pieces from the bottom view.

Figure 13B:
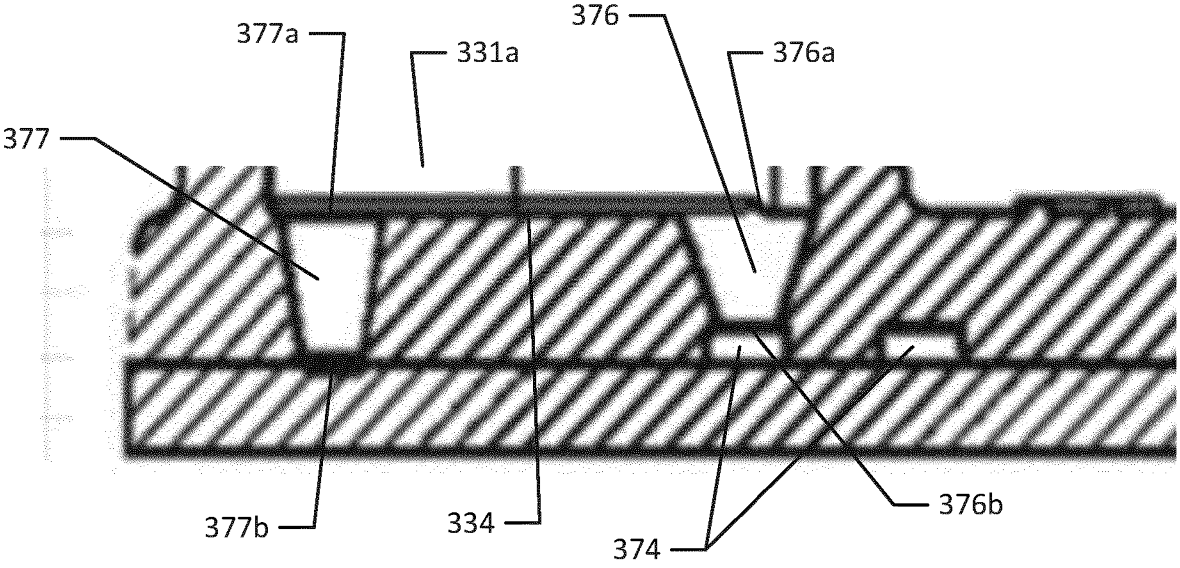

FIG. 13 shows a cross-sectional view of a group of containers according to the present invention. FIG. 13*a* shows the cross-sectional view and FIG. 13*b* illustrates the enlargement of the secondary supply container showing individual parts.

Figure 14A:
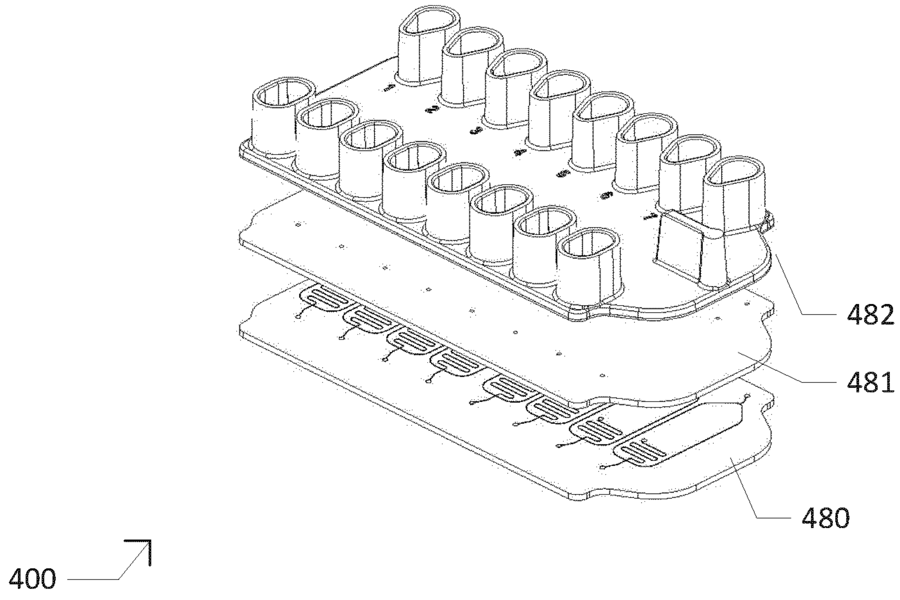
Figure 14B:
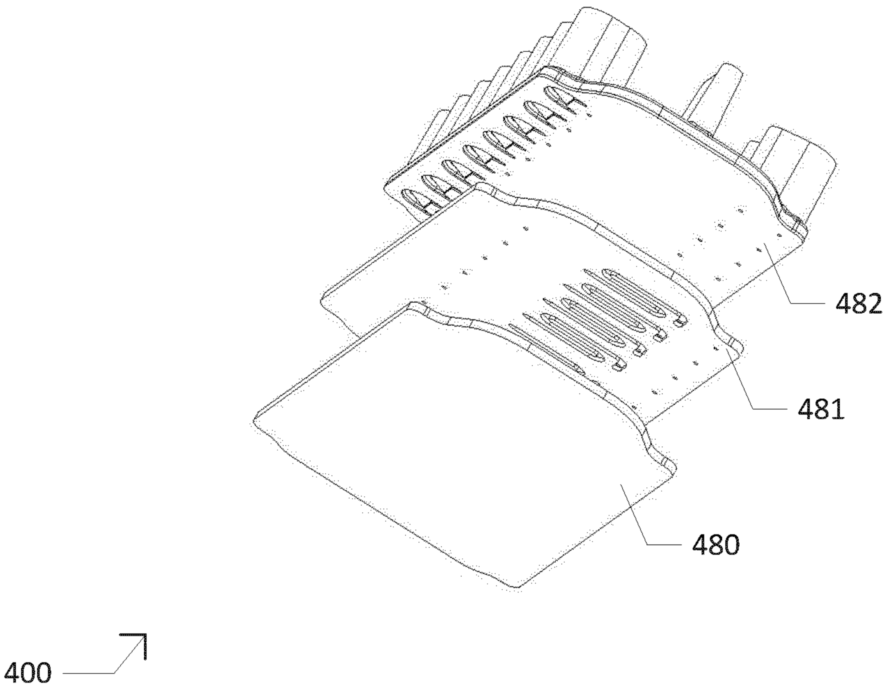

FIG. 14 schematically illustrates a top exploded view of the fourth embodiment of a microfluidic device according to the present invention. FIG. 14*a* shows an exploded view as seen from the top and FIG. 14*b* shows the exploded view of the pieces as seen from the bottom.

Figure 15A:
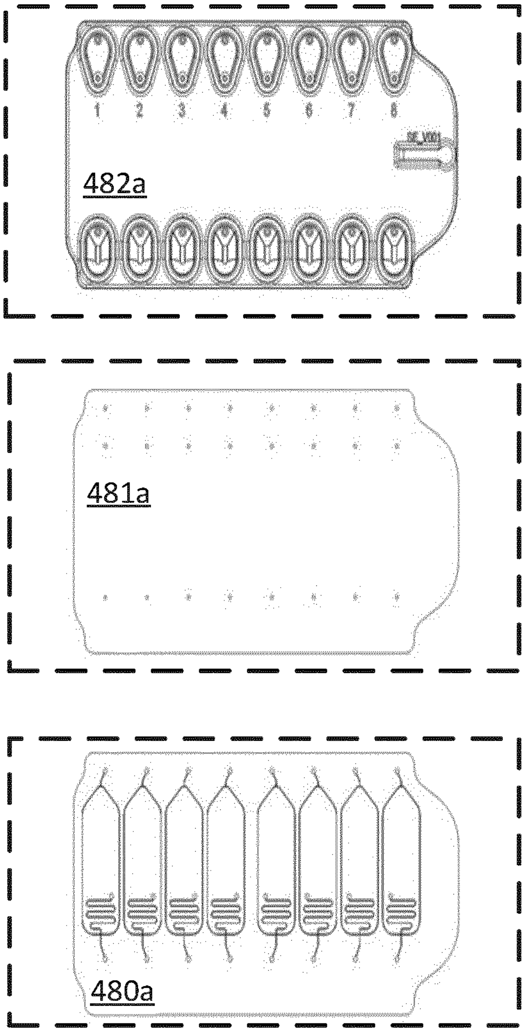
Figure 15B:
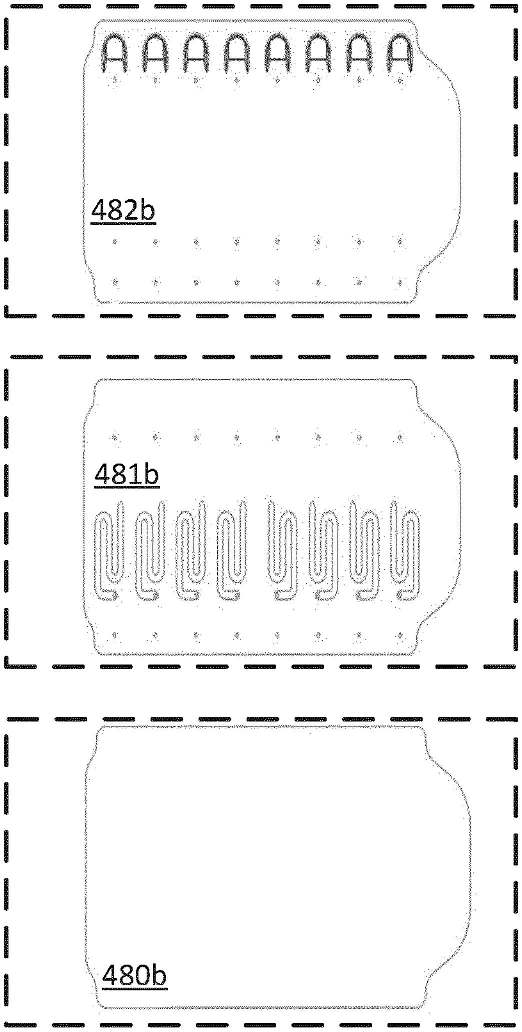

FIG. 15 shows an exploded top-view of the individual pieces according to the fourth embodiment of the present invention. FIG. 15*a* shows the individual pieces from the top and FIG. 15*b* shows the individual pieces from the bottom.

Figure 16A:
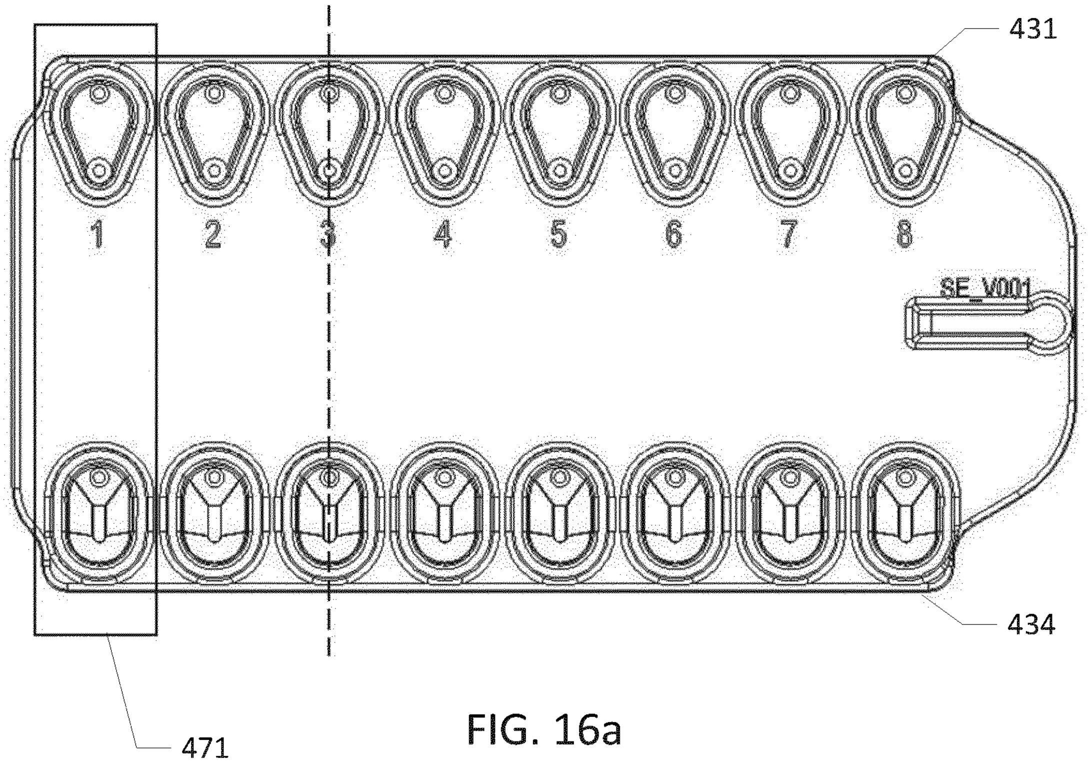
Figure 16B:
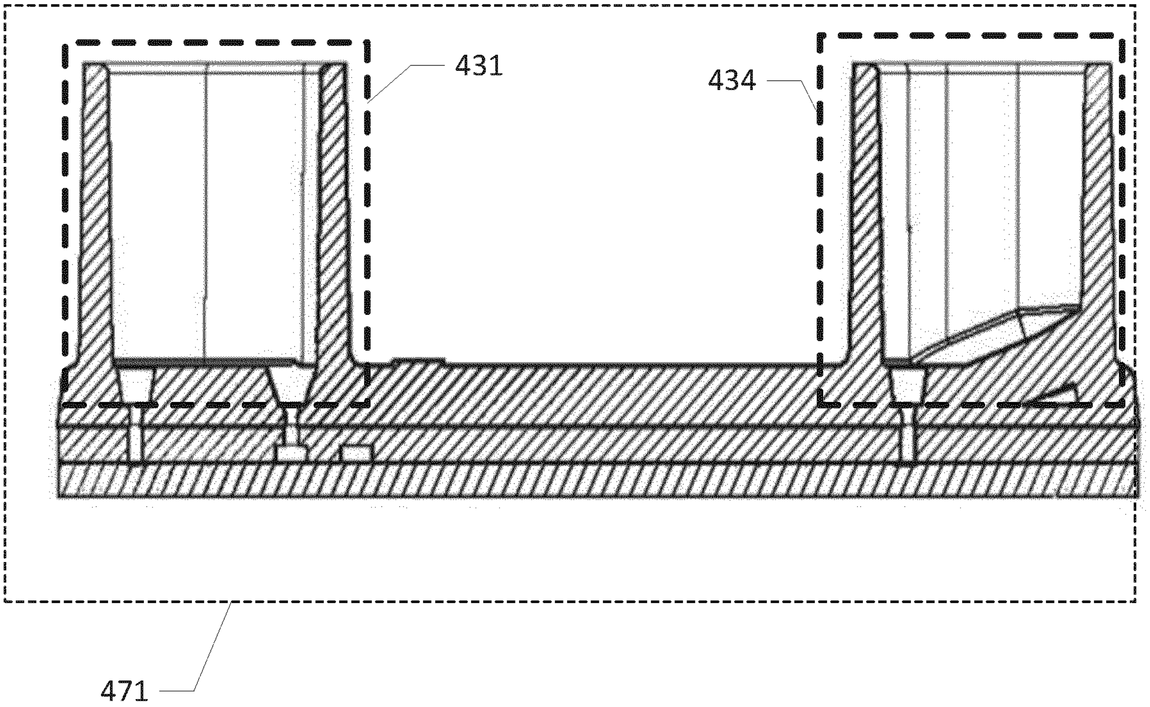

FIG. 16 schematically illustrates a top view of the embodiment of a microfluidic device according to FIG. 15. FIG. 16*a* shows the top view illustrating individual containers. FIG. 16*b* shows the cross-sectional view of the individual container illustrated in FIG. 16*a*.

Figure 17B:
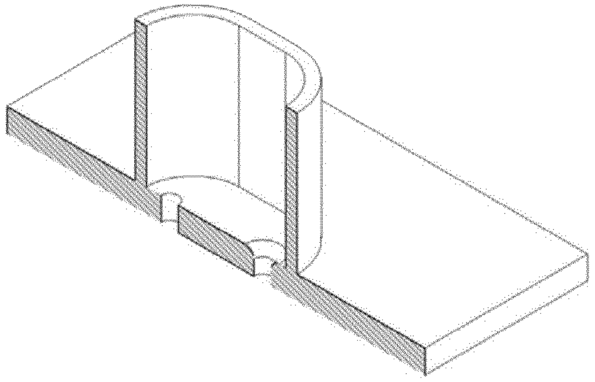

FIG. 17 schematically illustrates an embodiment of a secondary supply container FIG. 17*a* shows a cross-sectional view of one of the embodiments with the numerals and FIG. 17*b* shows a cross-sectional view of another of the embodiments according to the present application.

Figure 18A:
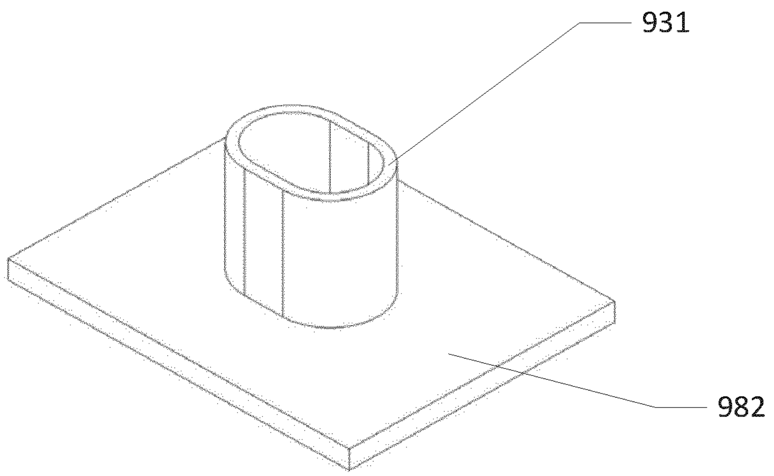
Figure 18B:
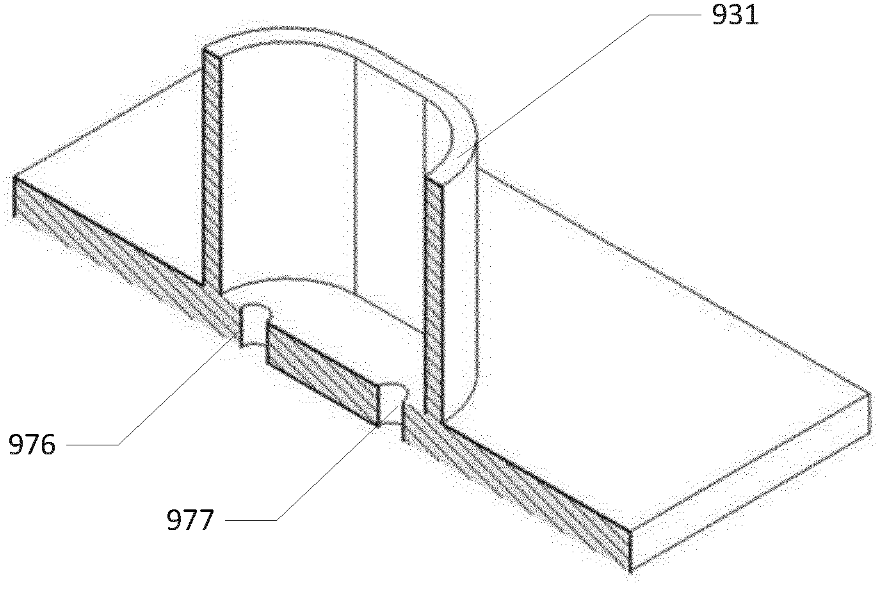

FIG. 18*a* illustrates an embodiment of a secondary supply container. FIG. 18*b* illustrates a cross-sectional view of the secondary supply container illustrated in FIG. 18*a*.

Figure 19A:
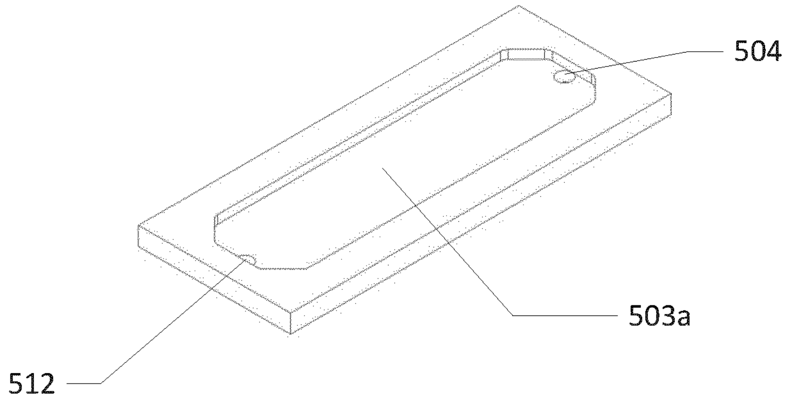
Figure 19B:
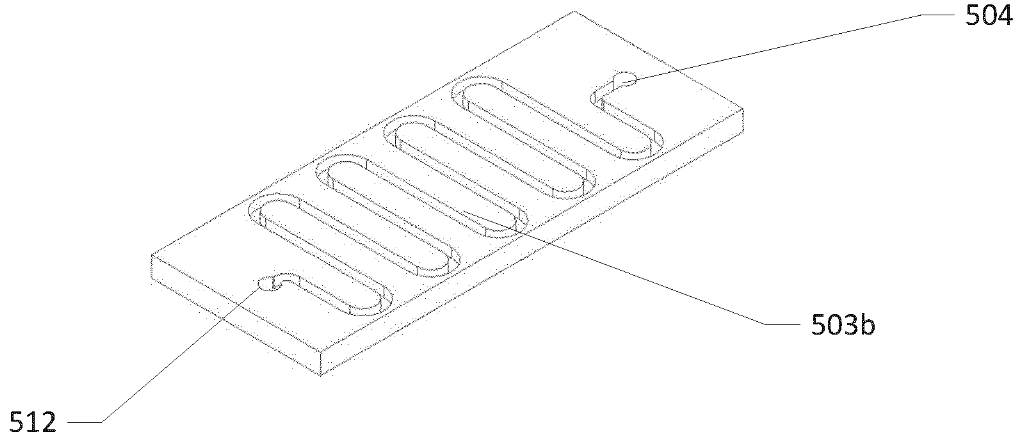
Figure 19C:
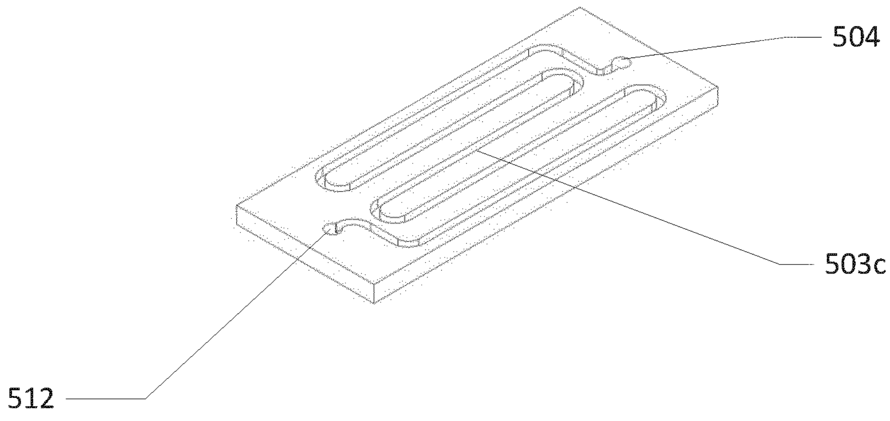

FIGS. 19*a-c* illustrates various different embodiments of a part of a fluid conduit network. FIG. 19*a* illustrates a recess structure 503*a*. FIG. 19*b* illustrates a serpentine structure 503*b*. FIG. 19*c* illustrates a U-shape structure 503*c*.

FIG. 23 schematically illustrates an isometric sectional view of a part of a conduit of a microfluidic device according to the present invention.

The microfluidic device 100, illustrated in FIGS. 1-5, comprises:

- an emulsification section comprising one or more emulsification units 170; a container section comprising one or more groups of containers 171 comprising one group of containers 171 for each emulsification unit 170;
- each emulsification unit 170 comprises of a fluid conduit network 135 (formed by part 135*a* and part 135*b*) comprising:
- a plurality of supply conduits 103, 106, 112 comprising a primary supply conduit 103 and a secondary supply conduit 106;
- a transfer conduit 112;
- a first fluid junction 120 providing fluid communication between the primary supply conduit 103, the secondary supply conduit 106, and the transfer conduit 112;
- each group of containers 171 comprising a plurality of containers 103, 106, 112 comprising an intermediate chamber 174, a collection container 134, and one or more supply containers 131 comprising a secondary supply container 131,
- the secondary supply container 131 defining a secondary supply cavity,
- the secondary supply container 131 comprising a secondary orifice 177 (cf. FIG. 5*a*) extending from the secondary supply cavity and a primary orifice 176 extending from the secondary supply cavity,
- the collection container 134 being in fluid communication with the transfer conduit 112 of the corresponding emulsification unit 170 via a collection orifice of the collection container 134,
- the secondary supply container 131 being in fluid communication with the secondary supply conduit 106 of the corresponding emulsification unit 170 via the secondary orifice 177,
- the secondary supply container 131 being in fluid communication with the intermediate chamber 174 of the same group of containers 171 via the primary orifice 176,
- the intermediate chamber 174 being in fluid communication with the first fluid junction 120 of the corresponding emulsification unit 170 via the primary supply conduit 103 of the corresponding emulsification unit 170.

The primary orifice 176 of the microfluidic device 100 is configured for accommodating a distal end zone of a pipette tip and is configured for forming a seal with the pipette tip when the distal end zone is accommodated by and pressed against the primary orifice 176. The primary orifice 176 or one or more surface parts of the primary orifice 176 may form one or more conical surface parts, which may be tapering in a direction away from the secondary supply cavity.

FIG. 5*b* illustrates a bottom part 136 of the secondary supply container 131.

The primary orifice 176 or one or more surface parts of the primary orifice may form one or more toroid surface parts, such as one or more ring torus surface parts.

From the first primary perimeter 376*a* the primary orifice 376 may gradually become narrower towards the second primary perimeter 376*b*. This concept is best illustrated in FIG. 13*b*. The distance from the first primary perimeter 376*a* to the second primary perimeter 376*b* may be less than 10 mm such as less than 3 mm. The first primary perimeter 376*a* may be defined as a cross-section of the primary orifice 376 bordering the secondary supply cavity 331*a*.

According to an embodiment of the current invention, a microfluidic device 100 is described, wherein the smallest diameter of the first primary perimeter is between 0.5 mm and 9 mm, and wherein the diameter of the second primary perimeter is between 0.10 mm and 3.0 mm. The smallest diameter of the first primary perimeter may be between 1.7 mm and 5 mm.

For facilitating the distal end of the pipette tip to be inserted easily into the primary orifice 176 of the secondary supply container 131, it may be desired that the smallest diameter of the first primary perimeter of the primary orifice 176 is larger than the outer diameter of the distal end of the pipette tip. The first primary perimeter may be circular, or another appropriate shape, which does not impede insertion of the distal end of the pipette tip.

For facilitating provision of a seal between the primary orifice of the secondary supply container 131 and the pipette tip when the distal end zone thereof is accommodated by and pressed against the primary orifice and/or for holding the pipette tip, it may be desired that the diameter of the second primary perimeter of the primary orifice 176 is smaller than the outer diameter of the distal end of the pipette tip.

The secondary orifice 377 of the secondary supply container 131 may extend from a first secondary perimeter 377*a* bordering the secondary supply cavity 331*a* to at least a second secondary perimeter 377*b*. The first secondary perimeter may be configured to enable the distal end of the pipette tip to pass through. The second secondary perimeter 377*b* may comprise a flat part and may be configured to obstruct the distal end of the pipette tip from moving further into the secondary orifice without holding the distal end zone of the pipette tip when the pipette tip is pressed against the second secondary perimeter 377*b*.

The secondary orifice 377 and/or a surface tangent of the secondary orifice 377 may be conical and may be tapering in a direction away from the secondary supply cavity.

The secondary orifice 377 or one or more surface parts of the secondary orifice 377 may form one or more conical surface parts, which may be tapering in a direction away from the secondary supply cavity.

Embodiments, wherein the secondary orifice 377 tapers in the same direction as the primary orifice 376, may enable easier production. This may for instance be the case if the component comprising the secondary supply container 331 is produced by injection moulding.

The shortest diameter of the first secondary perimeter 377*a* may be at most a defined value, such as at most 0.6 mm, or at least a defined value, such as at least 1.2 mm. Provision of the shortest diameter of the first secondary perimeter being at most a desired value may provide the following advantage: it is not possible to insert a pipette tip in the secondary orifice 377 by accident if the diameter of the distal end of the pipette tip is larger than the shortest diameter of the upper part of the secondary orifice 377. Provision of the shortest diameter of the first secondary perimeter 377*a* being at least a defined value may provide the advantage facilitated production.

According to some of the embodiments described herein, the intermediate chamber may be inaccessible by a pipette tip. The one or more supply containers 331 may each comprise a well and/or may be accessible by a pipette tip. The collection container 334 may comprise a well and/or may be accessible by a pipette tip. Being accessible by a pipette tip may be understood as being configured to accommodate the pipette tip during operation for top-loading or top-removal of fluid.

According to some embodiments of the current invention, a microfluidic device is disclosed, wherein the intermediate chamber 174 has an extension of at least 8 mm, a width from 100 μm to 9 mm, a depth of 50 μm to 5 mm, wherein the width to depth ratio is 0.3 to 5, and wherein the width multiplied by the length is at least 100 $mm^2$.

According to an embodiment of the present invention, a microfluidic device 300 is provided, cf. FIGS. 10-13 (i.e. including FIGS. 10*a*, 10*b*, 11*a*, 11*b*, 12*a*, 12*b*, 13*a*, and 13*b*), wherein the intermediate chamber 374 extends along a curved line and extends longer than the distance between the input and the outlet thereof.

According to an embodiment of the present invention, a microfluidic device 100 is disclosed, wherein the secondary supply container 131 of each group of containers 171, the collection container 134 of each group of containers 171, and the first recess of the intermediate chamber 174 of each group of containers 171 are provided in the same component of the plurality of components, and wherein the secondary supply container 131 and the collection container 134 comprises respective top openings facing the opposite direction than the first recess of the intermediate chamber 174.

According to an embodiment of the present invention, a microfluidic device 100 is disclosed, wherein the component comprising the first recess comprises a plate-like section 191*a* (cf. FIG. 4*b*) where the first recess is provided, wherein the thickness of the plate-like section immediately next to the recess is between 0.5 mm and 3 mm.

According to an embodiment of the present invention, a microfluidic device 100 is disclosed, wherein the plurality of components comprises a third component, wherein the secondary supply container 131 of each group of containers 171 and the collection container 134 of each group of containers are provided in the third component.

The collection container may have a volume being bigger than the secondary supply container 331, such as being at least the combined volume of the secondary supply container 331 and the intermediate container. The shape of the walls defining the secondary supply 331 container may be configured for guiding a pipette tip towards the primary orifice. The shape of the walls defining the secondary supply container 331 may have noncircular cross-section seen in the horizontal plane. The shape of the walls defining the secondary supply container may have tapering sidewalls towards the first side of the secondary supply container being closes to the primary orifice 376.

The microfluidic device according to the present invention may comprise a plurality of components forming the emulsification section and the container section. The plurality of components may form a fixedly connected unit. Each component may be fixedly attached to at least one other component. Each component of the plurality of components may comprise at least one side facing and being attached to a side of another component of the plurality of components, such that each component is fixedly attached to at least one other component, and such that the plurality of components forms a fixedly connected unit. The plurality of components may comprise a first component and a second component being fixed to and facing each other. The plurality of components may comprise a third component. The fluid conduit network of each emulsification section may be formed in part by the first component and in part by the second component. The intermediate chamber 374 of each group of containers 371 may be formed in part by a first recess in one component of the plurality of components, such as one of the first component, the second component, and the third component. Furthermore, the intermediate chamber 374 of each group of containers may be formed in part by a first flat surface of another component of the plurality of components, such as another one of the first component, the second component and the third component. The secondary supply container 331 of each group of containers, the collection container of each group of containers, and the first recess of the intermediate chamber 374 of each group of containers may be provided in the same component of the plurality of components.

The secondary supply container 331 and the collection container may comprise respective top-openings facing in the opposite direction as compared to the first recess of the intermediate chamber 374.

Advantage: it may be easier to provide, e.g. mould, all larger structures in one piece/structure while providing the smaller structures in one or more other pieces structures.

The secondary supply container 331 of each group of containers and the collection container 374 of each group of containers may be provided in the third component.

Figure 20A:
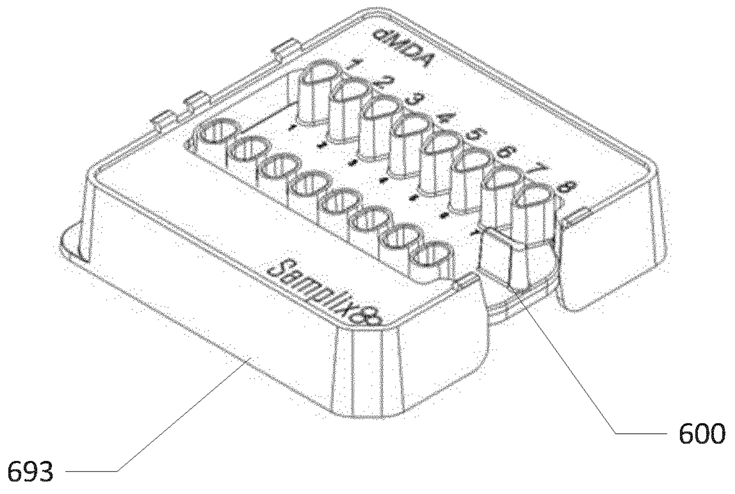
Figure 20B:
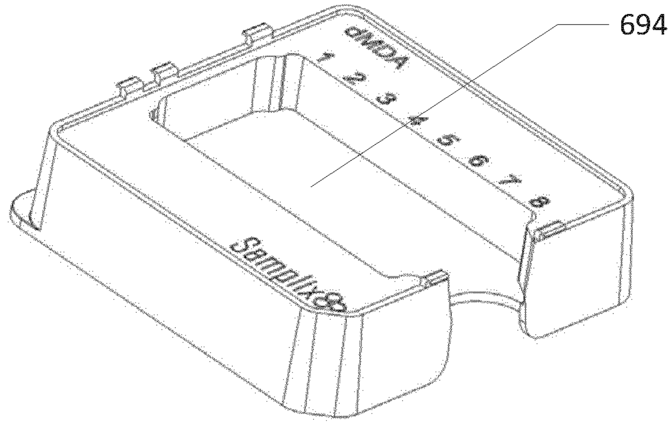
Figure 21A:
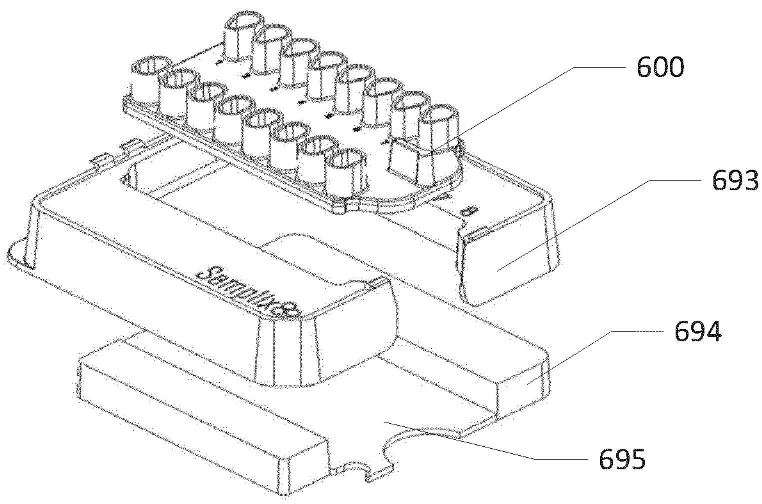
Figure 21B:
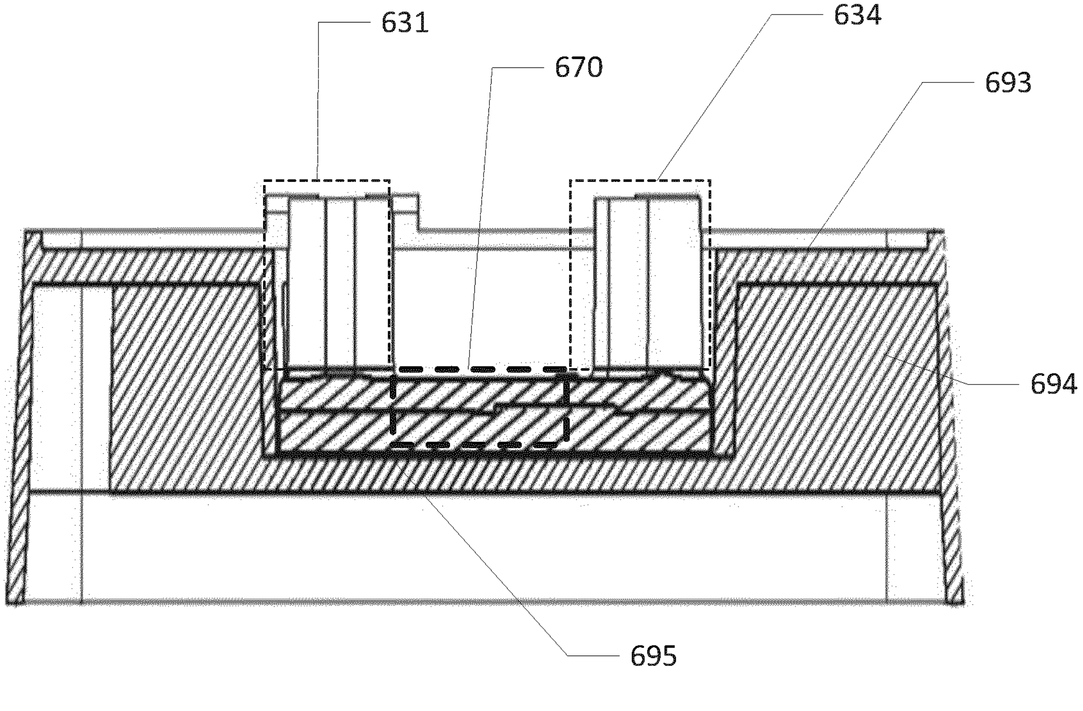
Figure 22A:
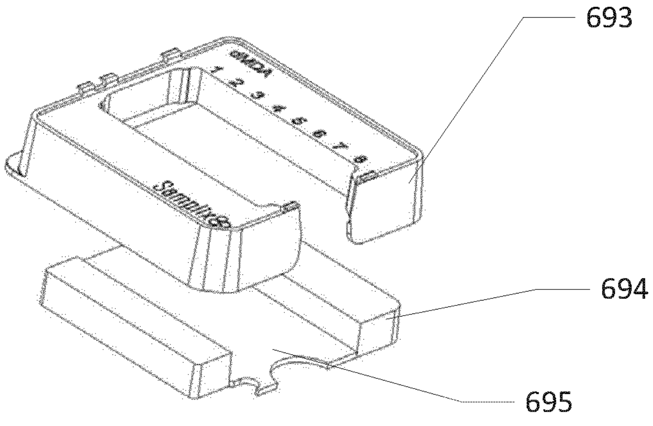
Figure 22B:
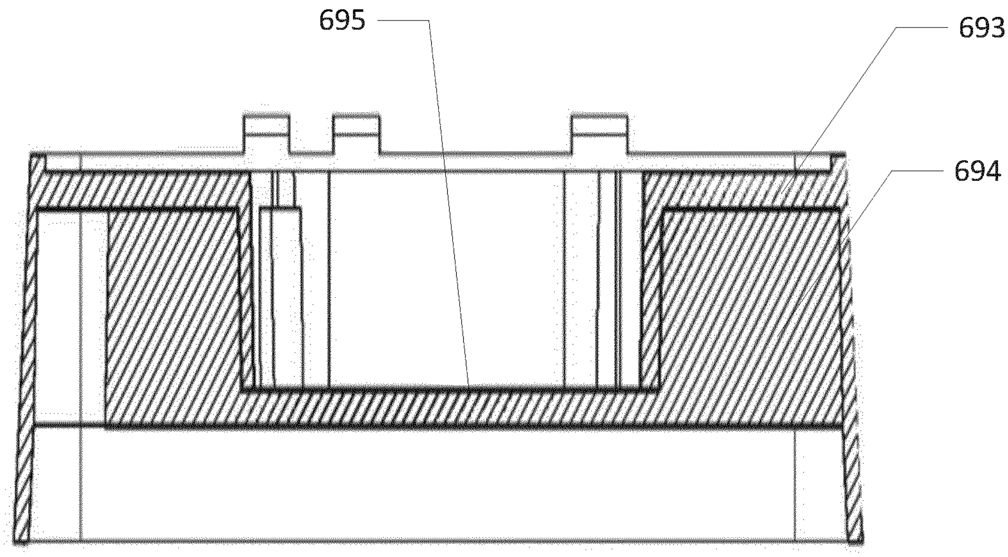

FIG. 20*a* schematically illustrates an embodiment of an assembly according to the present invention. The assembly comprises a sixth embodiment of a microfluidic device 600, a thermal structure, and a holder 693. FIG. 20*b* schematically illustrates the thermal structure 694 and the holder 693 without the microfluidic device. The thermal structure 694 and the holder 693 is referred to as a housing. FIG. 21*a* schematically illustrates an exploded view of the embodiment of FIG. 20*a*. FIG. 21*b* shows a cross-sectional view of the embodiment of FIG. 20*a*. FIG. 22*a* illustrates an exploded view of the housing as illustrated in FIG. 20*b*. FIG. 22*b* illustrates a cross-sectional view of the housing as illustrated in FIG. 20*b*. The holder 693 is configured to provide a thermal connection (as indicated by the reference 695) between the thermal structure 694 and a bottom part of the microfluidic device 600, wherein most of the intermediate chamber of each group of containers of the microfluidic device 600 may be provided within 5 mm from the thermal structure. The microfluidic device 600 is a microfluidic device according to any embodiment of a microfluidic device of the present invention. The holder 693 may have a footprint configured for insertion into a pressure supplying instrument for supplying pressure to at least the secondary supply container 631.

FIG. 24 schematically illustrates a first embodiment of a kit 862 according to the present invention. The kit 862 comprises: one or more of the microfluidic device 800 according to the present invention; and a plurality of fluids 859, 860 configured for use with the microfluidic device according to the present invention. The plurality of fluids comprises a sample buffer 859 and an oil 860. The kit comprises an enzyme and nucleotides. According to an embodiment of the kit 862, the sample buffer 859 has a lower density than the oil 860, and the microfluidic device 800, of which there is provided one or more, may be the microfluidic device as described in connection with any of embodiments 100, 200, 300, 400, and/or the kit may comprise a plurality of the assembly as described in connection with FIGS. 20-21.

Figure 25A:
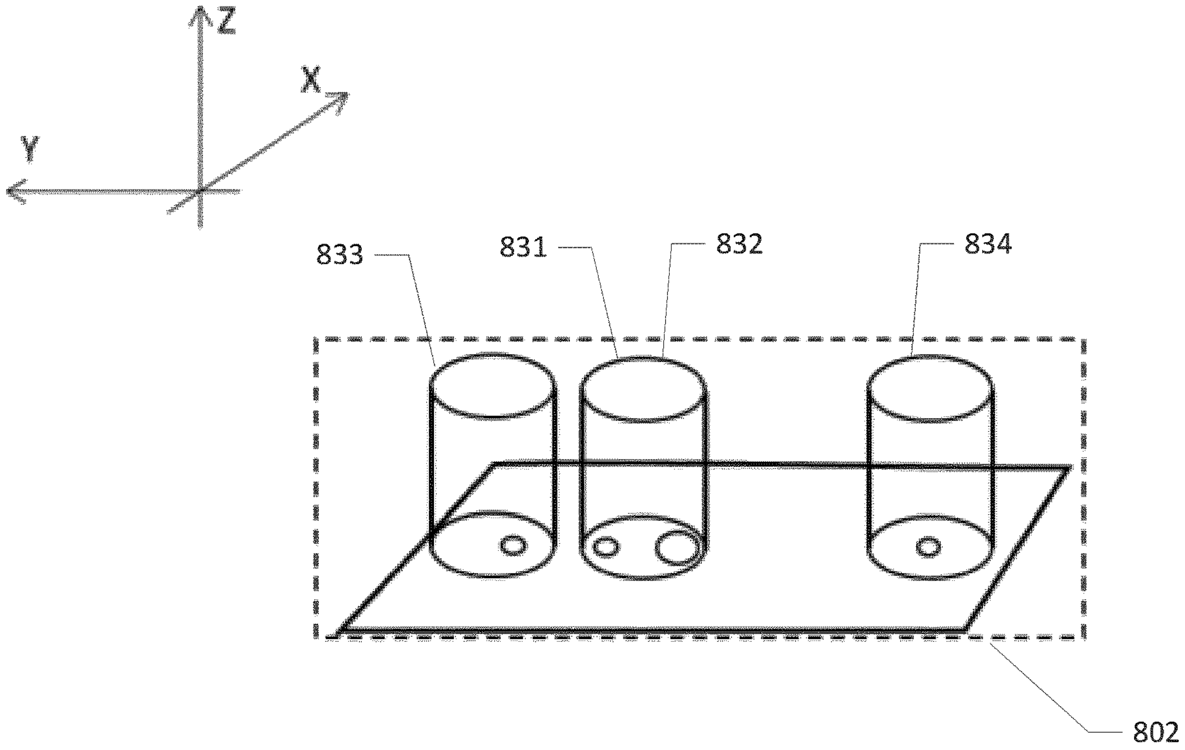
Figure 25B:
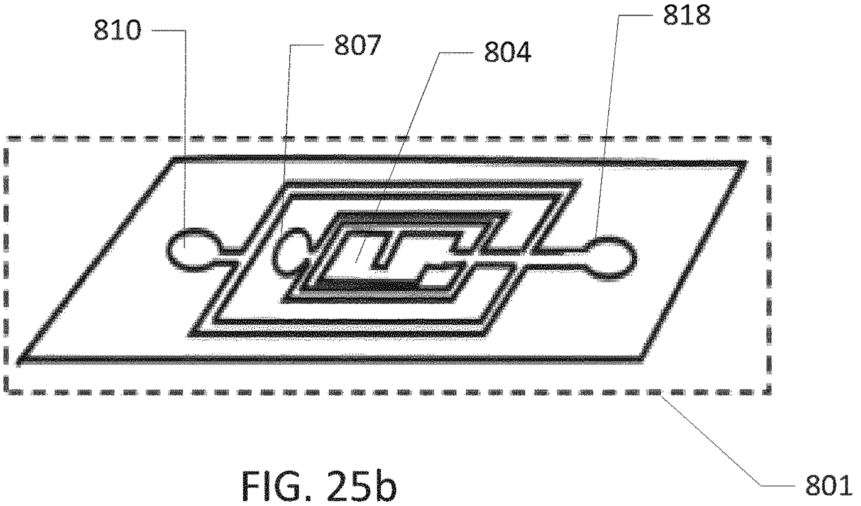

FIG. 25 illustrates an eight embodiment according to the present invention. FIG. 25*a* schematically illustrates a perspective view of an eighth embodiment of a microfluidic device according to the present invention. FIG. 25*b* schematically illustrates a perspective and exploded view of the eighth embodiment of a microfluidic device. FIG. 26 schematically illustrates a top view of a part of the eighth embodiment of a microfluidic device. FIGS. 25*a*-25*b* schematically illustrate different views of an eighth embodiment of a microfluidic device according to the present invention. The device differs from the previous illustrated embodiments in that the device is configured for provision of double emulsion droplets. The plurality of supply conduits of the fluid conduit network 835 comprises a tertiary supply conduit 809. The tertiary supply conduit 809 comprises a first tertiary supply conduit 809*a* and a second tertiary supply conduit 809*b* configured to exert a pinching action of the third fluid on a stream of the fluid from the transfer conduit 812 during use. The microfluidic unit comprises a collection conduit 816 and a second fluid junction 821. The second fluid junction 821 provides fluid communication between the tertiary supply conduit 809, the transfer conduit 812, and the collection conduit 816. The transfer conduit 812 comprises a first transfer conduit part having a first affinity for water and extending from the first fluid junction 820. The collection conduit 816 comprises a first collection conduit part extending from the second fluid junction 821 and having a second affinity for water being different from the first affinity for water. The microfluidic device comprises one or more supply wells comprising the secondary supply well 831 and a tertiary supply well 833. The tertiary supply well 833 is in fluid communication with the tertiary supply conduit 809. The collection well 834 is in fluid communication with the transfer conduit 812 via the collection conduit 816 and the second fluid junction 821.

According to an embodiment of the present invention, a method for providing emulsion droplets is disclosed, wherein the method comprises the use of any of: the microfluidic device according to any of the preceding embodiments; the assembly according to any of the preceding embodiments; or the kit 862 according to any of the preceding embodiments. The method is used for the provision of emulsion droplets, wherein the method comprises the following steps: Step 1. Accommodating a distal end zone of a pipette tip into the primary orifice and injecting a first fluid from the pipette tip into the intermediate chamber of a first group of containers. Step 2. Providing a second fluid to the secondary supply container 831 of the first group of containers. Step 3. Providing a pressure difference between the secondary supply container 831 of the first group of containers and the collection container 834 of the first group of containers, such that the pressure within the secondary supply container 831 of the first group of containers is higher than within the collection container 834 of the first group of containers. Furthermore, the method comprises use of the kit 862, wherein the first fluid comprises the sample buffer 859 and the second fluid comprises the oil 860. The step of providing a pressure difference may be provided subsequent to the step of accommodating the distal end zone of the pipette tip into the primary orifice 876. The step of providing a pressure difference may be provided subsequent to the step of providing the second fluid to the secondary supply container 831. The method may comprise a step of allowing the entire first fluid held by the intermediate chamber to arrive to the collection container 834, e.g. while maintaining the pressure difference between the secondary supply container 831 of the first group of containers and the collection container 834 of the first group of containers.

The following represents a list of at least some of the references of the drawings, wherein the suffix "X" may refer to any one or two digits. Any relevant part of the above disclosure may be understood in view of the below list of references in combination with the disclosed drawings.

X00: Microfluidic device
X01: Emulsification section
X02: Container section (incl. intermediate chamber)
X03: Primary supply conduit
X04: Primary supply inlet
X06: Secondary supply conduit
X06*a*: First secondary supply conduit
X06*b*: Second secondary supply conduit
X07: Secondary supply inlet
X09: Tertiary supply conduit
X09*a*: First tertiary supply conduit
X09*b*: Second tertiary supply conduit
X10: Tertiary supply inlet
X12: Transfer conduit
X18: Collection outlet/collection orifice
X16: Collection conduit
X20: First fluid junction
X21: Second fluid junction
X28: Side wall of a conduit
X29: Draft angle defined by a side wall of a conduit
X31: Secondary supply container
X33: Tertiary supply well or container
X34: Collection well or container
X35: Fluid conduit network
X59: Sample buffer
X60: Oil
X62: Kit X70: Emulsification unit
X71: Group of containers
X74: Intermediate chamber
X76: Primary orifice
X77: Secondary orifice
X80: Bottom piece
X80*a*: Upper side of the bottom piece
X81: Intermediate piece
X81*a*: Upper side of the intermediate piece
X81*b*: Underside of the intermediate piece
X82: Upper piece
X82*a*: Upper side of upper piece
X82*b*: Underside of upper piece

The invention claimed is:

1. A microfluidic device comprising:

an emulsification section comprising one or more emulsification units; and a container section comprising one or more groups of containers comprising one group of containers for each emulsification unit;

each emulsification unit comprising a fluid conduit network comprising: a plurality of supply conduits comprising a primary supply conduit and a secondary supply conduit;

a transfer conduit; and a first fluid junction providing fluid communication between the primary supply conduit, the secondary supply conduit, and the transfer conduit; each group of containers comprising a plurality of containers comprising an intermediate chamber, a collection container, and one or more supply containers comprising a secondary supply container, the secondary supply container defining a secondary supply cavity, the secondary supply container comprising a secondary orifice extending from the secondary supply cavity and a primary orifice extending from the secondary supply cavity, the collection container being in fluid communication with the transfer conduit of the corresponding emulsification unit via a collection orifice of the collection container, the secondary supply container being in fluid communication with the secondary supply conduit of the corresponding emulsification unit via the secondary orifice, the secondary supply container being in fluid communication with the intermediate chamber of the same group of containers via the primary orifice, the intermediate chamber being in fluid communication with the first fluid junction of the corresponding emulsification unit via the primary supply conduit of the corresponding emulsification unit.

2. The microfluidic device according to claim 1, wherein the primary orifice is configured for accommodating a distal end zone of a pipette tip and is configured for forming a seal with the pipette tip when the distal end zone is accommodated by and pressed against the primary orifice.

3. The microfluidic device according to claim 2, wherein a surface tangent of the primary orifice is conical and tapering in a direction away from the secondary supply cavity.

4. The microfluidic device according to claim 3, wherein the primary orifice extends from a first primary perimeter bordering the secondary supply cavity to at least a second primary perimeter, wherein the first primary perimeter is configured to enable the distal end of the pipette tip to pass through, and wherein the second primary perimeter is circular and configured to hold and form a seal with the distal end zone of the pipette tip when the distal end zone of the pipette tip is pressed against the second primary perimeter, and wherein the smallest diameter of the first primary perimeter is larger than the diameter of the second primary perimeter.

5. The microfluidic device according to claim 4, wherein the smallest diameter of the first primary perimeter is between 9 mm and 0.5 mm, and wherein the diameter of the second primary perimeter is between 0.10 mm and 3.0 mm.

6. The microfluidic device according to claim 1, wherein the intermediate chamber has an extension of at least 8 mm, a width of 100 μm to 9 mm, a depth of 50 μm to 5 mm, wherein the width to depth ratio is 0.3 to 5, and wherein the width multiplied by the length is at least 100 mm2.

7. The microfluidic device according to claim 1, wherein the intermediate chamber extends along a curved line comprising at least two parts extending in opposite directions.

8. The microfluidic device according to claim 1, wherein the intermediate chamber has a serpentine-shaped part.

9. The microfluidic device according to claim 1, wherein the collection container has a bottom part having an inclining surface, and wherein the collection orifice is provided at the lowermost part of the collection container.

10. The microfluidic device according to claim 1, comprising a plurality of components forming the emulsification section and the container section, wherein each component of the plurality of components comprises at least one side facing and being attached to a side of another component of the plurality of components, such that each component is fixedly attached to at least one other component, and such that the plurality of components forms a fixedly connected unit, and wherein the plurality of components comprises a first component and a second component being fixed to and facing each other, wherein the fluid conduit network of each emulsification section is formed in part by the first component and in part by the second component, and wherein the intermediate chamber of each group of containers is formed in part by a first recess in one component of the plurality of components, such as one of the first component and the second component, and in part by a first flat surface of another component of the plurality of components, such as another one of the first component and the second component.

11. The microfluidic device according to claim 10, wherein the secondary supply container of each group of containers, the collection container of each group of containers, and the first recess of the intermediate chamber of each group of containers are provided in the same component of the plurality of components, and wherein the secondary supply container and the collection container comprises respective top openings facing in the opposite direction than the first recess of the intermediate chamber.

12. The microfluidic device according to claim 11, wherein the component comprising the first recess of the intermediate chamber comprises a plate-like section where the first recess is provided, wherein the thickness of the plate-like section immediately next to the recess is between 0.5 mm and 3 mm.

13. The microfluidic device according to any of the claim 10, wherein the plurality of components comprises a third component, wherein the secondary supply container of each group of containers and the collection container of each group of containers are provided in the third component.

14. An assembly comprising the microfluidic device according to claim 1, a thermal structure, and a holder configured to provide a thermal connection between the thermal structure and a bottom part of the microfluidic device, wherein most of the intermediate chamber of each group of containers is provided within 5 mm from the thermal structure.

15. A kit comprising:

one or more of the microfluidic device according to claim 1 and/or one or more of the assembly according to claim 14; and a plurality of fluids configured for use with the microfluidic device;

the plurality of fluids comprising a sample buffer and an oil, the kit comprising an enzyme and nucleotides, wherein the sample buffer has a lower density than the oil.

16. A method for providing emulsion droplets, the method comprising use of:

the microfluidic device according to claim 1 the method comprising the following steps:

accommodating a distal end zone of a pipette tip into the primary orifice and injecting a first fluid from the pipette tip into the intermediate chamber of a first group of containers;

providing a second fluid to the secondary supply container of the first group of containers; and providing a pressure difference between the secondary supply container of the first group of containers and the collection container of the first group of containers, such that the pressure within the secondary supply container of the first group of containers is higher than within the collection container of the first group of containers.

17. A method of providing a microfluidic device according to claim 10, the method comprising:

providing the plurality of components; and assembling the plurality of components such that each component is fixedly attached to at least one other component, and such that the plurality of components forms a fixedly connected unit, and such that each fluid conduit network is formed in part by the second component and in part by the first component, and wherein the first component faces the second component.

* * * * *